US011700853B2

(12) United States Patent
Abraham et al.

(10) Patent No.: US 11,700,853 B2
(45) Date of Patent: Jul. 18, 2023

(54) PLANT HEALTH COMPOSITIONS COMPRISING A WATER-SOLUBLE PESTICIDE AND A WATER-INSOLUBLE AGROCHEMICAL

(71) Applicant: Monsanto Technology LLC, St. Louis, MO (US)

(72) Inventors: William Abraham, Wildwood, MO (US); Andrew Dyszlewski, St. Louis, MO (US); John W. Hemminghaus, Crestwood, MO (US); Frank C. Kohn, St. Louis, MO (US); Daniel R. Wright, St. Louis, MO (US); Junhua Zhang, Chesterfield, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 16/896,827

(22) Filed: Jun. 9, 2020

(65) Prior Publication Data

US 2020/0296968 A1    Sep. 24, 2020

Related U.S. Application Data

(62) Division of application No. 13/634,076, filed as application No. PCT/US2011/028375 on Mar. 14, 2011, now Pat. No. 10,709,134.

(60) Provisional application No. 61/313,436, filed on Mar. 12, 2010.

(51) Int. Cl.
*A01N 57/20* (2006.01)
*A01N 25/04* (2006.01)
*A01N 43/60* (2006.01)
*A01N 43/653* (2006.01)

(52) U.S. Cl.
CPC ............. *A01N 57/20* (2013.01); *A01N 25/04* (2013.01); *A01N 43/60* (2013.01); *A01N 43/653* (2013.01)

(58) Field of Classification Search
CPC ...... A01N 57/20; A01N 25/04; A01N 43/653; A01N 43/60
See application file for complete search history.

(56) References Cited

U.S. PATENT DOCUMENTS

| | | |
|---|---|---|
| 3,505,377 A | 4/1970 | Morehouse |
| 5,326,789 A | 7/1994 | Narayanan |
| 5,750,468 A * | 5/1998 | Wright ................... A01N 57/20 504/206 |
| 5,872,078 A | 2/1999 | Kuchikata et al. |
| 6,093,681 A | 7/2000 | Ward et al. |
| 6,117,816 A | 9/2000 | Jimoh et al. |
| 6,130,186 A | 10/2000 | Ward et al. |
| 6,316,473 B1 | 11/2001 | Shimojo et al. |
| 6,407,042 B1 | 6/2002 | Ward et al. |
| 6,475,953 B1 | 11/2002 | Ward et al. |
| 6,569,809 B1 | 5/2003 | Sato et al. |
| 6,667,276 B1 * | 12/2003 | Maier ..................... A01N 25/30 504/127 |
| 6,713,433 B2 | 3/2004 | Jimoh |
| 6,734,142 B2 | 5/2004 | Massmann et al. |
| 6,746,988 B2 | 6/2004 | Hopkinson et al. |
| 6,762,289 B1 | 7/2004 | O'Lenick, Jr. et al. |
| 7,098,170 B2 | 8/2006 | Asrar et al. |
| 7,135,437 B2 | 11/2006 | Pallas et al. |
| 2002/0160918 A1 | 10/2002 | Lewis et al. |
| 2003/0013612 A1 | 1/2003 | Asrar et al. |
| 2003/0050194 A1 | 3/2003 | Hopkinson et al. |
| 2003/0060371 A1 | 3/2003 | Asrar et al. |
| 2003/0087764 A1 | 5/2003 | Pallas et al. |
| 2003/0099674 A1 | 5/2003 | Chen |
| 2004/0025413 A1 | 2/2004 | Barazani |
| 2004/0132621 A1 | 7/2004 | Frisch et al. |
| 2004/0242540 A1 | 12/2004 | Asrar et al. |
| 2004/0259732 A1 | 12/2004 | Asrar et al. |
| 2005/0059553 A1 | 3/2005 | Misselbrook |
| 2005/0169951 A1 | 8/2005 | Sasson et al. |
| 2005/0187108 A1 | 8/2005 | Ng et al. |
| 2006/0111239 A1 | 5/2006 | Oakley et al. |
| 2006/0194699 A1 | 8/2006 | Moucharafieh et al. |
| 2006/0288447 A1 | 12/2006 | Baley et al. |
| 2007/0010399 A1 | 1/2007 | Rosinger et al. |
| 2007/0010401 A1 * | 1/2007 | Noon ...................... A01N 57/20 504/165 |
| 2007/0037708 A1 | 2/2007 | Prosch et al. |

(Continued)

FOREIGN PATENT DOCUMENTS

| | | | |
|---|---|---|---|
| CA | 2379570 | * | 9/2000 |
| CA | 2269823 C | | 8/2004 |

(Continued)

OTHER PUBLICATIONS

Bergstroem, K.I., et al., "Amido Propyl Amines—A New Adjuvant Class for Agrochemicals," 2005, Crop Science & Technology: The BCPC International Congress, Proceedings, pp. 459-464, XP009158823.
Enyedi. A.J., et al., "Signal Molecules in Systemic Plant Resistance to Pathogens and Pests," 1992, Cell, 70/6:879-886.
Ohmes, G.A., et al., "Liquid Chromatographic Determination of Sulfentrazone in Soil," 1999, J AOAC Intl, 82/5:1214-1216.
OSi Specialties, Inc. "Silwet Surfactants", Product Literature.
Makaze Yield Pro, Product Literature, Loveland Products Inc., 57 pages.
Makaze Yield Pro, Specimen Label, EPA Reg. No. 34704-1033, Loveland Products Inc., 2 pages.

(Continued)

*Primary Examiner* — Robert A Wax
*Assistant Examiner* — Danielle Sullivan
(74) *Attorney, Agent, or Firm* — Stinson LLP

(57) ABSTRACT

Compositions for improving plant health, the compositions comprising at least one water-soluble pesticide and at least one non-herbicidal water-insoluble agrochemical, are described. Also described are processes for preparing the compositions and methods of improving agronomic crop plant health using the compositions.

20 Claims, 21 Drawing Sheets

(56) References Cited

U.S. PATENT DOCUMENTS

| | | |
|---|---|---|
| 2007/0087937 A1 | 4/2007 | Leatherman et al. |
| 2007/0105718 A1 | 5/2007 | Ng et al. |
| 2007/0124839 A1 | 5/2007 | Schulz et al. |
| 2007/0135308 A1 | 6/2007 | Leatherman et al. |
| 2007/0197391 A1 | 8/2007 | Clark et al. |
| 2007/0197394 A1 | 8/2007 | Policello et al. |
| 2007/0269467 A1 | 11/2007 | Leatherman et al. |
| 2008/0031902 A1 | 2/2008 | Lee et al. |
| 2008/0125319 A1 | 5/2008 | Asrar et al. |
| 2008/0194410 A1 | 8/2008 | Baseeth et al. |
| 2008/0234129 A1 | 9/2008 | Asrar et al. |
| 2008/0318791 A1 | 12/2008 | Baur et al. |
| 2009/0029856 A1 | 1/2009 | Avila-Adame et al. |
| 2009/0111693 A1 | 4/2009 | Ikeuchi et al. |
| 2009/0133318 A1 | 5/2009 | Lahm |
| 2009/0133319 A1 | 5/2009 | Lahm et al. |
| 2009/0143410 A1 | 6/2009 | Patel |
| 2009/0163449 A1 | 6/2009 | Wempe |
| 2009/0192040 A1 | 7/2009 | Grobler |
| 2009/0215797 A1 | 8/2009 | Hopkins et al. |
| 2009/0293148 A1 | 11/2009 | Ren et al. |

FOREIGN PATENT DOCUMENTS

| | | |
|---|---|---|
| EP | 0694259 A1 | 1/1997 |
| GB | 2267825 A1 | 12/1993 |
| WO | 9951099 A2 | 10/1999 |
| WO | 2008076807 A2 | 6/2008 |
| WO | 2009060012 A2 | 5/2009 |
| WO | 2009092986 A2 | 7/2009 |
| WO | 2011113052 A3 | 9/2011 |

OTHER PUBLICATIONS

EPA Pesticide Fact Sheet, Carfentrazone-ethyl, 11 pages.
Wikipedia, Definition "Partition Coefficient" Sep. 3, 2009.
International Search Report and Written Opinion issued in PCT/US2011/028375 dated Jun. 26, 2012, 11 pages.

\* cited by examiner

PLANT HEALTH COMPOSITIONS COMPRISING A WATER-SOLUBLE PESTICIDE AND A WATER-INSOLUBLE AGROCHEMICAL

REFERENCE TO RELATED APPLICATIONS

This application is a division of U.S. patent application Ser. No. 13/634,076, filed Mar. 1, 2013, which is the 371 national stage of International PCT Application No. PCT/US2011/028375, filed Mar. 14, 2011, and claims the benefit of U.S. Provisional Application No. 61/313,436, filed Mar. 12, 2010, the entire contents of which are incorporated herein by reference.

FIELD OF THE INVENTION

The present invention generally relates to compositions for improving plant health, the compositions comprising at least one water-soluble pesticide and at least one water-insoluble agrochemical. The present invention also relates to processes for preparing the compositions and methods of improving agronomic crop plant health using the compositions.

BACKGROUND OF THE INVENTION

Conventionally, water-insoluble agrochemicals, such as insecticides, herbicides and/or fungicides, are formulated alone as emulsion concentrate (EC), microemulsion concentrate (ME), suspension concentrate (SC) or dry concentrate compositions. When formulated with a second active, such as a water-soluble agrochemical, difficulties such as low active loading limitations and poor compositional stability may result in problems such as the formation of two or more phases, or crystallization of one or more of the actives from the composition.

To overcome those limitations, prior art compositions typically contain the water-insoluble agrochemicals as a solute dissolved in an organic solvent. High solvent loading is required in order to solubilize the water-insoluble agrochemical and provide stable ME, EC or SC compositions. Problematically, organic solvents are generally toxic, harmful to the environment, and/or are expensive. Moreover, water-soluble pesticide loading in such compositions is typically limited.

A need exists for high load pesticide compositions comprising water-soluble pesticide and water-insoluble agrochemical compounds having reduced solvent content and improved stability.

SUMMARY OF THE INVENTION

Among the various aspects of the present invention is the provision of plant health compositions comprising at least one water-soluble herbicide and at least one water-insoluble agrochemical.

Briefly, therefore, the present invention is directed to a microemulsion concentrate composition comprising (i) an aqueous carrier phase comprising at least one water-soluble pesticide in solution in the carrier phase, (ii) a surfactant phase comprising (a) a surfactant component comprising at least one surfactant and (b) at least one water-insoluble agrochemical, and (iii) a water-immiscible organic solvent. The water soluble pesticide concentration is at least 400 grams active equivalent per liter of the concentrate composition, and the weight ratio of the water-immiscible organic solvent to the water-insoluble agrochemical on an active equivalent basis is less than 3:1.

The present invention is further directed to a solid pesticidal concentrate composition comprising (i) at least one water-soluble pesticide (ii) a surfactant component comprising at least one surfactant and (iii) at least one water-insoluble agrochemical. The water-soluble pesticide concentration is at least 5 percent by weight active equivalent per unit weight of the concentrate composition, and the water-insoluble agrochemical is predominantly present as a solute in the surfactant component.

The present invention is still further directed to a suspension concentrate composition comprising water and at least one water-soluble pesticide in solution therein, a surfactant component comprising at least one surfactant, and at least one water-insoluble agrochemical. The weight ratio of the surfactant component to the water-insoluble agrochemical is from 1:1 to 5:1. A first portion of the water-insoluble agrochemical is present as a solute in the surfactant component and a second portion of the water-insoluble agrochemical is present as a solid particulate, and the water soluble pesticide concentration is at least 400 grams active equivalent per liter of the concentrate composition.

The present invention is further directed to a process for preparing a solid pesticidal composition comprising at least one water-soluble pesticide, a surfactant component and at least one water-insoluble agrochemical. The process comprises preparing a surfactant premix comprising the surfactant component and the water-insoluble agrochemical wherein the water-insoluble agrochemical is predominantly present as a solute in the surfactant component, combining the surfactant premix with the water-soluble pesticide and forming the solid pesticidal composition.

The present invention is still further directed to a process for preparing a liquid concentrate composition. The process comprises admixing a surfactant component comprising at least one surfactant and at least one water-insoluble agrochemical to form a surfactant premix wherein the water-insoluble agrochemical is predominantly present as a solute in the surfactant component, preparing an aqueous solution comprising at least one water-soluble pesticide and combining the surfactant premix and the aqueous solution of the water-soluble pesticide to form the liquid concentrate composition wherein the water-soluble pesticide concentration is at least 400 grams per liter on an active equivalent basis. In some embodiments, the liquid concentrate composition is a suspension concentrate. In other embodiments, the liquid concentrate composition is a microemulsion further comprising a water-immiscible organic solvent.

The present invention is further directed to a method of increasing the vigor and/or yield of an agronomic plant and of controlling weeds growing in a crop of the agronomic plants. The method comprises forming an application mixture from a composition of the present invention wherein the application mixture comprises (i) a water-soluble herbicide selected from the group consisting of organophosphorus herbicides, ALS inhibitor herbicides, synthetic auxin herbicides, acetyl CoA carboxylase inhibitor herbicides, ACCase inhibitor herbicides, and combinations thereof and derivatives thereof and (ii) a water-insoluble non-herbicidal agrochemical selected from the group consisting of triazoles, strobilurins, and combinations thereof and derivatives thereof. The application mixture is applied to the agronomic plant or agronomic plant propagation material in an amount effective to increase the vigor and/or yield of the agronomic plant wherein the agronomic plant has an herbicidal tolerant trait conferring tolerance to the organophosphorus herbicide, ALS inhibitor herbicide, synthetic auxin herbicide, acetyl CoA carboxylase inhibitor herbicide, ACCase inhibitor herbicide, or combination thereof.

Other objects and features will be in part apparent and in part pointed out hereinafter.

DESCRIPTION OF THE EMBODIMENT(S) OF THE INVENTION

Figure 1:
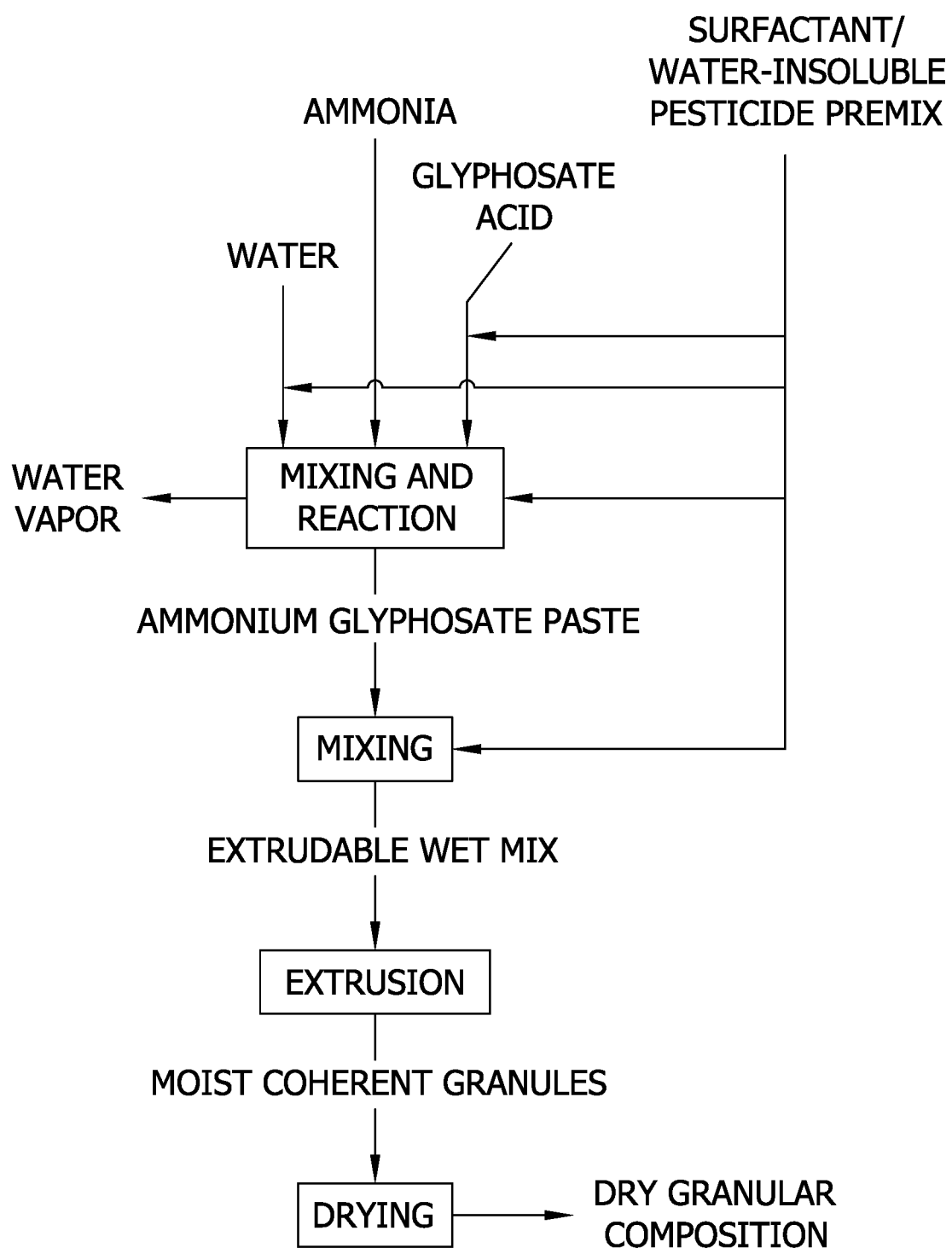
FIG. 1 shows a process flow diagram of a process of the invention for preparing a dry granular herbicidal composition.
Figure 2:
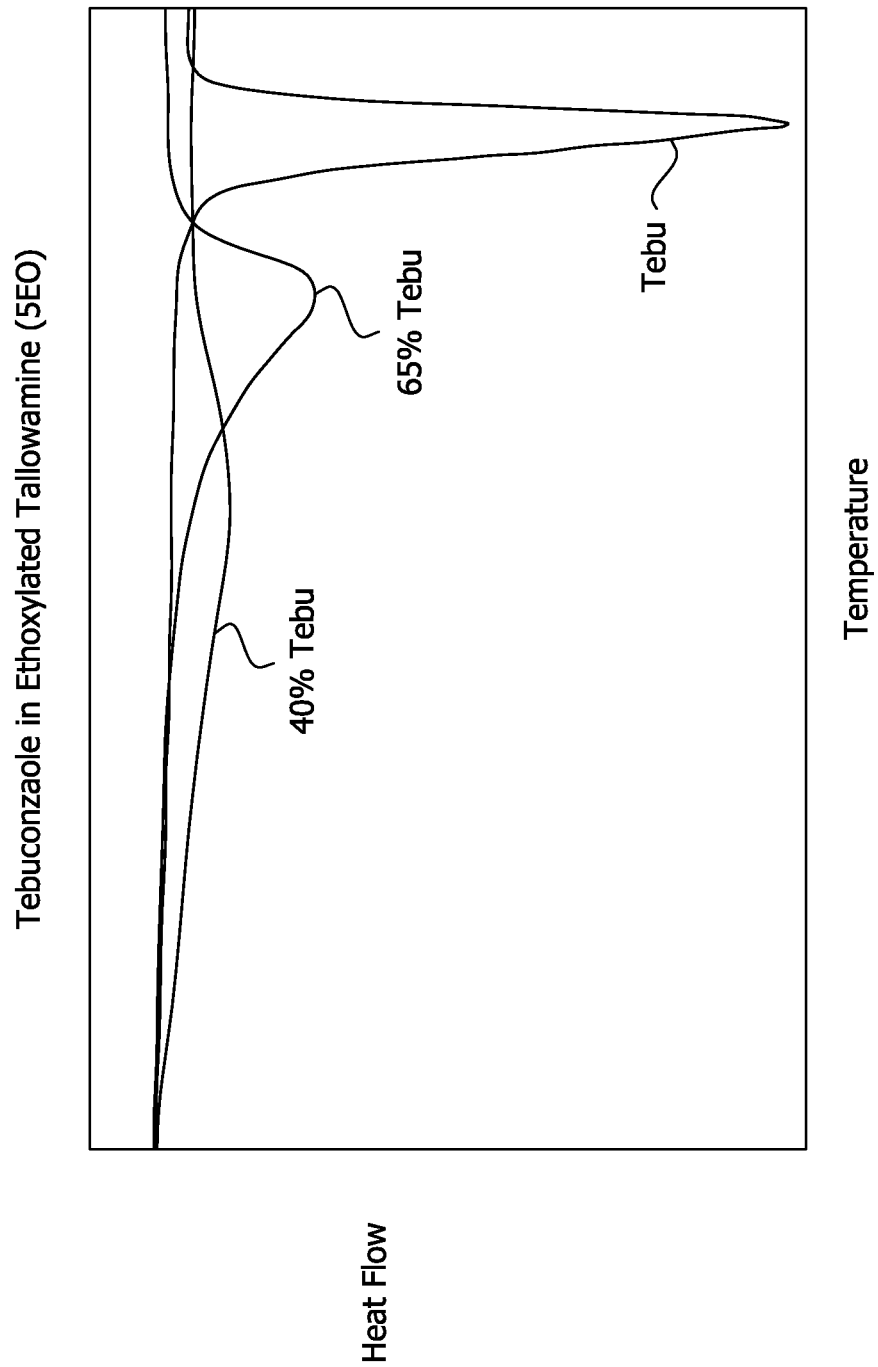
FIG. 2 is a differential scanning calorimetry curve of heat flux versus temperature for tebuconazole and 40% and 65% tebuconazole in ethoxylated tallowamine 5 EO surfactant.
Figure 3:
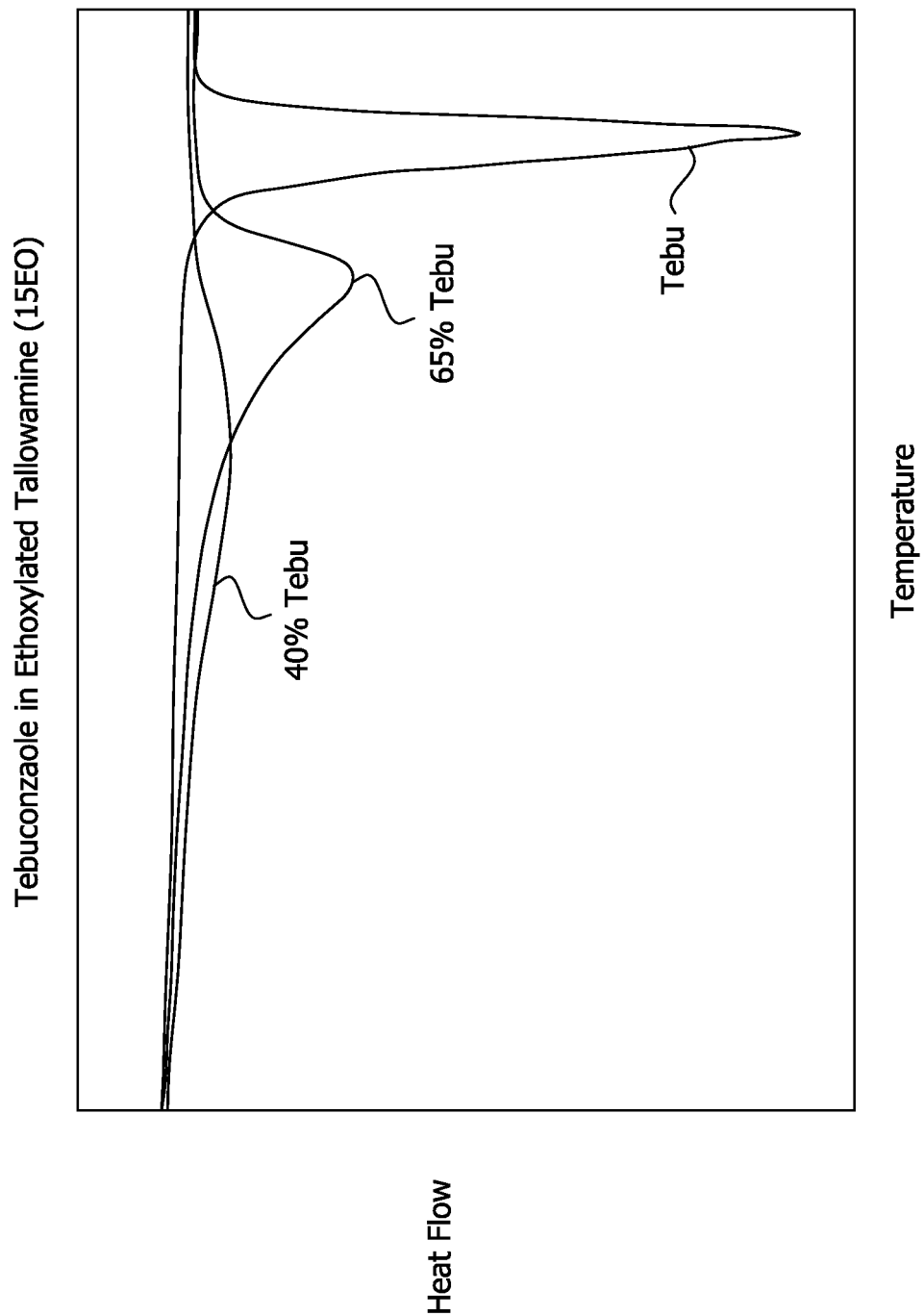
FIG. 3 is a differential scanning calorimetry curve of heat flux versus temperature for tebuconazole and 40% and 65% tebuconazole in ethoxylated tallowamine 15 EO surfactant.
Figure 4:
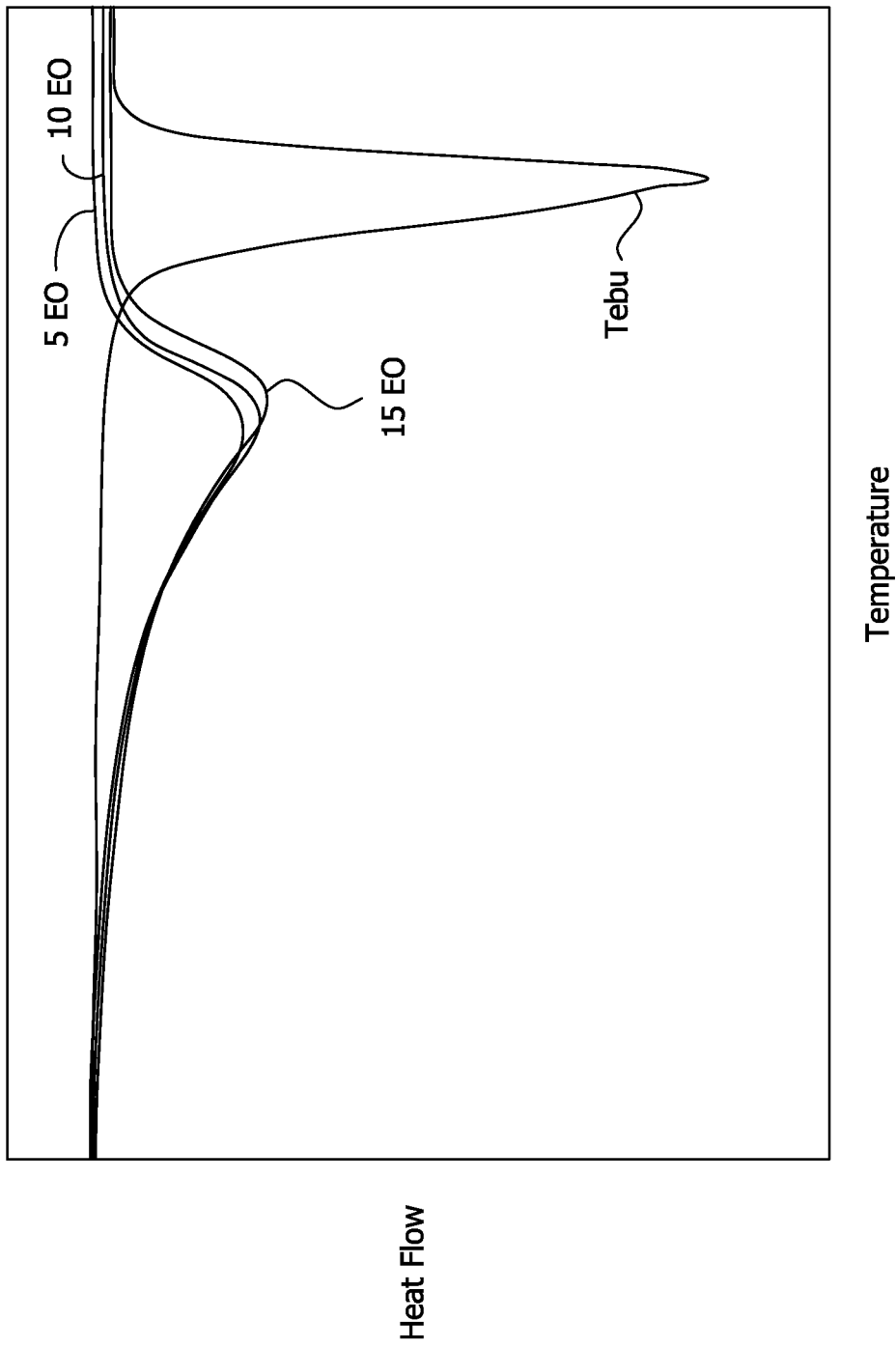
FIG. 4 is a differential scanning calorimetry curve of heat flux versus temperature for tebuconazole and 65% tebuconazole in each of ethoxylated tallowamine 5 EO surfactant, ethoxylated tallowamine 10 EO surfactant, ethoxylated tallowamine 15 EO surfactant.
Figure 5:
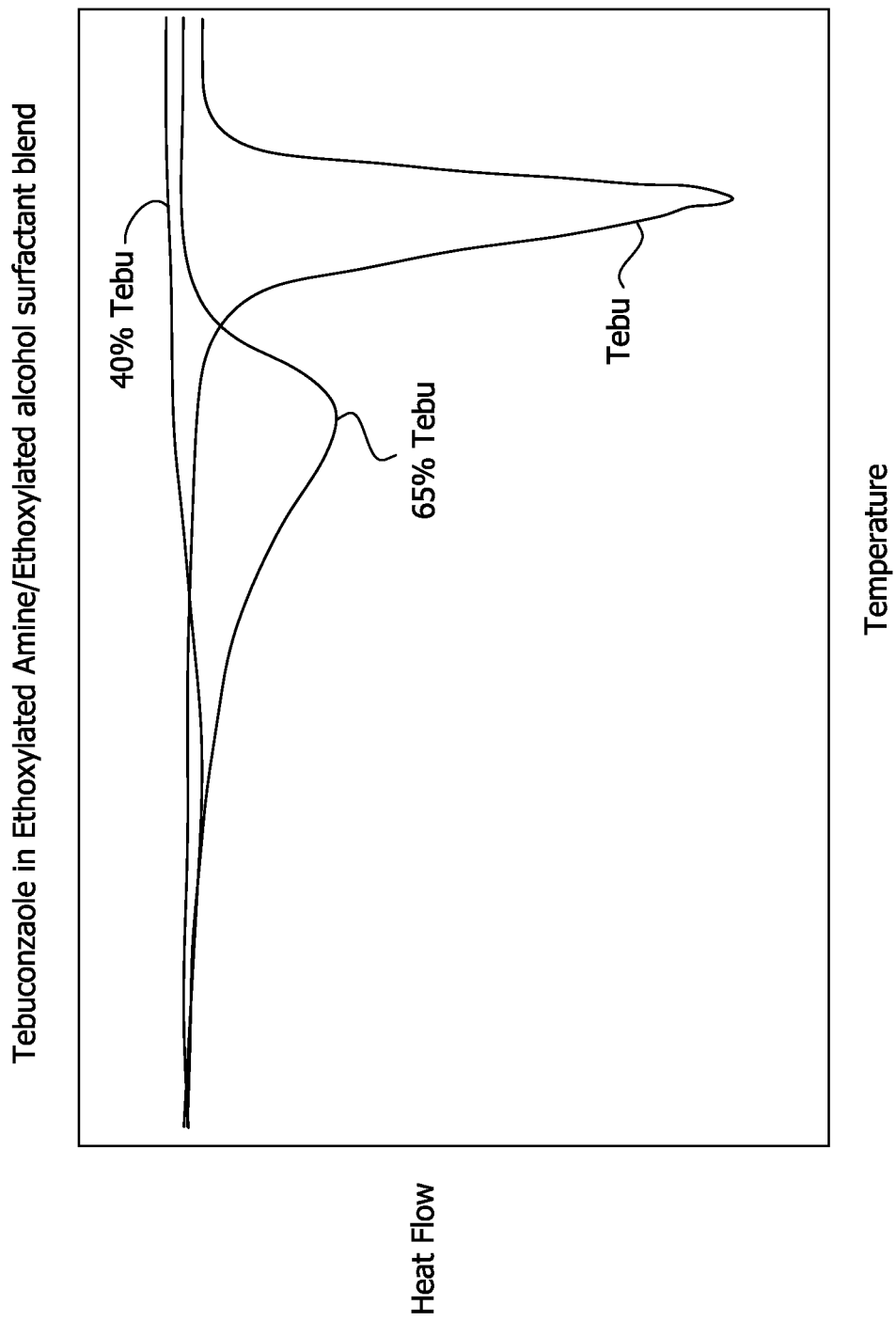
FIG. 5 is a differential scanning calorimetry curve of heat flux versus temperature for tebuconazole and 40% and 65% tebuconazole in an ethoxylated amine/ethoxylated alcohol surfactant blend.
Figure 6:
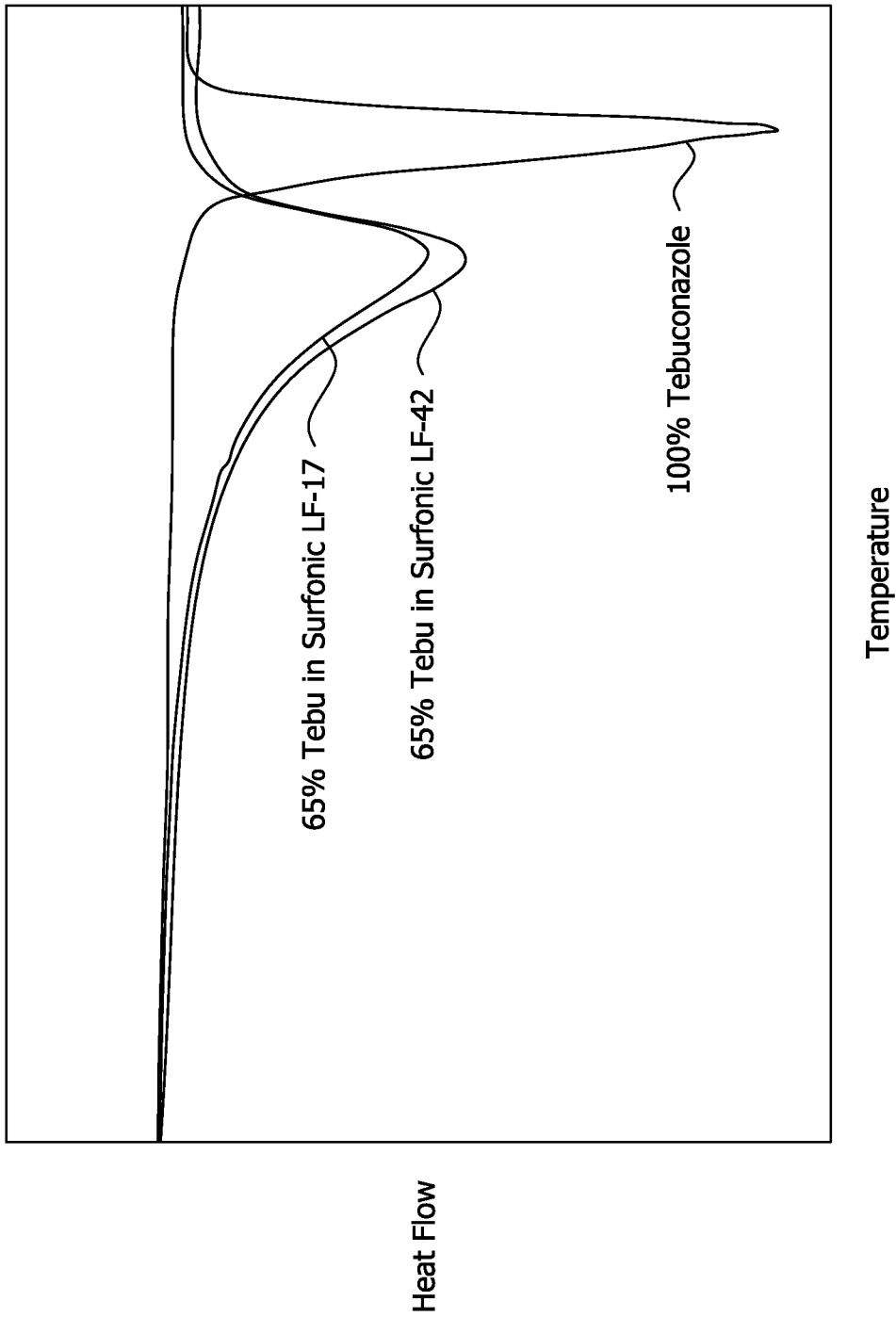
FIG. 6 is a differential scanning calorimetry curve of heat flux versus temperature for tebuconazole and 65% tebuconazole in each of two $C_{12-14}$ propoxylated alcohol surfactants (Surfonic LF-17 and Surfonic LF-42).
Figure 7:
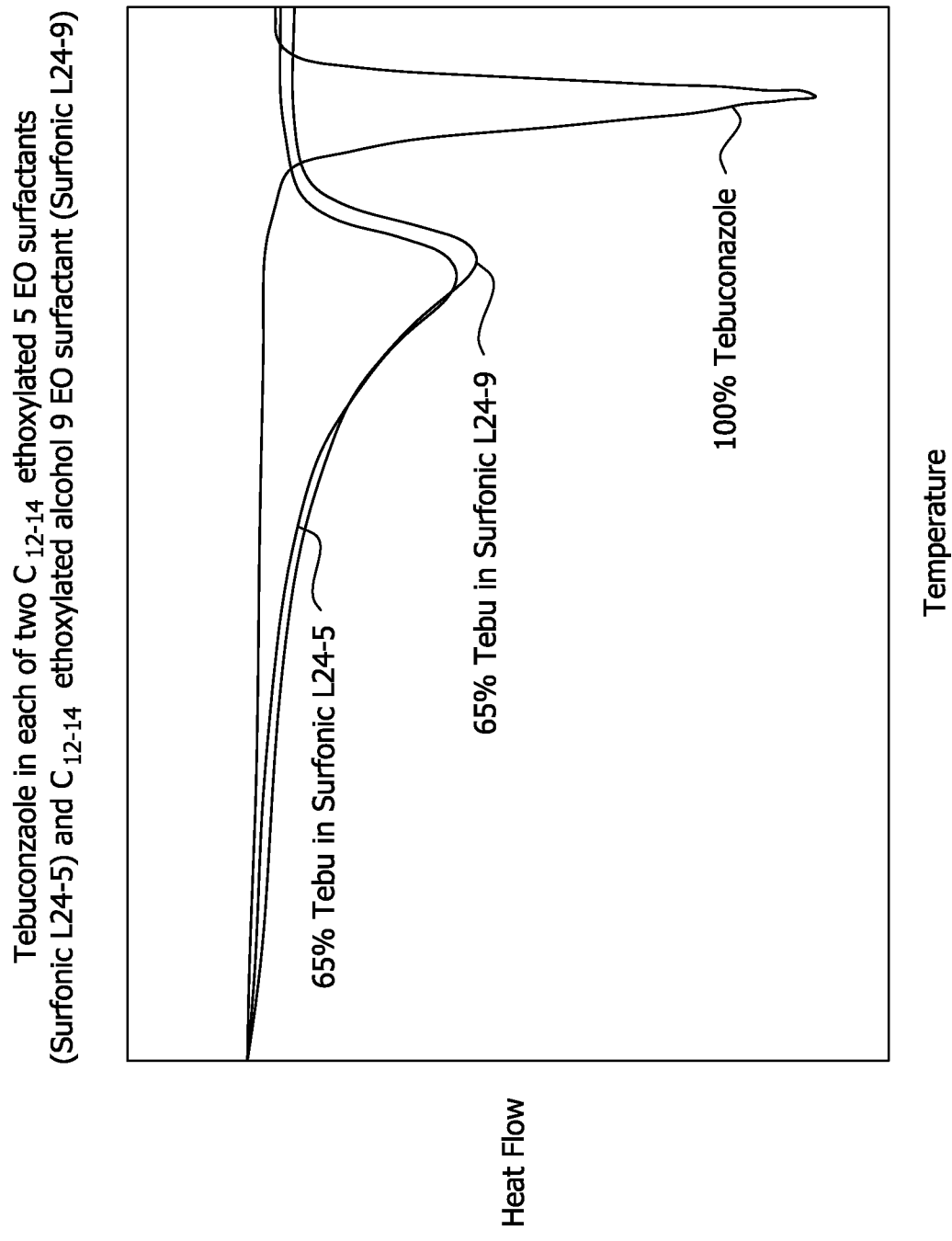
FIG. 7 is a differential scanning calorimetry curve of heat flux versus temperature for tebuconazole and 65% tebuconazole in each of $C_{12-14}$ ethoxylated alcohol 5 EO surfactant (SURFONIC L24-5) and $C_{12-14}$ ethoxylated alcohol 9 EO surfactant (SURFONIC L24-9).
Figure 8:
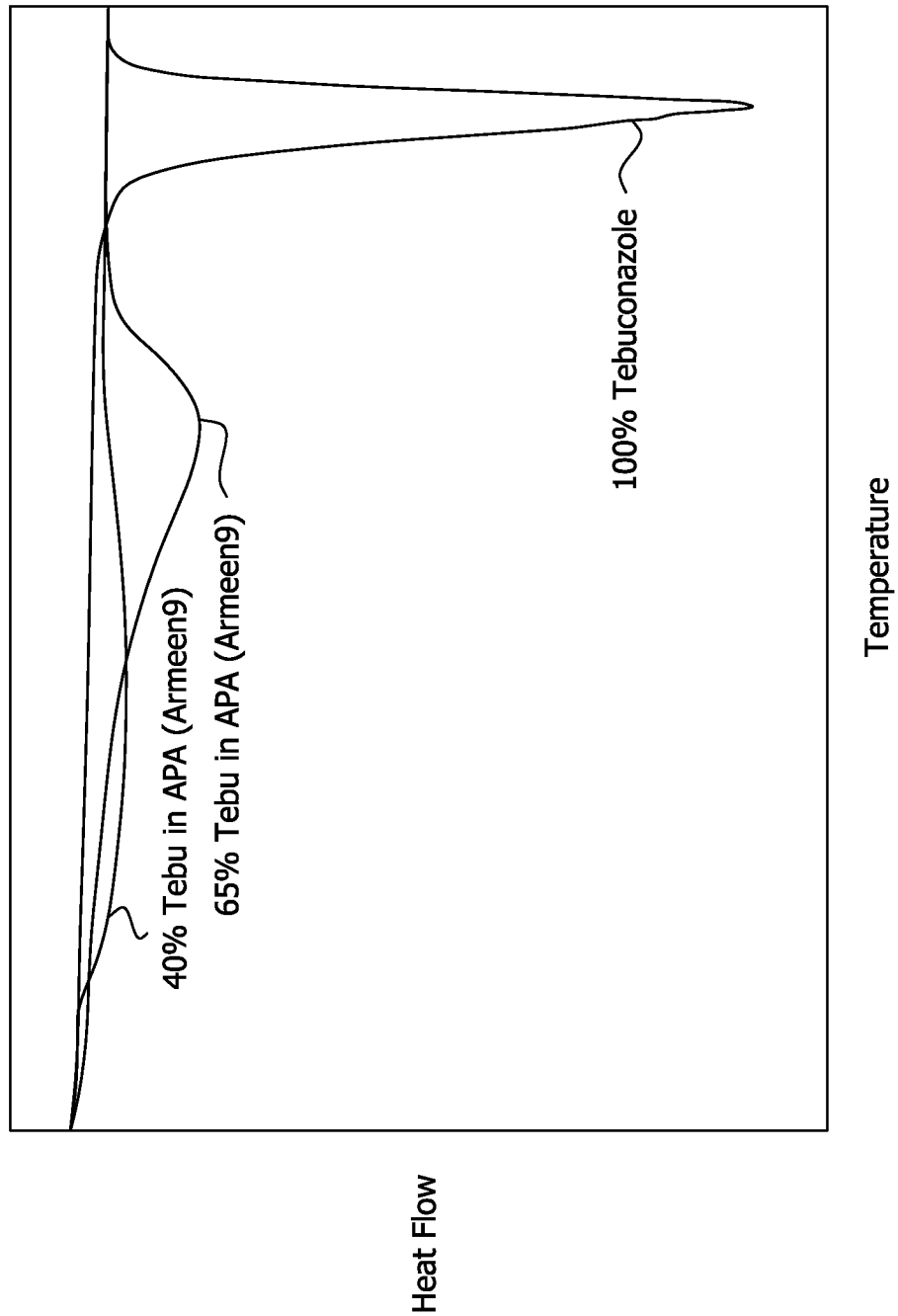
FIG. 8 is a differential scanning calorimetry curve of heat flux versus temperature for tebuconazole and 40% and 65% tebuconazole in $C_{6-9}$ amidopropyl dimethylamine surfactant (ARMEEN APA 9).
Figure 9:
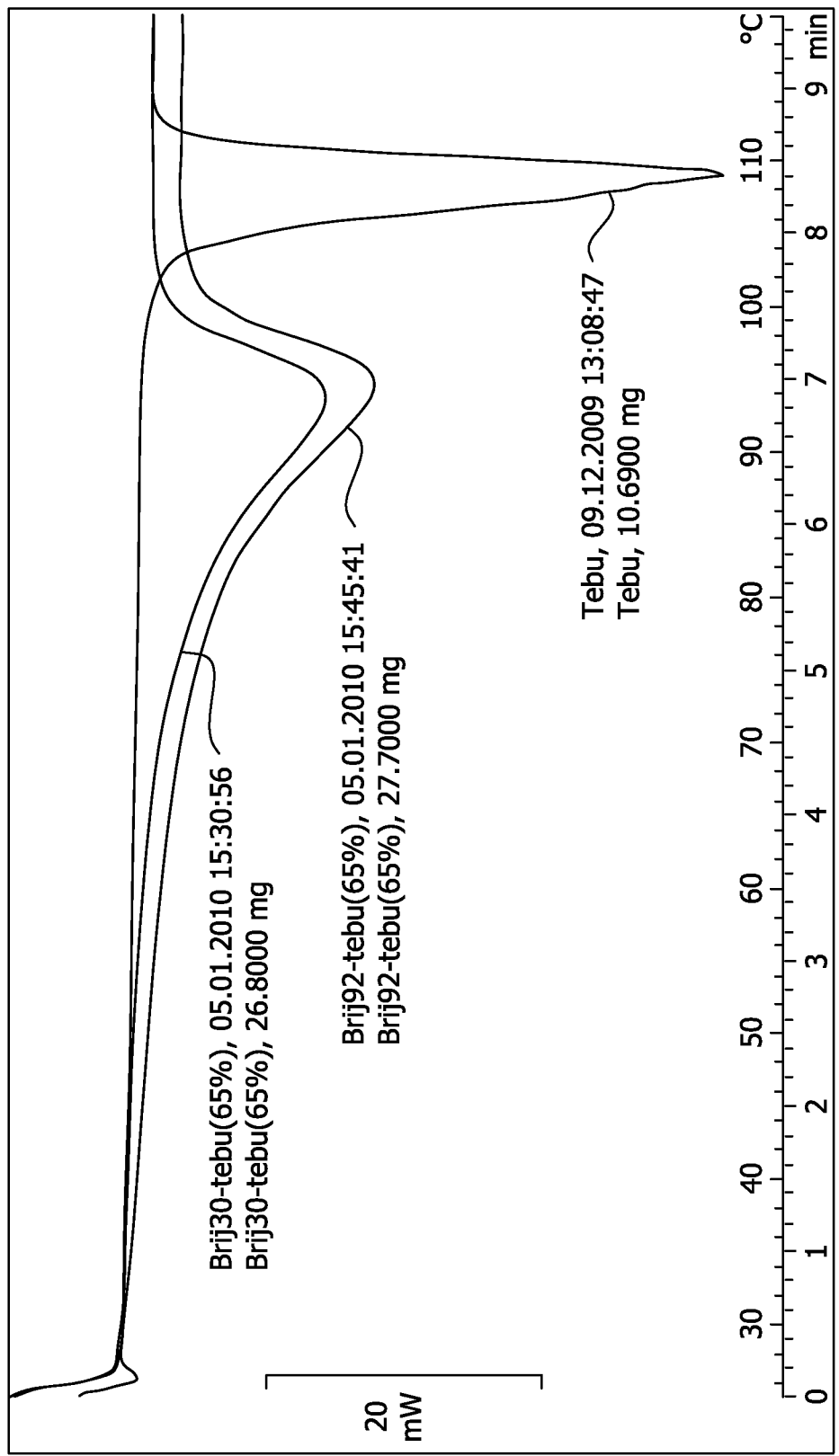
FIG. 9 is a differential scanning calorimetry curve of heat flux versus temperature for tebuconazole, 40% tebuconazole in $C_{12}$ ethoxylated alcohol 2EO surfactant (BRIJ 30) and 65% tebuconazole in $C_{18}$ ethoxylated alcohol 2EO surfactant (BRIJ 92).
Figure 10:
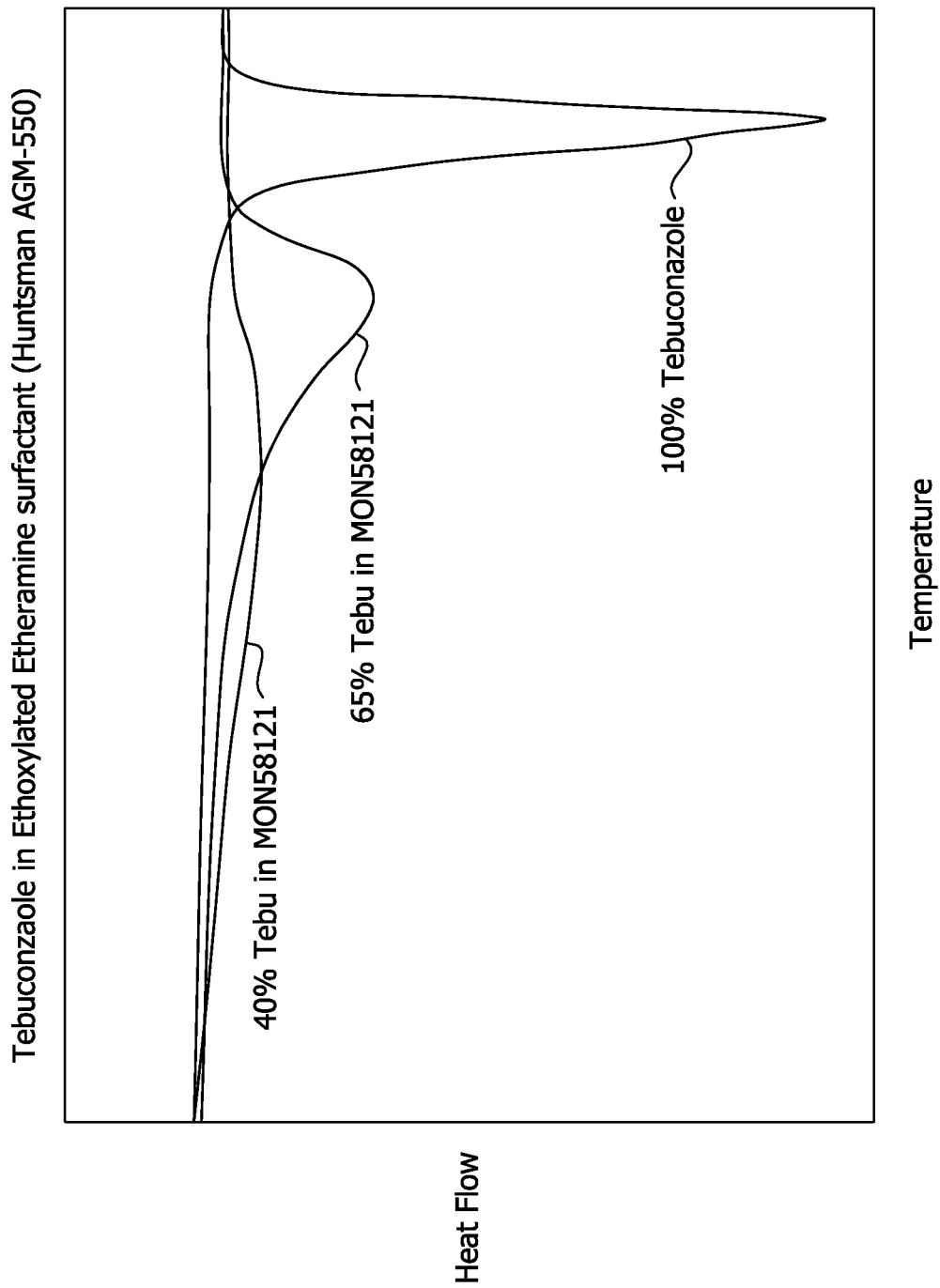
FIG. 10 is a differential scanning calorimetry curve of heat flux versus temperature for tebuconazole and 40% and 65% tebuconazole in ethoxylated etheramine surfactant (Huntsman AGM-550).
Figure 11:
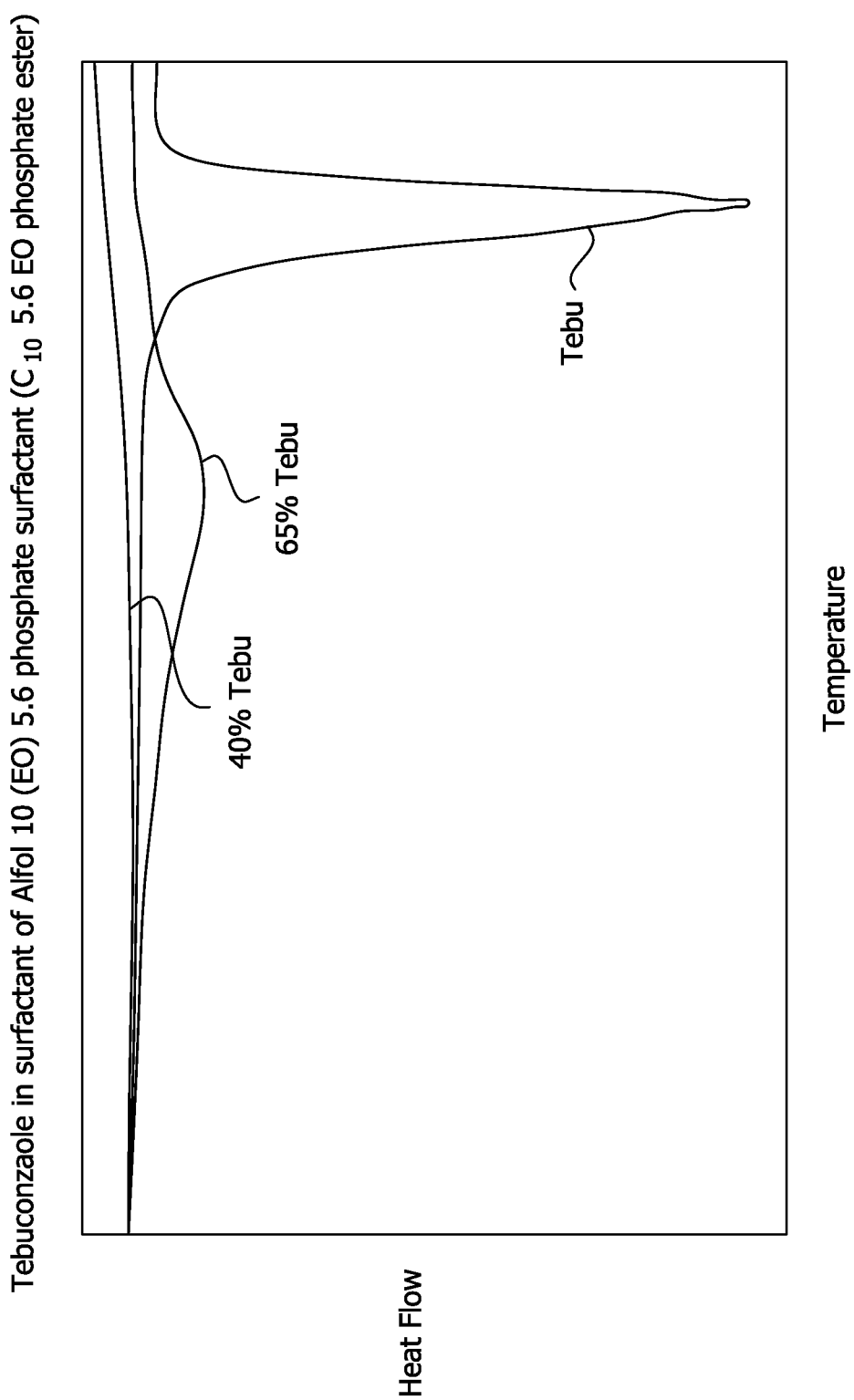
FIG. 11 is a differential scanning calorimetry curve of heat flux versus temperature for tebuconazole and 40% and 65% tebuconazole in $C_{10}$ phosphate ester 5.6 EO surfactant (ALFOL 10(EO) 5.6).
Figure 12:
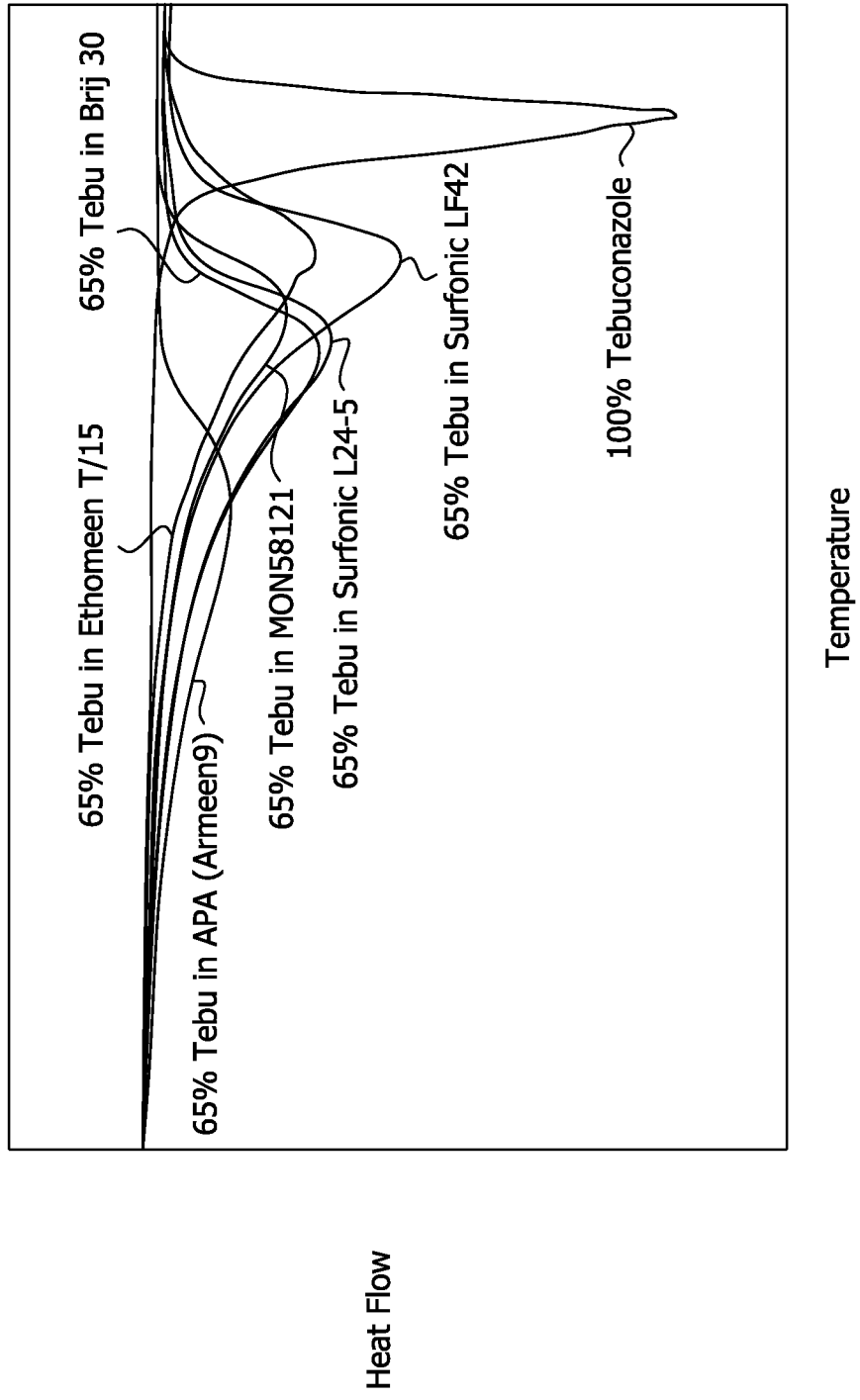
FIG. 12 is a differential scanning calorimetry curve of heat flux versus temperature for tebuconazole and 65% tebuconazole in each of $C_{6-9}$ amidopropyl dimethylamine surfactant (ARMEEN APA 9), $C_{12}$ ethoxylated alcohol 2EO surfactant (BRIJ 30), $C_{12-14}$ ethoxylated, propoxylated alcohol surfactant (SURFONIC FL-42), ethoxylated tallowamine 5 EO surfactant (ETHOMEEN T/15), ethoxylated etheramine surfactant (Huntsman AGM-550) and $C_{12-14}$ alcohol 5 EO surfactant (SURFONIC L24-5).
Figure 13:
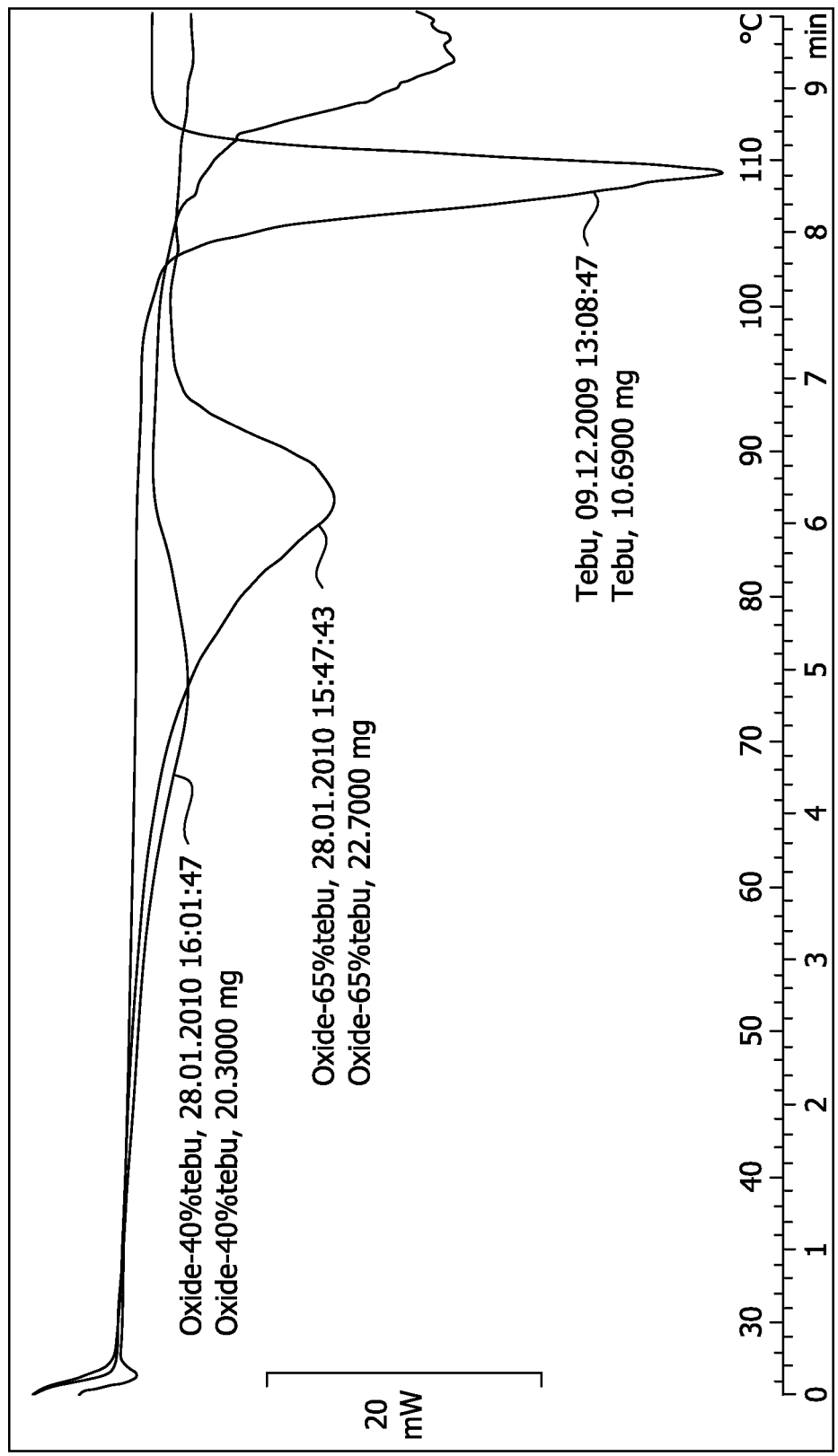
FIG. 13 is a differential scanning calorimetry curve of heat flux versus temperature for tebuconazole and 40% and 65% tebuconazole in ethoxylated isotridecyl-oxypropylamine N-oxide surfactant containing 80% water.

The present invention is generally directed to compositions for improving plant health, the compositions comprising at least one water-soluble pesticide, at least one water-insoluble agrochemical compound, and a surfactant component, wherein the water-insoluble agrochemical is predominantly present as a solute in the surfactant component. Suspension concentrate (SC), microemulsion concentrate (ME), solution concentrate (SL) and dry concentrate (dry) compositions are within the scope of the present invention.

In accordance with the present invention, it has been discovered that water-insoluble agrochemical compounds can be dissolved at high active loading into surfactants in the absence of an organic solvent. That discovery provides for high load SC compositions comprising water-soluble pesticides and water-insoluble agrochemicals in the absence of organic solvents. The discovery further provides for ME compositions having reduced organic solvent content and higher water-soluble pesticide and water-insoluble agrochemical loading than prior art compositions. It has been further discovered that in some embodiments, essentially all of the water-insoluble agrochemical may be present as a solute in the surfactant component thereby forming clear SL compositions in the absence of an effective amount of an organic solvent, such as a substantially water-immiscible organic solvent. It has yet been further discovered that the present invention enables for the preparation of dry compositions wherein the water-insoluble agrochemical is solubilized into the surfactant and homogeneously distributed into the solid water-soluble pesticide matrix.

Advantages of the compositions of the present invention are increased compatibility of mixtures of two or more pesticide active compounds and a more uniform coverage of the pesticide active compounds on targeted plant surfaces. Improvements over conventional technology include higher loadings of water-soluble pesticide active compounds in systems containing two or more pesticide or agrochemical active compounds and the elimination or reduction of the need for an organic solvent.

In the compositions of the present invention, the water-insoluble agrochemical is isolated as a solute predominantly in a matrix formed by the surfactant thereby inhibiting degradation of the agrochemical such as by hydrolysis through exposure to the water carrier phase of the water-soluble pesticide. It is believed, without being bound to any particular theory, that the solubilized water-insoluble agrochemical(s) is encased by the lipophilic portions of the surfactant molecule in a matrix wherein the hydrophilic portions of the surfactant molecules are oriented to the aqueous carrier phase. The water-insoluble agrochemical is therefore insulated from contact with the water in the aqueous carrier phase.

For purposes of the present invention, a "microemulsion" refers to a liquid system in which a surfactant component is dispersed within a continuous aqueous phase. A substantially water-immiscible organic solvent is used to attain appropriate stability of the microemulsion. Droplets or micro-droplets are formed comprising the surfactant phase (containing at least one dissolved water-insoluble agrochemical compound) wherein the droplet size is about 5 to 200 nm, which is smaller than the wavelength of visible light (about 400 nm). Microemulsions are clear and thermodynamically stable.

As used herein "dry" refers to solid compositions such as granules, flakes or powder.

As used herein "suspension" refers to a system having an aqueous carrier phase wherein a first portion of the water-insoluble agrochemical is dissolved in a surfactant and a second portion of the water-insoluble agrochemical is suspended as solid particles in the aqueous carrier phase.

As used herein, agrochemicals are defined as chemicals that improve the production of agronomic plants. Agrochemicals include, without limitation, pesticides, fertilizers, nutrients, plant growth activators and systemically acquired resistance ("SAR") inducers, and combinations and mixtures thereof, and derivatives thereof.

Pesticides include, without limitation, acaricides, algicides, antifeedants, avicides, bactericides, bird repellants, chemosterilants, fungicides, herbicides, insect attractants, insect repellants, insecticides, mammal repellants, mating disruptors, molluscicides, nematicides, plant growth regulators, rodenticides, safeners, synergists, virucides, and combinations and mixtures thereof, and derivatives thereof.

For purposes of the present invention, agrochemical derivatives include salts, esters, or compounds which are converted to the agrochemical in plant tissues or which otherwise provide the active agrochemical or anions or cations thereof. In some embodiments, derivatives include agrochemical salts and esters. Further, "agriculturally acceptable salts or esters" are generally defined as salts or esters that provide desired solubility, bioefficacy, toxicity and environmental safety characteristics for the intended use. Typical cations for the agrochemical salts of the present invention include, without restriction, sodium, potassium, monoethanolamine (MEA), dimethylamine (DMA), isopropylamine (IPA), trimethylsulfonium (TMS) diethylammonium (DEA), triethanolamine (TEA), diglycolamine (DGA), lithium, and ammonium. Typical anions for the formation of agrochemical salts include, without restriction, chlorine, bromine, fluorine, and acetate. Typical esters include, without restriction, methyl, ethyl, propyl, isopropyl, butyl, isobutyl, pentyl, isooctyl, ethylhexyl, ethoxyethyl, butoxyethyl, butoxypropyl and octanoate. Also included within the scope of the agrochemical derivatives of the present invention are resolved isomers of agrochemicals, for example and without restriction, the herbicides glufosinate-P, mecoprop-P, fluazifop-P, quizalofop-P and S-metolachlor. As used herein, where an agrochemical is referred to by name, it is understood that derivatives and resolved isomers are within the scope of that agrochemical.

The active compound concentrations of agrochemicals, such as pesticides, can be referred to on an "active equivalent" basis, meaning the theoretical yield of a parent pesticide compound from a active compound that has been formulated as a derivative, such as a salt. Active equivalent basis can refer to acid equivalent ("a.e."), cation equivalent ("c.e."), free acid or free base. Pesticide active compound concentrations can alternatively be referred to on an active ingredient ("a.i.") basis, meaning the weight of the pesticide derivative. As an example, 500 grams per liter of the isopropylammonium salt of glyphosate on an a.i. basis corresponds to about 370 grams per liter glyphosate on an a.e. basis. Unless otherwise specified, pesticide active compound concentrations are referred to on an active equivalent basis.

In the context of the present invention, "predominantly" means that at least 50%, preferably at least about 75%, more preferably at least about 90%, more preferably at least about 95%, and more preferably at least about 99%, of the specified component meets the specified conditions. Accordingly, in the plant health compositions of the present invention, the water-insoluble agrochemical is predominantly present as a solute in the surfactant component, that is, at least 50% by weight, at least about 75% by weight, at least about 90% by weight, at least about 95% by weight, or even at least about 99% by weight of the water-insoluble agrochemical is present as a solute in the surfactant component. In some embodiments, essentially all of the water-insoluble agrochemical is present as a solute in the surfactant component.

As used herein, the terms "agronomic plant" refers to a plant of which a part or all is, or has been, harvested or cultivated on a commercial scale, or serves as an important source of feed, food, fiber or other chemical compounds.

In some aspects of the present invention, the compositions and methods provide improved agronomic plant health benefits including increased resistance of plants to biotic pressure (e.g., insects, fungi, viruses, nematodes, and other pathogens) or abiotic pressure (e.g., drought, cold and other environmental stresses), increased yield and improved agronomic plant quality.

Plant health benefits of the present invention can include improved rate of emergence, crop yields, vigor, protein content, more developed root system (improved root growth), tillering increase, increase in plant height, bigger leaf blade, fewer dead basal leaves, stronger tillers, greener leaf color, pigment content, photosynthetic activity, reduced need for fertilizer, fewer seeds needed, more productive tillers, earlier flowering, early grain maturity, increased shoot growth, increased plant stand and early germination.

When the plant health benefits of the compositions and methods are described herein as "increasing the yield" of a plant, the yield of a product of the plant is increased by a measurable amount over the yield of the same product of the plant produced under the same conditions, but without the application of the subject composition. It is preferred that the yield be increased by at least about 0.5%, more preferably at least about 1%, more preferably at least about 2%, more preferably at least about 3%, and yet more preferably at least about 4%, or more.

When the plant health benefits of the compositions and methods are described herein as "increasing the vigor" of an agronomic plant, the vigor rating, or the plant weight, or the plant height, or the plant canopy, or the visual appearance, or any combination of these factors, is increased or improved by a measurable or noticeable amount over the same factor of the plant produced under the same conditions, but without the application of the subject composition.

In addition to plant health benefits provided by the compositions of the present invention, compositions of the present invention comprising a herbicide are effective for controlling undesirable plants (weeds) growing in a field of the agronomic plants that compete with the agronomic plants for essential resources such a soil nutrients, water and sunlight. Controlling the undesirable plants therefore provides for increased agronomic plant yield.

In some embodiments of the present invention, the compositions provide improved plant health for agronomic plants having a transgenic event that confers tolerance to a particular herbicide or combination of herbicides, increased disease resistance, enhanced tolerance to stress and/or enhanced yield.

In some other embodiments of the present invention, the compositions provide improved plant health for plants that do not have a transgenic event that confers tolerance to a particular herbicide or combination of herbicides, but the plants are otherwise not susceptible to damage from the herbicide.

Improved plant health can be realized by treating the foliage and/or seeds of the agronomic plant with an effective amount of the compositions of the present invention whether or not the plant is under stress from pests or pathogens against which the plant health agents are known to have activity. It is believed that increases in plant health can be shown to take place even when the treated seed and/or plant are under no pest or pathogen pressure, for example, as in tests where germination, emergence, and plant growth take place under substantially sterile conditions.

In some embodiments of the present invention, the compositions of the present invention can be applied preemergence or postemergence to agronomic plants, or by soil treatment, such as by spraying or dusting. In other embodiments, the compositions of the present invention can be applied to plant propagation material prior to planting, such as seeds, cuttings, sets, rhizomes, tubers, meristem tissue, single and multiple plant cells, or any other plant tissue from which a complete plant can be obtained, the present compositions and methods provide the advantages of improved plant health without the added effort and expense of cultivation or in-field application after germination.

Examples of agronomic plants of the present invention include corn, cereals, including wheat, barley, rye, rice, vegetables, clovers, legumes (including beans and peas), alfalfa, sugar cane, sugar beets, tobacco, cotton, rapeseed (canola), sunflower, safflower, peanuts, and sorghum. Agronomic plants include hybrids, inbreds, and transgenic or genetically modified plants having specific traits or combinations of traits including, without limitation, herbicide tolerance (e.g., tolerance to glyphosate, glufosinate, dicamba, etc.), *Bacillus thuringiensis* (Bt), high oil, high lysine, high starch, nutritional density, and drought resistance. Preferred agronomic plants include corn, cotton, wheat and soybeans.

Water-Soluble Pesticides

The water-soluble pesticides of the present invention can comprise, without limitation, herbicides, fungicides, insecticides, nematicides, virucides, acaricides, algicides, bactericides, plant growth stimulants, and combinations and mixtures thereof. All reference to pesticides hereinafter includes derivatives thereof including salts and esters.

For purposes of the present invention, water-soluble pesticides and/or derivatives thereof have a water solubility of at least about 0.5 grams per liter ("g/L") or at least about 1 g/L at 25° C. For compositions of the present invention, water-soluble pesticides and/or derivatives thereof preferably have a solubility in the composition surfactant component of less than about 5% w/w at 25° C.

In some preferred embodiments of the present invention, the water-soluble pesticide comprises at least one water-soluble herbicide. In some preferred embodiments, the water-soluble herbicides are selected from acetyl CoA carboxylase (ACCase) inhibitors, acetolactate synthase (ALS) or acetohydroxy acid synthase (AHAS) inhibitors, photosystem II inhibitors, photosystem I inhibitors, protoporphyrinogen oxidase (PPG or Protox) inhibitors, carotenoid biosynthesis inhibitors, enolpyruvyl shikimate-3-phosphate (EPSP) synthase inhibitor, glutamine synthetase inhibitor, dihydropteroate synthetase inhibitor, mitosis inhibitors, synthetic auxins, auxin transport inhibitors, nucleic acid inhibitors, and certain unclassified herbicides.

Examples of suitable water-soluble herbicides include, without restriction, 2,4-D salts, 2,4-DB salts, acifluorfen, alloxydim, aminocarbazone, amidosulfuron, aminopyralid, amitrole, asulam, azimsulfuron, beflubutamid, benazolin salts, bentazon-sodium, bensulfuron-methyl, bispyribac-sodium, bromacil, carbetamide, carfentrazone-ethyl, chlorimuron-ethyl, chlorsulfuron, cinosulfuron, clomazone, clopyralid, dalapon, dazomet, dicamba, dichlormid, dichlorprop, diclofop, diclopyr, difenzoquat, deflufenzopyr salts, dimethachlor, dimethenamid, dimethipin, diquat dibromide, DNOC, DSMA, endothall, exasulfuron, flazasulfuron, floramsulfuron, florasulam, flucarbazone-sodium, flupropanate, fluroxypyr, fomesafen, foramsulfuron, fosamine, glyphosate, glufosinate, glufosinate-P, hexazinone, imazamethabenz-methyl, imazamox, imazapic-ammonium, imazapyr, imazaquin-ammonium, imazethapyr-ammonium, iodosulfuron, MCPA salts, MCPB-sodium, mecoprop, mecoprop-P, mesotrione, metam, metamitron, metham, metosulam, metribuzin, metsulfuron-methyl, molinate, monolinuron, MSMA, water soluble salts of oleic acid, naptalam salts, oxasulfuron, paraquat dichloride, water-soluble salts of pelargonic acid, penoxsulam, picloram salts, prometon, propoxycarbazone-sodium, prosulfuron, pyrithiobac-sodium, quinmerac, rimsulfuron, sethoxydim, sulfosulfuron, TBA, tebuthiuron, terbacil, thifensulfuron-methyl, tralkoxydim, triasulfuron, tribenuron-methyl, triclopyr, and trifloxysulfuron, and mixtures thereof.

Some preferred water-soluble herbicides include ALS or AHAS inhibitors, EPSP inhibitors, glutamine synthetase inhibitors, synthetic auxins, Photosystem I inhibitors, ACCase inhibitors, and combinations thereof. More particularly, some preferred water-soluble herbicide can be selected from (i) synthetic auxins including MCPA, 2,4-Dichlorophenoxyacetic acid (2,4-D), aminopyralid, clopyralid, dicamba, fluroxypyr, mecoprop, mecoprop-P, picloram and triclopyr; (ii) the Photosystem I inhibitors diquat and paraquat; (iii) the EPSP inhibitor glyphosate; (iv) the glutamine synthetase inhibitor glufosinate (and glufosinate-P); (v) ALS or AHAS inhibitors including imazamethabenz-m, imazamox, imazapic, imazapyr, imazaquin and imazethapyr; (vi) ACCase inhibitors including diclofop and sethoxydim; and combinations thereof.

In some embodiments of the present invention, the water-soluble herbicide is glyphosate, dicamba, 2,4-D, MCPA, glufosinate and diclofop. In particularly preferred embodiments, the water-soluble herbicide is glyphosate.

For embodiments where the herbicide is glyphosate, monobasic, dibasic, and tribasic salts can be made, but, as is known in the art, it is generally preferred to formulate and apply glyphosate substantially in the form of a monobasic salt, for example, as a mono-(organic ammonium) salt such as the monoisopropylammonium (IPA) salt or the mono potassium (K) salt, or as either monobasic or dibasic ammonium ($NH_4$) salt. Other suitable glyphosate salts include sodium (Na), monoethanolamine (MEA), diethanolamine (DEA), triethanolamine (TEA), trimesium (TMS), n-propylamine, methylamine, ethylamine, hexamethylenediamine, dimethylamine (DMA), and mixtures thereof. In dry compositions, the monoammonium and sodium salts, or mixtures thereof, are preferred. The monobasic salts can vary from an exact 1:1 countercation to glyphosate ratio, while the ammonium salts can comprise a ratio of $NH_4^+$ ion to glyphosate of 1:1 to 1.8:1.

In other embodiments, the compositions comprise glyphosate and at least one water-soluble co-herbicide selected from one or more of ALS or AHAS inhibitors, a glutamine synthetase inhibitor, synthetic auxins and ACCase inhibitors. More particularly, in some co-herbicide embodiments of the present invention, the water-soluble co-herbicide combination includes glyphosate and glufosinate; glyphosate and dicamba and/or 2,4-D; glyphosate and one or more of imazamethabenz-m, imazamox, imazapic, imazapyr, imazaquin and imazethapyr; glyphosate and one or both of diclofop and sethoxydim; glyphosate, glufosinate and dicamba and/or 2,4-D; glyphosate, glufosinate, and one or more of imazamethabenz-m, imazamox, imazapic, imazapyr, imazaquin and imazethapyr; glyphosate, glufosinate, dicamba and/or 2,4-D, and one or more of imazamethabenz-m, imazamox, imazapic, imazapyr, imazaquin and imazethapyr; glyphosate, dicamba and/or 2,4-D, glufosinate, and one or more of imazamethabenz-m, imazamox, imazapic, imazapyr, imazaquin and imazethapyr; glyphosate, glufosinate and one or more of diclofop and sethoxydim; glyphosate, dicamba and/or 2,4-D, and one or more of diclofop and/or sethoxydim; glyphosate and one or more of imazamethabenz-m, imazamox, imazapic, imazapyr, imazaquin and imazethapyr, and one or more of diclofop and sethoxydim; glyphosate, glufosinate, dicamba and/or 2,4-D, and one or more of diclofop and sethoxydim; glyphosate, glufosinate, and one or more of imazamethabenz-m, imazamox, imazapic, imazapyr, imazaquin and imazethapyr, and one or more of diclofop and sethoxydim; glyphosate, glufosinate, dicamba and/or 2,4-D, one or more of imazamethabenz-m, imazamox, imazapic, imazapyr, imazaquin and imazethapyr, and one or more of diclofop and sethoxydim; or glyphosate, dicamba and/or 2,4-D, glufosinate, one or more of imazamethabenz-m, imazamox, imazapic, imazapyr, imazaquin and imazethapyr, and one or more of diclofop and sethoxydim.

For embodiments of the present invention encompassing a water-soluble herbicide, the target plants preferably have a transgenic event that confers tolerance to the water-soluble herbicide, or the plants are generally not susceptible to damage from the water-soluble herbicide.

In some other embodiments of the present invention, the water-soluble pesticide comprises fungicides, insecticides, nematicides, virucides, acaricides, algicides, bactericides, plant growth regulators, plant growth activators, systemically acquired resistance ("SAR") inducers, and combinations and mixtures thereof.

In some embodiments of the present invention, the water-soluble pesticide comprises a fungicide. Water-soluble fungicides within the scope of the present invention include, but are not limited to, metalaxyl, metalaxyl-M, oxadixyl, hymexazol, oxycarboxin, orysastrobin, blasticidin-S, kasugamycin, streptomycin, propamocarb, triflumizole, polyoxins, pyroquilon, copper sulphate, potassium hydrogen carbonate and hymexazol.

In some other embodiments of the present invention, the water-soluble pesticide comprises an insecticide, acaricide and/or nematicide. Water-soluble insecticides within the scope of the present invention include, but are not limited to, carbamates such as oxamyl (also classified as an acaricide and nematicide) and methomyl (also classified as an acaricide); neonicotinoids such as nitenpyram; organophosphates such as acephate; dimethoate (also classified as an acaricide); and methyl bromide and other alkyl halides, In some other embodiments of the present invention, the water-soluble pesticide comprises an algicide. Water-soluble algicides within the scope of the present invention include, but are not limited to, benzalkonium chloride, copper sulfate and nabam.

In some other embodiments of the present invention, the water-soluble pesticide comprises a bactericide. Water-soluble bactericides within the scope of the present invention include, but are not limited to, oxytetracycline.

In some other embodiments of the present invention, the water-soluble pesticide comprises a plant growth regulator. Plant growth regulators within the scope of the present invention include lipo-chito oligosaccharides (LCO) that stimulate seed germination and seedling emergence in seed plants and the emergence of sprouts in tuber plants. Other plant growth regulators include dikegulac.

In some other embodiments of the present invention, water-soluble herbicides can be combined with other water-soluble pesticides including fungicides, insecticides, nematicides, virucides, acaricides, algicides, bactericides, plant growth regulators, plant growth activators, systemically acquired resistance ("SAR") inducers, and combinations and mixtures thereof.

In dry concentrate composition embodiments of the present invention, a total water-soluble pesticide concentration of from about 5 to about 80 wt % is preferred, more preferably from about 25 to about 80 wt %, still more preferably from about 50 to about 80 wt % on an active equivalent basis.

Dry concentrate compositions of the invention comprising glyphosate may comprise glyphosate in a concentration of greater than 25% by weight acid equivalent of the composition, such as from about 25% to about 80% by weight acid equivalent of the composition, such as from about 50% to about 80% by weight acid equivalent of the composition.

In ME and SC embodiments of the present invention, a total water-soluble pesticide concentration of from about 50 to about 600, from about 100 to about 600, from about 200 to about 600, from about 300 to about 600, from about 400 to about 600 g/L, or from about 500 to about 600 g active equivalent/L is preferred. Suitable concentrations include 50, 100, 150, 200, 250, 300, 350, 400, 450, 500, 550 or even 600 g/L. In another measure, a total water-soluble pesticide concentration of from about 5 to about 50, such as from 25 to about 50, percent by weight (wt %) on an active equivalent basis is preferred.

In ME and SC embodiments wherein the water-soluble pesticide comprises glyphosate, the concentration of the glyphosate component is preferably at least 300, 400 or 500 grams acid equivalent per liter ("g a.e./L"). A glyphosate concentration range of from 300 to 650 g a.e./L is preferred. Suitable glyphosate concentration ranges include from 400 to 650, from 450 to 650 from 500 to 650, from 300 to 600, from 400 to 600, from 450 to 600 or from 500 to 600 g a.e./L.

Water-Insoluble Agrochemicals

Water-insoluble agrochemical compounds within the scope of the present invention include, without limitation, herbicides, fungicides, insecticides, nematicides, virucides, acaricides, algicides, bactericides, plant growth regulators, plant growth activators, SAR inducers, and combinations and mixtures thereof.

For purpose of the present invention, water-insoluble agrochemical compounds have a water solubility of less than about 1 g/L or less than about 0.5 g/L per liter at 25° C. For compositions of the present invention, water-insoluble agrochemical compounds have a solubility in the composition surfactant component of greater than about 5% w/w at 25° C.

The water-insoluble agrochemicals of the present invention preferably have a molecular weight of from about 100 to about 600 grams per mole, more preferably from about 200 to about 500 grams per mole, more preferably from about 250 to about 450 grams per mole. The water-insoluble agrochemicals preferably have a melting point of from about 45° C. to about 110° C., such as from about 50° C. to about 110° C., from about 50° C. to about 100° C., from about 50° C. to about 90° C., from about 50° C. to about 80° C., or even from about 50° C. to about 70° C. However, in some embodiments, the water-insoluble agrochemical is a liquid at about 25° C.

Water-insoluble fungicides within the scope of the present invention include, without limitation, those defined by the genera triazoles (e.g., ipconazole and tebuconazole), strobilurins (e.g. picoxystrobin and pyraclostrobin), acylamino acids (e.g. benalaxyl, benlaxyl-M, metalaxyl and metalaxyl-M), pyrimidines (e.g., bupirimate), pyridines (e.g., pyribencarb), arylphenyl ketones (e.g., metrafenone), amides (e.g., diclocymet), benzanilides (e.g., benodanil), imidazoles (e.g., cyazofamid), dinitrophenols (e.g., dinocap), morpholines (e.g., dodemorph), phenylsulfamides (e.g., dichlofluanid) and organophosphorus fungicides (e.g., pyrazophos).

Examples of fungicides include benalaxyl, benlaxyl-M, furalaxyl, metalaxyl, metalaxyl-M, bupirimate, dimethirimol, ethirimol, ametoctradin, octhilinone, oxolinic acid, benomyl, carbendazim, fuberidazole, thiabendazole, thiophanate-methyl, diethofencarb, zoxamide, pencycuron, fluopicolide, diflumetorim, benodanil, flutolanil, mepronil, fenfuram, carboxin, bixafen, fluxapyroxad, furametpyr, isopyrazam, penflufen, penthiopyrad, sedaxane, boscalid, fluopyram, thifluzamide, pyribencarb, fenamidone, famoxadone, azoxystrobin, dimoxystrobin, enestrobin, fluoxastrobin, kresoxim-methyl, metominostrobin, picoxystrobin, pyraclostrobin, pyrametostrobin, pyraoxystrobin, trifloxystrobin, cyazofamid, amisulbrom, fluazinam, binapacryl, dinocap, meptyldinocap, ferimzone, fentin acetate, fentinchloride, fentin hydroxide, silthiofam, cyprodinil, mepanipyrim, pyrimethanil, oxytetracycline, quinoxyfen, fludioxonil, fenpiclonil, vinclozolin, iprodione, procymidone, chlozolinate, isoprothiolane, edifenphos, iprobenfos, pyrazophos, biphenyl, dicloran, quintozene, tecnazene, tolclofos-methyl, etridiazole, chloroneb, iodocarb, prothiocarb, dimethomorph, flumorph, mandipropamid, benthiavalicarb-isopropyl, iprovalicarb, valifenalate, *Bacillus Subtillis* strain QST 713, imazalil, oxpoconazole, pefurazoate, prochloraz, triforine, pyrifenox, fenarimol, nuarimol, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimefon, triadimenol, triticonazole, aldimorph, dodemorph, fenpropimorph, tridemorph, fenpropidin, piperalin, spiroxamine, fenhexamid, naftifine, terbinafine, fenhexamid, validamycin, phthalide, tricyclazole, diclocymet, carpropamid, fenoxanil, bordeaux mixture, copper hydroxide, copper oxychloride, cupric ammonium carbonate, cuprous oxide, sulphur, cufraneb, ferbam, mancozeb, maneb, propineb, thiram, zineb, ziram, metiram, captafol, captan, folpet, chlorothalonil, dichlofluanid, tolylfluanid, dodine, guazatine, iminoctadine, anilazine, dithianon, acibenzolar-S-methyl, probenazole, flutianil, isotianil, tiadinil, cymoxanil, flusulfamide, metrafenone, pyriofenone, triazoxide, fosetyl-aluminium, cyflufenamid, tecloftalam (bactericide), diclomezine, proquinazid, tebufloquin, ethaboxam and methasulfocarb. Preferred water-insoluble fungicides include benalaxyl, benlaxyl-M, dodemorph acetate, flutolanil, ipconazole, kresoxim-methyl, metconazole, picoxystrobin, pyraclostrobin, and tebuconazole.

Water-insoluble insecticides within the scope of the present invention include, without limitation, those defined by the genera organophosphorus, insect growth regulators (such as chitin synthesis inhibitors, juvenile hormone mimics, and moulting hormones, inhibitors and mimics), pyrethroids, phthalimides, pyrazoles, organochlorines, carbamates and nicotinoids. Examples of water-insoluble insecticides include clofentezine, diflovidazin, hexythiazox, etoxazole, B.t. var. *aizawai*, B.t. var. *israelensis*, B.t. var. *kurstaki*, B.t. var. *sphaericus*, B.t. var. tenebrionensis, Bt crop proteins: Cry1Ab, Cry1Ac, Cry1Fa, Cry2Ab, mCry3A, Cry3Ab, Cry3Bb, Cry34/35Ab1, diafenthiuron, azocyclotin, cyhexatin, fenbutatin oxide, propargite, tetradifon, chlorfenapyr, tralopyril, bensultap, cartap hydrochloride, thiocyclam, thiosultap-sodium, bistrifluron, chlorfluazuron, diflubenzuron, flucycloxuron, flufenoxuron, hexaflumuron, lufenuron, novaluron, noviflumuron, teflubenzuron, triflumuron, buprofezin, cyromazine, chromafenozide, halofenozide, methoxyfenozide, tebufenozide, amitraz, alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fonofos, fosthiazate, imicyafos, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-ethyl, profenofos, propaphos, pPropetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, hydramethylnon, acequinocyl, fluacrypyrim, fenazaquin, fenpyroximate, flufenerim, pyridaben, pyrimidifen, tebufenpyrad, tolfenpyrad, rotenone, indoxacarb, metaflumizone, spirodiclofen, spiromesifen, spirotetramat, cyenopyrafen, chlorantraniliprole, cyantraniliprole, flubendiamide, pyrifluquinazon, alpha-endosulfan, chlordane, endosulfan, acetoprole, ethiprole, fipronil, pyrafluprole, pyriprole, DDT, methoxychlor, acrinathrin, allethrin, allethrind-cis-trans, allethrind-trans, alpha-cypermethrin, beta-cyfluthrin, beta-cypermethrin, bifenthrin, bioallethrin, bioallethrin S-cyclopentenyl, bioresmethrin, cycloprothrin, cyfluthrin, cyhalothrin, cypermethrin, cyphenothrin [(1R)-trans-isomers], deltamethrin, dimefluthrin, empenthrin [(EZ)-(1R)-isomers], esfenvalerate, etofenprox, fenpropathrin, fenvalerate, flucythrinate, flumethrin, gamma-cyhalothrin, lambda-yhalothrin, meperfluthrin, metofluthrin, permethrin, phenothrin [(1R)-trans-isomer], prallethrin, profluthrin, protrifenbute, resmethrin, silafluofen, tau-fluvalinate, tefluthrin, tetramethrin, tetramethrin [(1R)-isomers], tetramethylfluthrin, theta-cypermethrin, tralomethrin, transfluthrin, zeta-cypermethrin, acetamiprid, clothianidin, dinotefuran, imidacloprid, nitenpyram, sulfoxaflor, thiacloprid, thiamethoxam, nicotine, spinetoram, spinosad, abamectin, emamectin benzoate, lepimectin, milbemectin, hydroprene, kinoprene, methoprene, fenoxycarb, pyriproxyfen, chloropicrin, sulfuryl fluoride, pymetrozine, flonicamid, azadirachtin, amidoflumet, benclothiaz, benzoximate, bifenazate, chinomethionat, cryolite, cyflumetofen, cymiazole, dicofol, fluensulfone, isofenphos-methyl, plifenate and pyridalyl.

Water-insoluble herbicides within the scope of the present invention include, but are not limited to, clodinafop-propargyl, cyhalofop-butyl, diclofop-methyl, fenoxaprop-P-ethyl, fluazifop-P-butyl, haloxyfop-methyl, haloxyfop-R-methyl, metamifop, propaquizafop, quizalofop-P-ethyl, butroxydim, clethodim, cycloxydim, profoxydim, tepraloxydim, pinoxaden, imazapic, imazaquin, imazethapyr, pyribenzoxim, pyriftalid, pyriminobac-methyl, bencarbazone, ipfencarbazone, thiencarbazone, cyclosulfamuron, ethametsulfuron-methyl, ethoxysulfuron, flucetosulfuron, flupyrsulfuron-methyl-Na, halosulfuron-methyl, imazosulfuron, iodosulfuron, mesosulfuron, metazosulfuron, nicosulfuron, orthosulfamuron, primisulfuron-methyl, propyrisulfuron, pyrazosulfuron-ethyl, sulfometuron-methyl, triflusulfuron-methyl, tritosulfuron, cloransulam-methyl, diclosulam, flumetsulam, penoxsulam, pyrimisulfan, pyroxsulam, desmedipham, phenmedipham, pyrazon (chloridazon), ametryne, atrazine, cyanazine, desmetryne, dimethametryn, eglinazine-ethyl, proglinazine-ethyl, prometryne, propazine, simazine, simetryne, terbumeton, terbuthylazine, terbutryne, trietazine, lenacil, pentanochlor, propanil, chlorobromuron, chlorotoluron, chloroxuron, dimefuron, diuron, ethidimuron, fenuron, fluometuron, isoproturon, isouron, linuron, methabenzthiazuron, metobromuron, metoxuron, neburon, siduron, bentazon, bromofenoxim, bromoxynil, ioxynil, pyridafol, pyridate, diquat, paraquat, bifenox, chlomethoxyfen, chlornitrofen, ethoxyfen-ethyl, fluoroglycofen-ethyl, halosafen, lactofen, oxyfluorfen, cinidon-ethyl, flumiclorac-pentyl, flumioxazin, oxadiargyl, oxadiazon, pentoxazone, fluazolate, pyraflufen-ethyl, saflufenacil, benzfendizone, butafenacil, fluthiacet-methyl, thidiazimin, azafenidin, sulfentrazone, flufenpyr, flufenpyr-ethyl, profluazol, pyraclonil, norflurazon, diflufenican, picolinafen, fluridone, flurochloridone, flurtamone, isoxachlortole, isoxaflutole, benzofenap, pyrazolynate, pyrazoxyfen, bicyclopyrone, sulcotrione, tefuryltrione, tembotrione, topramezone, benzobicyclon, aclonifen, pyrasulfotole, sulfosate, bialaphos (bilanaphos), propham, propyzamide (pronamide), tebutam, DCPA (chlorthal-dimethyl), benefin (benfluralin), butralin, dinitramine, ethalfluralin, oryzalin, pendimethalin, trifluralin, amiprophosmethyl, butamiphos, dithiopyr, thiazopyr, chlorpropham, fluchloralin, prodiamine, diphenamid, naproanilide, napropamide, acetochlor, alachlor, butachlor, butenachlor, diethatyl-ethyl, metazachlor, metolachlor, pethoxamid, pretilachlor, propachlor, propisochlor, S-metolachlor, thenylchlor, fenoxasulfone, pyroxasulfone, flufenacet, mefenacet, fentrazamide, anilofos, bromobutide, cafenstrole, indanofan, piperophos, isoxaben, chlorthiamid, dichlobenil, indaziflam, flupoxam, dinoseb, dinoterb, benfuresate, ethofumesate, bensulide, butylate, cycloate, dimepiperate, EPIC, esprocarb, orbencarb, pebulate, prosulfocarb, thiobencarb (benthiocarb), tiocarbazil, triallate, vernolate, chloramben, 2,4, 5-T, 2,4-D, 2,4-DB, clomeprop, dichlorprop (2,4-DP), dichlorprop-P, MCPA, MCPA-thioethyl, picloram, aminocyclopyrachlor, quinclorac, benazolin-ethyl, naptalam, diflufenzopyr-Na, flamprop-M-isopropyl, Flamprop-M-methyl, difenzoquat, (chloro)-flurenol, cinmethylin, cumyluron, daimuron, difenzoquat, etobenzanid, methiozolin, oleic acid, oxaziclomefone, pelargonic acid, pyributicarb, ketospiradox, beflutamid and methyldymron. Preferred water-insoluble herbicides include beflutamid, clethodim, clodinafop-propargyl, dinitramine, fenxoaprop, fentrazamide, flamprop-M-isopropyl, flamprop-M-methyl, fluazifop, flurochloridone, quizalofop, indanofan, thenylchlor, and thiazopyr.

For embodiments of the present invention encompassing a water-insoluble herbicide, the target plants preferably have a transgenic event that confers tolerance to the water-insoluble herbicide, or the plants are generally not susceptible to damage from the water-insoluble herbicide.

Water-insoluble acaricides within the scope of the present invention include, without limitation, those defined by the genera bridged diphenyls, carbamates, dinitrophenols, organophosphorus, phthalimides, pyrethroids and pyrimidinamines. Examples include, but are not limited to, dicofol, dinobuton, pyrimidifen and tebufenpyrad.

Water-insoluble algicides within the scope of the present invention include, but are not limited to, dichlone.

Water-insoluble bactericides within the scope of the present invention include, but are not limited to, hydrargaphen and nitrapyrin.

Water-insoluble plant growth regulators within the scope of the present invention include, but are not limited to, cytokinin, 3-indolebutyric acid and 1-naphthaleneacetic acid, growth inhibitors such as flurenol-butyl, and growth retardants such as flurprimidol.

In other embodiments, the water-insoluble agrochemical can comprise a SAR inducer having ability to induce resistance in a plant to a disease-causing agent, including, but not limited to a virus, a bacterium, a fungus, or combinations of these agents. In addition, an SAR inducer may induce resistance to insect feeding in a plant, as defined by Enyedi et al. (1992; Cell 70: 879-886). Exemplary SAR inducers cover many structural families of compounds, but are united by their ability to induce a resistance to plant diseases and/or pest feeding. The commercial SAR inducers acibenzolar-s-methyl (available as ACTIGARD from Syngenta), harpin alpha-beta (available as PROACT from Eden Biosciences), yeast extract hydrolysate from *Saccharomyces cerevisiae* (available as KEYPLEX 350-DP from Morse Enterprises Limited, Inc. of Miami, Fla.), and Oryzemate are useful in the present invention. Activators, including the GOEMAR products are another class of SAR inducers that can also be used. In addition, ethylene, its biosynthetic precursors, or ethylene releasing compounds such as Ethrel are considered SAR inducers of utility in this context.

Examples of some water-insoluble agrochemicals within the scope of the present invention are listed in Table I below along with corresponding melting point (MP) in ° C., molecular weight (MW), water solubility (Solub.) in mg/L at 20° C., and octanol-water partition coefficient ($K_{OW}$) in $\log_{10}P$ data. Pesticide classes reported in Table I are herbicides (herb), insecticides (insec), fungicides (fung), acaricides (acar), plant growth regulators (reg) and herbicide safeners (safe).

TABLE I

| Pesticide (Class) | MP (° C.) | MW | Solub. | $K_{OW}$ |
|---|---|---|---|---|
| aclonifen (herb) | 81-82 | 264.7 | 1.4 | 4.37 |
| anilofos (herb) | 50.5-52.5 | 367.8 | 13.6 | 3.81 |
| azinophos-ethyl (insec) | 50 | 345.4 | 4-5 | 3.18 |
| beflubutamid (herb) | 75 | 355.3 | 3.3 | 4.28 |
| benalaxyl (fung) | 78-80 | 325.4 | 28.6 | 3.54 |
| benalaxyl-M (fung) | 75.5-76.5 | 325.4 | 33 | 3.67 |
| beta-cypermemethrin (insec) | 63.1-69.2 | 416.3 | 51.5 | 4.7 |
| bifenox (herb) | 84-86 | 342.1 | 0.4 | 4.5 |
| bromuconazole (fung) | 84 | 377.1 | N.R. | 3.24 |
| bupirimate (fung) | 50-51 | 316.4 | 13.1 | 3.9 |
| butafenamid (herb) | 76 | 355.3 | 3.3 | 4.28 |
| butralin (herb) | 61 | 295.3 | 0.3 | 4.93 |
| clodinafop-propargyl (herb) | 59.5 | 349.7 | 4 | 3.9 |
| coumaphos (insec) | 95 | 362.8 | 1.5 | 4.13 |
| cyflufenamid (fung) | 61.5-62.5 | 412.4 | 5.2 | 4.7 |
| dicofol (acar) | 78.5-79.5 | 370.5 | 0.8 | 4.3 |
| diethatyl-ethyl (herb) | 49-50 | 311.8 | 105 | 3.6 |
| difenoconazole (fung) | 82-83 | 406.3 | 15 | 4.4 |
| dimethametryn (herb) | 65 | 255.4 | 50 | 3.8 |
| dimethylvinphos (insec) | 69-70 | 331.5 | 0.13 | 3.12 |
| dinitramine (herb) | 98-99 | 322.2 | 1 | 4.3 |
| dinobuton (acar) | 61-62 | 326.3 | 0.1 | 3 |
| dithiopyr (herb) | 65 | 401.4 | 1.4 | 4.75 |
| dodemorph (fung) | 71 | 281.5 | <100 | 4.14 |
| dedemorph acetate (fung) | 63-64 | 341.5 | 736 | 2.52 |
| etobenzanid (herb) | 92-93 | 340.2 | 0.9 | 4.3 |
| fenoxanil (fung) | 69-72.5 | 329.2 | 30.7 | 3.53 |
| fenoxaprop-ethyl (herb) | 85-87 | 361.8 | 0.9 | 4.12 |
| fenoxaprop-P-ethyl (herb) | 89-91 | 361.8 | 0.7 | 4.58 |
| fenoxycarb (insec) | 53-54 | 301.3 | 7.9 | 4.07 |
| fentrazamide (herb) | 79 | 349.8 | 2.3 | 3.6 |
| flamprop-M-isopropyl (herb) | 72.5-74.5 | 363.8 | 12 | 3.69 |
| flamprop-M-methyl (herb) | 84-86 | 335.8 | 16 | 3 |
| flamprop-ethyl (herb) | 84-86 | 349.8 | 35 | N.R. |
| flufenacet (herb) | 76-79 | 363.3 | 56 | 3.2 |
| flumiclorac-pentyl (herb) | 88.9-90.1 | 423.9 | 0.2 | 4.99 |
| fluoroglycofen-ethyl (herb) | 65 | 447.8 | 0.6 | 3.65 |
| flurenol-butyl (reg) | 71 | 282.3 | 36.5 | 3.7 |
| flurochloridone (herb) | 40.9 (eutectic); 69.5 | 312.1 | 35.1 | 3.36 |
| fluroxypyr-methyl (herb) | 58.2-60 | 367.2 | 0.1 | 4.53 |
| flurprimidol (reg) | 93.5-97 | 312.3 | 114 | 3.34 |
| flusilazole (fung) | 53-55 | 315.4 | 45 | 3.74 |
| flutolanil (fung) | 104.7-106.8 | 323.3 | 8 | 3.17 |
| haloxyfop-ethyl (herb) | 58-61 | 433.8 | 0.6 | 4.33 |
| imazalil (fung) | 52.7 | 297.2 | 0.1 | 3.82 |
| imibenconazole (fung) | 89.5-90 | 411.7 | 1.7 | 4.94 |
| indanofan (herb) | 60-61.1 | 340.8 | 17.1 | 3.59 |
| ipconazole (fung) | 85.5-88 | 333.9 | 6.9 | 4.21 |
| isoprothiolane (fung) | 54.6-55.2 | 290.4 | 54 | 3.3 |
| kresoxim-methyl (fung) | 101.6-102.5 | 313.4 | 2 | 3.4 |
| mandipropamid (fung) | 96.4-97.3 | 411.9 | 4.2 | 3.2 |
| mefenpyr-diethyl (safe) | 50-52 | 373.2 | 20 | 3.83 |

TABLE I-continued

| Pesticide (Class) | MP (° C.) | MW | Solub. | $K_{OW}$ |
|---|---|---|---|---|
| mepronil (fung) | 91.4 | 269.3 | 8.2 | 3.66 |
| metconazole (fung) | 100-108.4 | 319.8 | 30.4 | 3.85 |
| methyldymron (herb) | 72 | 268.4 | 120 | 3.01 |
| metrafenone (fung) | 99.2-100.8 | 409.3 | 0.6 | 4.3 |
| napropamide (herb) | 74.8-75.5 | 271.4 | 7.4 | 3.3 |
| oxadiazon (herb) | 87 | 345.2 | 1 | 4.91 |
| oxyfluorfen (herb) | 85-90 | 361.7 | 0.1 | 4.47 |
| penconazole (fung) | 60.3-61 | 284.2 | 73 | 3.72 |
| picoxystrobin (fung) | 75 | 367.3 | 3.1 | 3.6 |
| prochloraz (fung) | 46.3-50.3 | 376.7 | 34.4 | 4.12 |
| propaquizafop (herb) | 66.3 | 443.9 | 0.6 | 4.78 |
| pyraclostrobin (fung) | 63.7-65.2 | 387.8 | 1.9 | 3.99 |
| pyrazophos (fung) | 51-52 | 373.4 | 4.2 | 3.8 |
| pyridaphenthion (insec) | 55.7-56.7 | 340.3 | 55.2 | 3.2 |
| pyrimidifen (herb) | 69.4 | 70.9 | 2.2 | 4.59 |
| quizalofop-ethyl (herb) | 91.7-92.1 | 372.8 | 0.3 | 4.28 |
| quizalofop-P-ethyl (herb) | 76.1-77.1 | 372.8 | 0.6 | 4.61 |
| quizalofop-P-terfuryl (herb) | 59-68 | 428.9 | 4 | 4.32 |
| silithiofam (fung) | 86.1-88.3 | 267.5 | 39.9 | 3.72 |
| tebuconazole (fung) | 105 | 307.8 | 36 | 3.7 |
| tebufenpyrad (acar) | 64-66 | 333.9 | 2.1 | 4.93 |
| tetramethrin (insec) | 68-70 | 331.4 | 1.8 | 4.6 |
| thenylchlor (herb) | 72-74 | 323.8 | 11 | 3.53 |
| thiazopyr (herb) | 77.3-79.1 | 396.4 | 2.5 | 3.89 |
| tolclofos-methyl (fung) | 78-80 | 301.1 | 1.1 | 4.56 |
| tolyfluanid (fung) | 93 | 347.3 | 0.9 | 3.9 |
| triadimefon (fung) | 82.3 | 293.8 | 64 | 3.11 |
| trifloxystrobin (fung) | 72.9 | 408.4 | 0.6 | 4.5 |

A weight ratio of water-soluble pesticide to water-insoluble agrochemical of from about 1:1 to about 100:1 is preferred, more preferably from about 1:1 to about 50:1, from about 1:1 to about 25:1, from about 1:1 to about 15:1 or from about 5:1 to about 15:1. The compositions of the present invention preferably have a total loading of water-insoluble agrochemical of from about 0.1 to about 20 wt %, from about 1 to about 20 wt %, from about 3 to about 20 wt %, from about 5 to about 20 wt %, from about 1 to about 10 wt %, from about 3 to 10 wt % or from about 5 to about 10 wt % on an active equivalent basis. Examples of water-insoluble agrochemical concentrations are 0.1, 0.5, 1, 2, 3, 4, 5, 6, 7, 8, 9, 10, 15 or even 20 wt %.

In some ME and SC concentrate embodiments of the present invention, the compositions contain at least 400 grams active equivalent per liter of a water-soluble pesticide component comprising at least one water-soluble pesticide and 0.1, 0.5, 1, 2, 3, 4, 5, 6, 7, 8, 9 or 10 wt % active equivalent of a water-insoluble agrochemical component comprising at least one water-insoluble agrochemical.

In some dry concentrate embodiments of the present invention, the compositions contain from about 5 to about 80 wt %, from about 25 to about 80 wt %, or even from about 50 to about 80 wt % active equivalent of a water-soluble pesticide component comprising at least one water-soluble pesticide and 0.1, 0.5, 1, 2, 3, 4, 5, 6, 7, 8, 9 or 10 wt % active equivalent of a water-insoluble agrochemical component comprising at least one water-insoluble agrochemical. For instance, in some embodiments of the present invention, the dry compositions comprise from 50 to 80 wt % active equivalent water-soluble pesticide and from 1 to 8 wt % active equivalent water-insoluble agrochemical.

In some preferred embodiments of the present invention, the water-soluble pesticide comprises at least one herbicide and the water-insoluble agrochemical comprises at least one fungicide, insecticide or herbicide, or a combination thereof. In particularly preferred embodiments, the water-soluble pesticide comprises at least one herbicide and the water-insoluble agrochemical comprises at least one fungicide.

Examples of combinations of water-soluble pesticides and water-insoluble agrochemicals within the scope of the present invention include, but are not limited to, a water-soluble herbicide selected from glyphosate, dicamba, 2,4-D, MCPA, quizalofop, diclofop and/or glufosinate and a water-insoluble agrochemical selected from azoxystrobin, beflubutamid, benalaxyl, benalaxyl-M, bromuconazole, clodinafop-propargyl, coumaphos, dinitriamine, dodemorph acetate, fentrazamide, flamprop-M-isopropyl, flamprop-M-isopropyl, flamprop-M-methyl, flurochloridone, flutolanil, indanofan, ipconazole, kresoxim-methyl, metconazole, picoxystrobin, pyraclostrobin, tebuconazole, thenylchlor and/or thiazopyr. One preferred embodiment includes glyphosate in combination with bromuconazole, ipconazole, metconazole, picoxystrobin, pyraclostrobin and/or tebuconazole.

Surfactants

Generally, any amphiphilic surfactant, or combination of amphiphilic surfactants, that provide the desired efficacy enhancement and solvation properties for dissolution of the water-insoluble agrochemical is suitable for the practice of the present invention. It has been discovered that a very broad range of cationic, nonionic, anionic and amphoteric surfactants are suitable for the practice of the present invention. Amidoalkylamine surfactants (described below) have been discovered to possess particularly preferred solvation properties.

Dissolution of the water-insoluble agrochemical into the surfactant component is advantageous for many reasons. For instance, dissolution enables preparation of stable SC compositions without the need for organic solvents, and the preparation of ME compositions having reduced solvent content as compared to prior art compositions. Because the water-insoluble agrochemical is present as a solute, settling, crystallization, and/or phase separation from the compositions can be minimized or avoided.

Further, many water-insoluble agrochemicals can degrade by hydrolysis if exposed to the aqueous carrier of the water-soluble pesticide. As is known to those skilled in the art, amphiphilic surfactants comprise groups of opposing solubility tendencies: (i) a water-soluble (i.e., hydrophilic) ionic group and (ii) an oil-soluble (i.e., hydrophobic) hydrocarbon chain. Under one theory, without being bound to any particular theory, it is believed that the dissolved water-insoluble agrochemical predominantly associates with the hydrophobic moiety of the amphiphilic surfactant through both hydrophobic and solvation forces. As a result, the molecules of the water-insoluble agrochemical partition predominantly into the surfactant matrix, i.e., the hydrophobic core, thereby insulating the water-insoluble agrochemical from hydrolysis through exposure to the water carrier phase of the water-soluble pesticide.

Still further, water-insoluble agrochemical dissolution provides advantages in the preparation of the compositions of the present invention, as well as in their use. A water-insoluble agrochemical/surfactant premix can be prepared that is subsequently combined with an aqueous water-soluble pesticide solution to produce ME and SC compositions. In addition to inhibiting degradation by hydrolysis, throughput and storage advantages can be realized because lower volumes are involved and dissolution rates are enhanced. Alternatively, for solid concentrate embodiments, the premix can be combined with a glyphosate paste or solid glyphosate to produce the solid concentrate compositions. The water-insoluble agrochemical of the present invention readily disperses upon dilution or dissolution and remains in solution.

The affinity of the surfactant for the water-insoluble agrochemical should be such that the water-insoluble agrochemical is predominantly dissolved and partitioned into the surfactant. In general, any surfactant that will solubilize a water-insoluble agrochemical to a concentration of 5, 10, 15, 20, 25, 30, 35, 40, 45 or even 50 percent by weight at temperature of no greater than 70° C., 65° C., 60° C., 55° C., 50° C., 45° C., 40° C., 35° C. or even 30° C. is preferred. Alternatively stated, a weight ratio of surfactant to water-insoluble agrochemical on an active equivalent basis of 20:1, 15:1, 10:1, 5:1, 4:1, 3:1, 2:1, 1.5:1 or even 1:1, and ranges therefore, such as 2:1 to 10:1 or 2:1 to 5:1 is preferred. It is preferred that the solubilized water-insoluble agrochemical remain predominantly in solution at temperatures of 25° C., 20° C., 15° C. or even 10° C. or lower for a period of at least 1 day or 1 week.

A total surfactant loading in the compositions of the present invention of from about 2 to about 20 wt % is preferred. A weight ratio of water-soluble pesticide (a.e. basis) to total surfactant of from about 1:1 to about 20:1 is preferred, more preferably from about 2:1 to about 10:1, still more preferably from about 3:1 to about 6:1.

One of skill in the art will readily be enabled to determine whether a particular surfactant and water-insoluble agrochemical combination meets the partition and solubilization criteria using test procedures known in the art for evaluating solubility.

One such test procedure uses differential scanning calorimetry (DSC) to determine the effect of surfactants on the melting/dissolution temperature of water-insoluble agrochemicals. DSC analytical methodology is well known to those skilled in the art. Generally, sample temperature is measured as a function of heat flow. The melting/dissolution point is indicated by a deviation in the heat flow curve from a linear response. DSC can be used to analyze mixtures of water-insoluble agrochemicals or combinations thereof and surfactants or surfactant blends in order to reliably predict whether any particular combination could be suitable for the practice of the present invention. It has been discovered that surfactant and water-insoluble herbicide combinations having a dissolution temperature less than the melting point of the water-insoluble agrochemical and within the preferred range are generally suitable.

Figure 14:
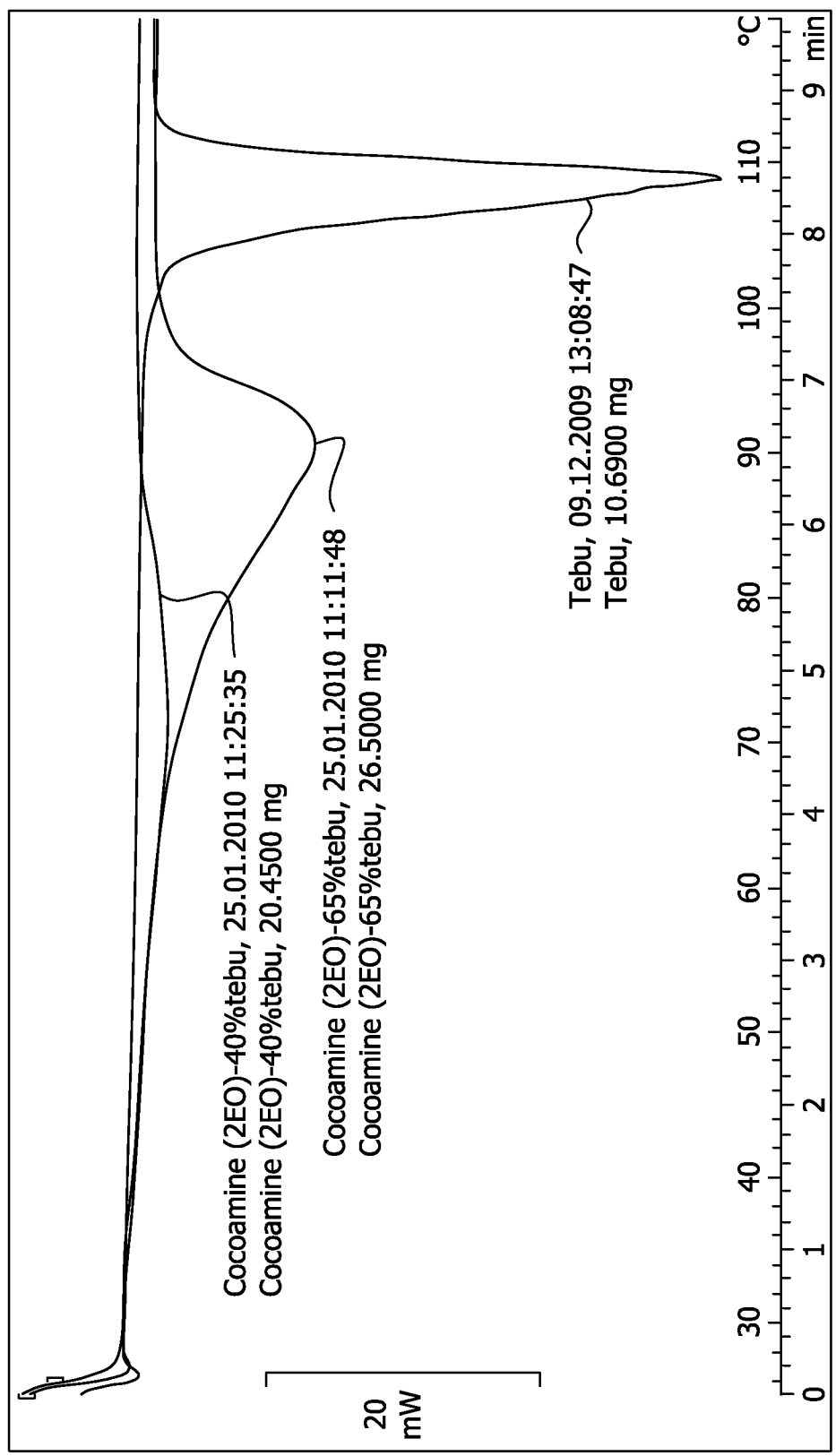
FIG. 14 is a differential scanning calorimetry curve of heat flux versus temperature for tebuconazole and 40% and 65% tebuconazole in ethoxylated cocoamine 2EO surfactant (ETHOMEEN C/12).
Figure 15:
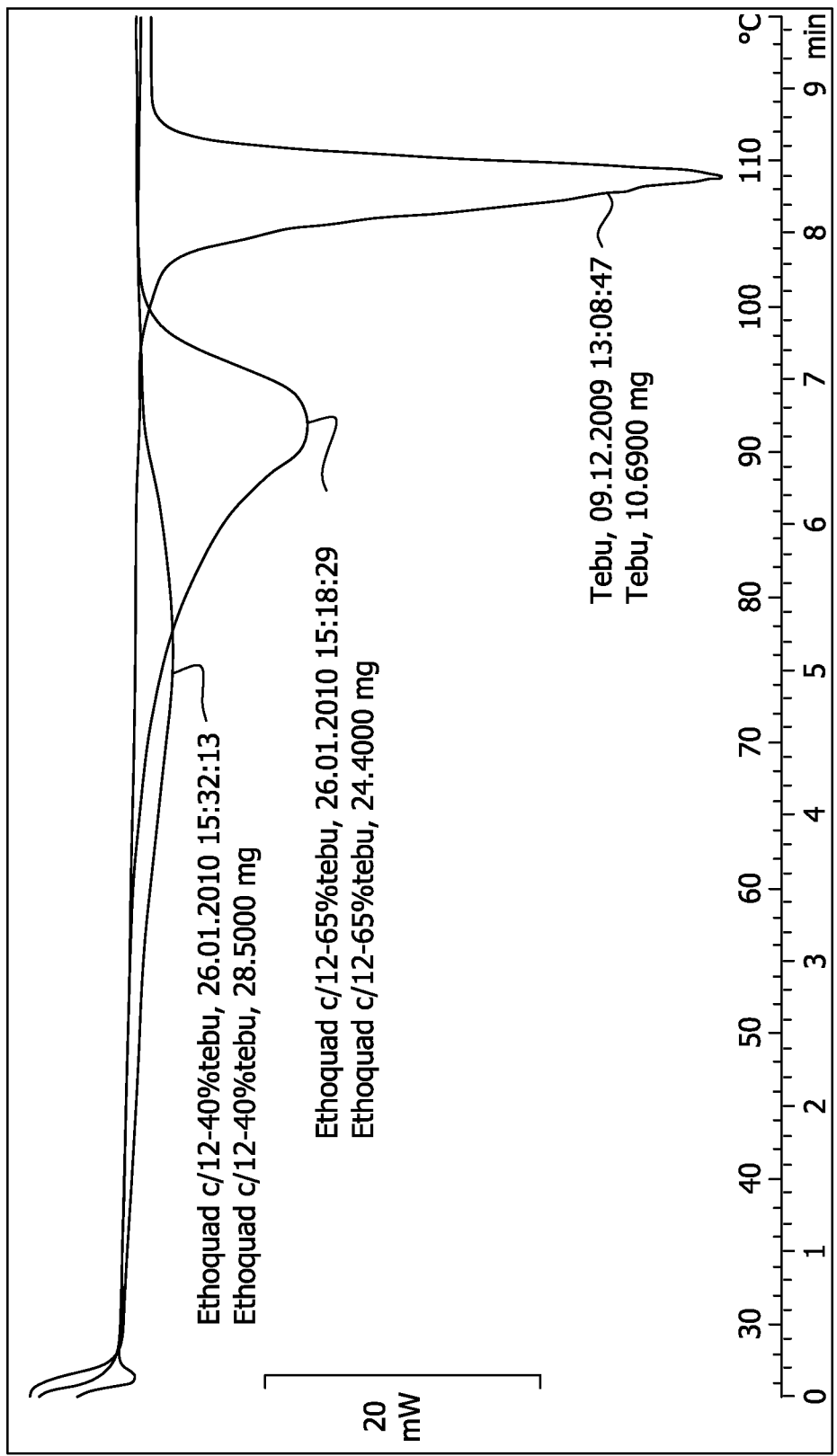
FIG. 15 is a differential scanning calorimetry curve of heat flux versus temperature for tebuconazole and 40% and 65% tebuconazole in ethoxylated quaternary cocoamine 2EO surfactant (ETHOQUAD C/12).
Figure 16:
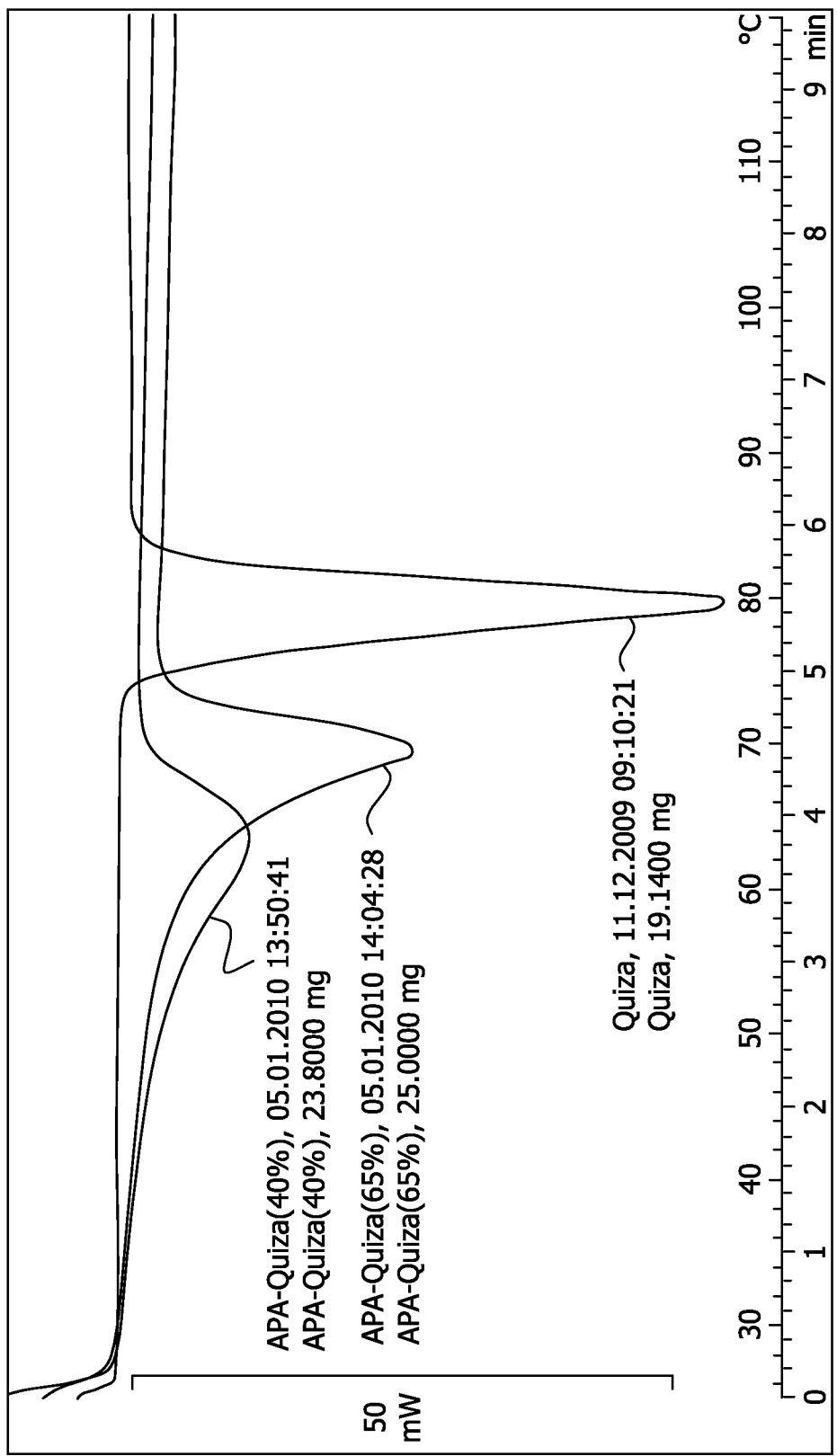
FIG. 16 is a differential scanning calorimetry curve of heat flux versus temperature for quizalofop-p-ethyl and 40% and 65% quizalofop-p-ethyl in $C_{6-9}$ amidopropyl dimethylamine surfactant (ARMEEN APA 9).
Figure 17:
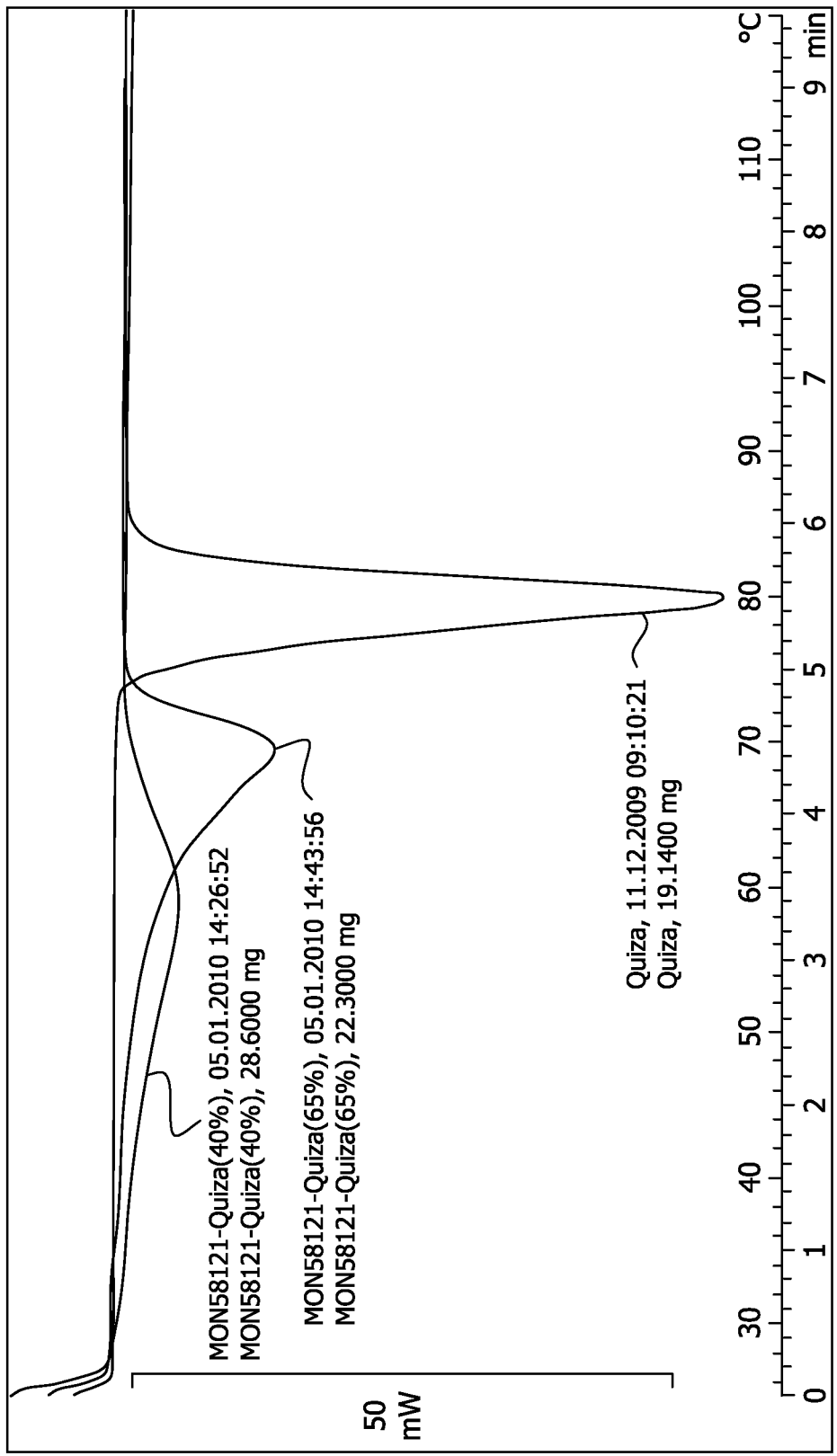
FIG. 17 is a differential scanning calorimetry curve of heat flux versus temperature for quizalofop-p-ethyl and 40% and 65% quizalofop-p-ethyl in ethoxylated etheramine surfactant (Huntsman AGM-550) surfactant.
Figure 18:
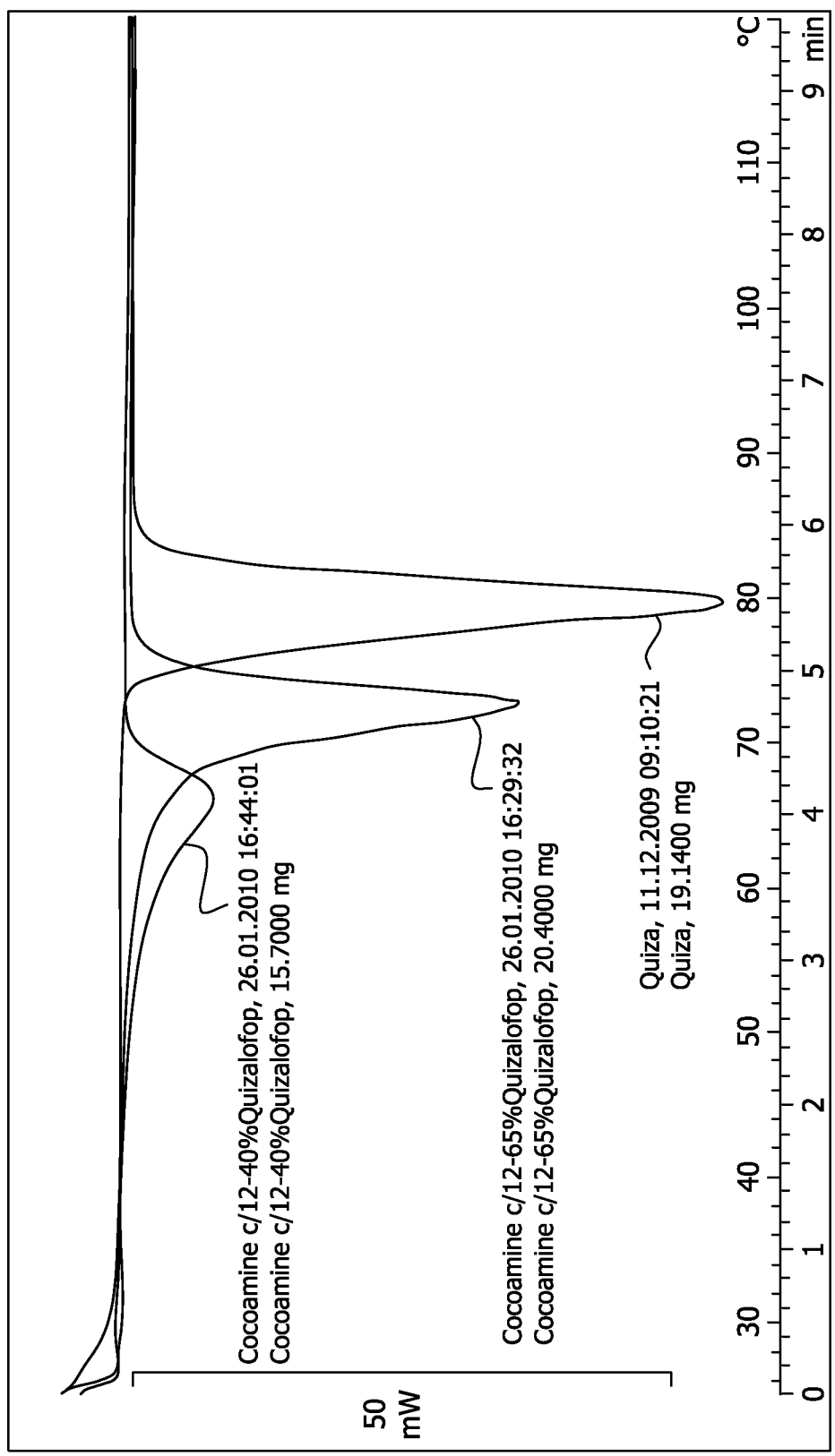
FIG. 18 is a differential scanning calorimetry curve of heat flux versus temperature for quizalofop-p-ethyl and 40% and 65% quizalofop-p-ethyl in ethoxylated cocoamine 2EO surfactant (COCOAMINE C/12).
Figure 19:
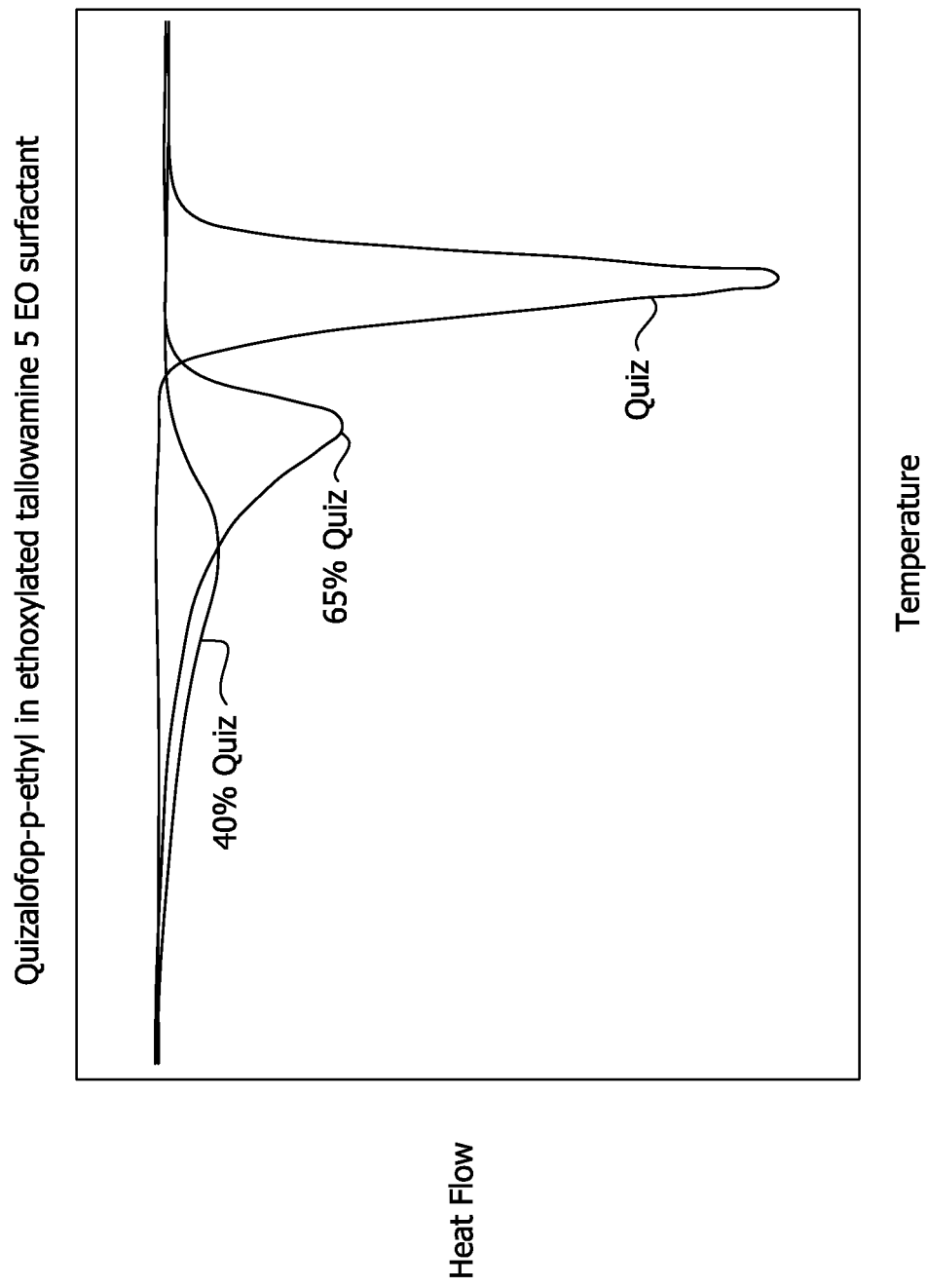
FIG. 19 is a differential scanning calorimetry curve of heat flux versus temperature for quizalofop-p-ethyl and 40% and 65% quizalofop-p-ethyl in ethoxylated tallowamine 5 EO surfactant.
Figure 20:
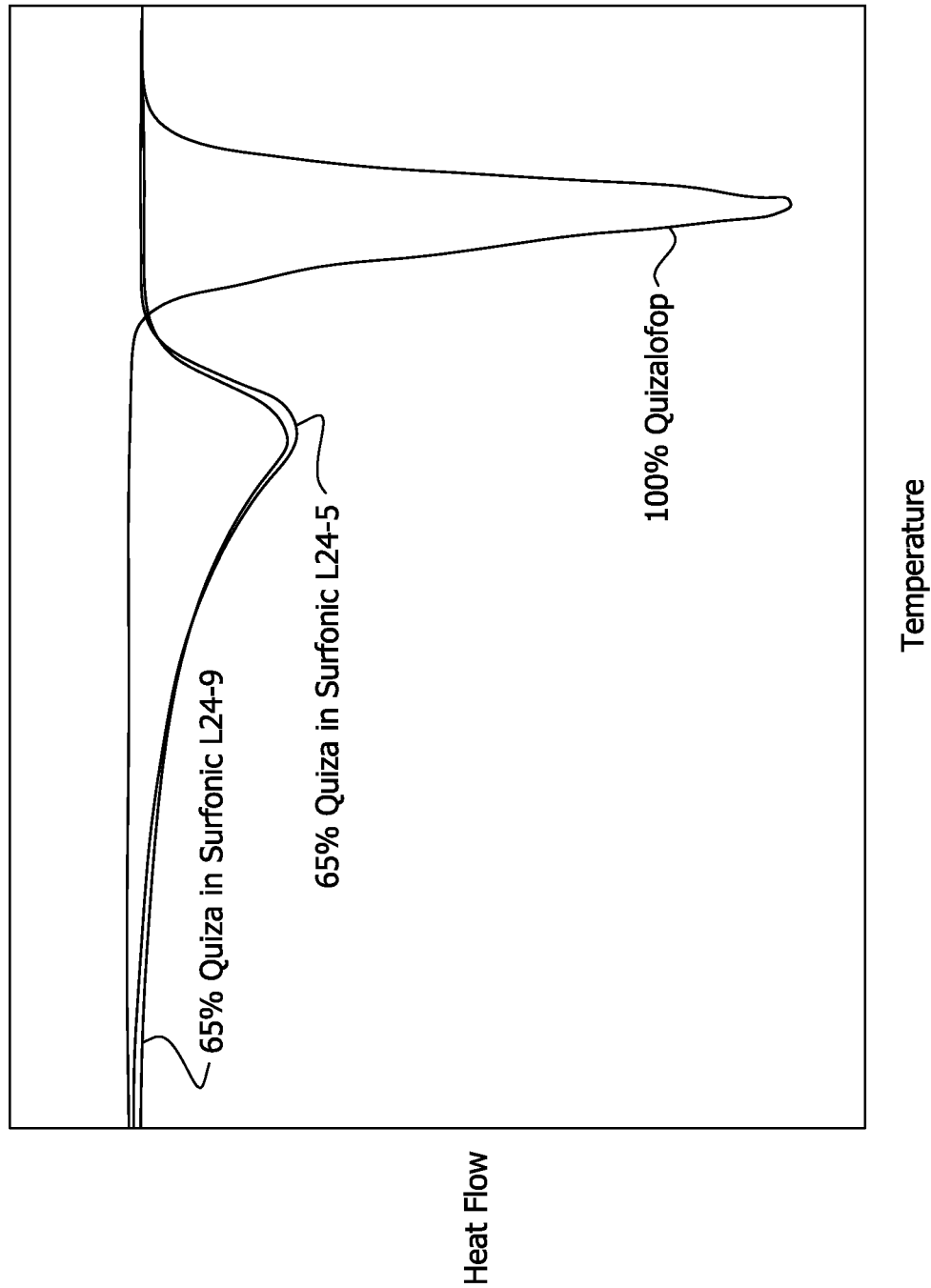
FIG. 20 is a differential scanning calorimetry curve of heat flux versus temperature for quizalofop-p-ethyl and 65% quizalofop-p-ethyl in each of $C_{12-14}$ ethoxylated alcohol 5 EO surfactant (SURFONIC L24-5) and $C_{12-14}$ alcohol 9 EO surfactant (SURFONIC L24-9).
Figure 21:
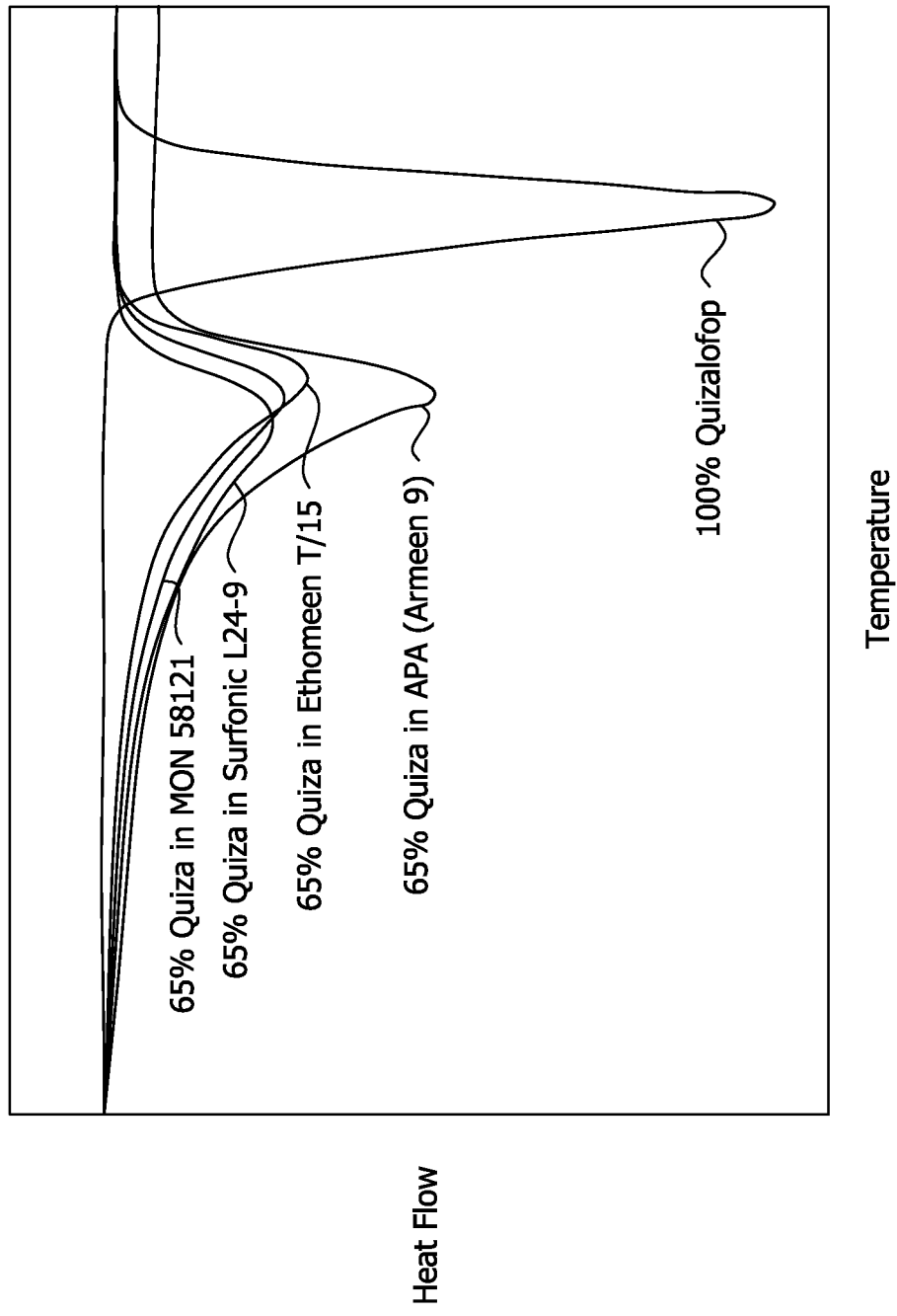
FIG. 21 is a differential scanning calorimetry curve of heat flux versus temperature for quizalofop-p-ethyl and 65% quizalofop-p-ethyl in each of $C_{12-14}$ alcohol 9 EO surfactant (SURFONIC L24-9), ethoxylated etheramine surfactant (Huntsman AGM-550) surfactant, $C_{6-9}$ amidopropyl dimethylamine surfactant (ARMEEN 9) and ethoxylated tallowamine 5 EO surfactant (ETHOMEEN T/15).

Representative DSC curves are depicted in FIGS. 2-21. For instance, FIG. 14 depicts the melting/dissolution temperature of tebuconazole and combinations of 40% and 65 wt % tebuconazole in ethoxylated cocoamine (2EO) surfactant. Tebuconazole melting point was about 109° C. and the melting/dissolution points for the 40 wt % and 65 wt % combinations were 71° C. and 91° C., respectively. FIG. 16 depicts the melting/dissolution temperature of quizalofop-p-ethyl and combinations of 40% and 65 wt % quizalofop-p-ethyl in $C_{6-9}$ amidopropyl dimethylamine surfactant (ARMEEN APA 9). Quizalofop-p-ethyl melting point was about 80° C. and the melting/dissolution points for the 40 wt % and 65 wt % combinations were 63° C. and 69° C., respectively.

Based on DSC experimental evidence to date, it is believed that there is no significant difference in melting/dissolution behavior of water-insoluble agrochemicals within a category of surfactants, such as cationic, nonionic or anionic surfactants. It is further believed that the melting/dissolution behavior of some water-insoluble agrochemicals is essentially the same regardless of the surfactant category, while the behavior for some other water-insoluble agrochemicals may vary based on the surfactant category. It is still further believed that the water-insoluble agrochemical melting/dissolution temperature decreases as its concentration relative to surfactant decreases.

Another test procedure to determine whether a particular surfactant and water-insoluble agrochemical combination meets the partition and solubilization criteria comprises the following steps. A mixture of one or more water-insoluble agrochemicals and one or more surfactants is prepared at a desired pesticide concentration, such as 10, 20 or 30 wt % active equivalent. The mixture is heated with stirring until the mixture clears thereby indicating pesticide dissolution. The mixture is then cooled to about 20° C. to about 25° C. and observed for clarity in order to determine if the water-insoluble agrochemical remains in solution.

In some embodiments, the compositions comprise a surfactant component comprising a surfactant selected from among an alkoxylated tertiary amine, an alkoxylated quaternary amine, or a combination thereof.

Alkoxylated tertiary amine surfactants for use in the compositions of the present invention have the general structure (I):

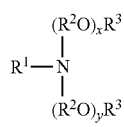

Structure (I)

wherein $R^1$ is a hydrocarbyl or substituted hydrocarbyl having an average number of carbon atoms in the population of molecules within about 4 to about 22 carbon atoms, each $R^2$ is independently hydrocarbylene having 2, 3, or 4 carbon atoms, each $R^3$ is independently hydrogen or $C_{1-6}$ alkyl, and the sum of x and y is an average value ranging from about 1 to about 50.

$R^1$ is preferably an alkyl having an average number of carbon atoms ranging from about 4 to about 22 carbon atoms, more preferably from about 8 to about 22 carbon atoms, and still more preferably from about 10 to about 20 carbons atoms, for example coco, tallow, oleyl, and stearyl. $R^2$ is preferably ethylene or propylene. $R^3$ is preferably hydrogen. The sum of x and y is preferably an average value ranging from about 1 to about 25.

Specific alkoxylated tertiary amine surfactants for use in the compositions of the present invention include, for example, Ethomeen T/12, Ethomeen T/15, Ethomeen T/20, Ethomeen T/25, Ethomeen T/30, Ethomeen T/60, Ethomeen HT/12, Ethomeen HT/40, Ethomeen HT/60, Ethomeen C/12, Ethomeen C/15, Ethomeen C/25, Ethomeen O/12, Ethomeen OV/17, Ethomeen S/12, Ethomeen S/17, and Ethomeen S/22, each of which are available from Akzo Nobel.

Alkoxylated quaternary amine surfactants for use in the compositions of the present invention have the general structure (II):

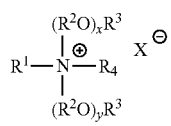

Structure (II)

wherein $R^1$, $R^2$, $R^3$, x and y are as described above for the alkoxylated tertiary amine surfactants of structure (I). $R^4$ is preferably a hydrocarbyl or substituted hydrocarbyl having from 1 to about 4 carbon atoms, more preferably methyl. X is a charge balancing counter-anion, such as sulfate, chloride, bromide, nitrate, among others.

$R^1$ is preferably an alkyl having an average number of carbon atoms ranging from about 4 to about 22 carbon atoms, more preferably from about 8 to about 22 carbon atoms, and still more preferably from about 10 to about 20 carbons atoms, for example coco, tallow, oleyl, and stearyl. $R^2$ is preferably ethylene or propylene. $R^3$ is preferably hydrogen. $R^4$ is preferably methyl. The sum of x and y is preferably an average value ranging from about 1 to about 25.

Specific alkoxylated quaternary amine surfactants for use in the compositions of the present invention include, for example, Ethoquad O/12, Ethoquad T/12, Ethoquad T/15, Ethoquad T/20, Ethoquad T/25, Ethoquad HT/25, Ethoquad C/12, Ethoquad C/15, and Ethoquad C/25, each of which are available from Akzo Nobel.

In some embodiments, the compositions comprise a surfactant component comprising a surfactant selected from among alkoxylated tertiary etheramine surfactants, alkoxylated quaternary etheramine surfactants, and combinations thereof.

Alkoxylated tertiary etheramine surfactants for use in the compositions of the present invention have the general structure (III):

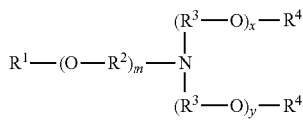

Structure (III)

wherein $R^1$ is a hydrocarbyl or substituted hydrocarbyl having an average number of carbon atoms in the population of molecules within about 4 to about 22 carbon atoms; $R^2$ and $R^3$ are each independently a hydrocarbylene having 2, 3, or 4 carbon atoms; each $R^4$ is independently hydrogen or $C_{1-6}$ alkyl, m is an average number from about 1 to about 10; and the sum of x and y is an average value ranging from about 1 to about 60.

$R^1$ is preferably an alkyl having an average value ranging from about 4 to about 22 carbon atoms, more preferably from about 8 to about 22 carbon atoms, and still more preferably from about 10 to about 20 carbons atoms, for example coco, tallow, oleyl, and stearyl. Sources of the $R^1$ group include, for example, coco or tallow, or $R_1$ may be derived from synthetic hydrocarbyls, such as decyl, dodedecyl, tridecyl, tetradecyl, hexadecyl, or octadecyl groups. The number m is preferably from about 1 to 5, such as 2 to 3. $R^2$ and $R^3$ are preferably independently be ethylene, propylene, isopropylene, and are preferably ethylene. $R^4$ is preferably hydrogen. The sum of x and y is preferably an average value ranging from about 1 to about 25. An example is SURFONIC AGM 550 available from Huntsman Petrochemical Corporation wherein $R^1$ is $C_{12-14}$, $R^2$ is isopropyl, $R^3$ is ethylene, $R^4$ is hydrogen, m is 2 and the sum of x and y is 5.

Specific alkoxylated tertiary etheramine surfactants for use in the compositions of the present invention include, for example, any of the TOMAH E-Series surfactants, such as TOMAH E-14-2, TOMAH E-14-5, TOMAH E-17-2, TOMAH E-17-5, TOMAH E-19-2, TOMAH E-18-2, TOMAH E-18-5, TOMAH E-18-15, TOMAH E-S-2, TOMAH E-S-15, TOMAH E-T-2, TOMAH E-T-5, and TOMAH E-T-15, all available from Air Products and Chemicals, Inc.

Alkoxylated quaternary etheramine surfactants for use in the compositions of the present invention have the general structure (IV):

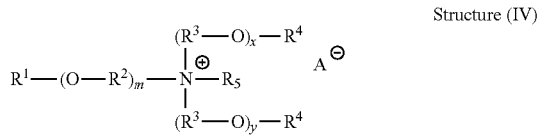

Structure (IV)

wherein $R^1$ is a hydrocarbyl or substituted hydrocarbyl having an average number of carbon atoms in the population of molecules within about 4 to about 22 carbon atoms; $R^2$ and $R^3$ are each independently a hydrocarbylene having 2, 3, or 4 carbon atoms; each $R^4$ is independently hydrogen or $C_{1-6}$ alkyl; m is an average number from about 1 to about 10; and the sum of x and y is an average value ranging from about 1 to about 60. $R^5$ is preferably a hydrocarbyl or substituted hydrocarbyl having from 1 to about 4 carbon atoms, more preferably methyl. A is a charge balancing counter-anion, such as sulfate, chloride, bromide, nitrate, among others.

$R^1$ is preferably an alkyl having an average value ranging from about 4 to about 22 carbon atoms, more preferably from about 8 to about 22 carbon atoms, and still more preferably from about 10 to about 20 carbons atoms, for example coco, tallow, oleyl, and stearyl. Sources of the $R^1$ group include, for example, coco or tallow, or $R_1$ may be derived from synthetic hydrocarbyls, such as decyl, dodedecyl, tridecyl, tetradecyl, hexadecyl, or octadecyl groups. The number m is preferably from about 1 to 5, such as 2 to 3. $R^2$ and $R^3$ may independently be ethylene, propylene, isopropylene, and are preferably ethylene. $R^4$ is preferably hydrogen. $R_5$ is preferably methyl. The sum of x and y is preferably an average value ranging from about 1 to about 25.

Specific alkoxylated quaternary etheramine surfactants for use in the compositions of the present invention include, for example, TOMAH Q-14-2, TOMAH Q-17-2, TOMAH Q-17-5, TOMAH Q-18-2, TOMAH Q-S, TOMAH Q-S-80, TOMAH Q-D-T, TOMAH Q-DT-HG, TOMAH Q-C-15, and TOMAH Q-ST-50, all available from Air Products and Chemicals, Inc.

In some embodiments, the compositions comprise a surfactant component comprising a combination of an alkylamine alkoxylate surfactant having a high degree of alkoxylation and an etheramine alkoxylate surfactant.

The alkylamine alkoxylate surfactant having a high degree of alkoxylation is of structure (I):

Structure (I)

wherein $R^1$ is a straight or branched chain $C_{12}$ to $C_{18}$ hydrocarbyl group (e.g., tallow, soya, coco or oleyl), more preferably a mixture of straight or branched chain $C_{14}$ to $C_{18}$ hydrocarbyl groups, still more preferably a mixture of straight or branched chain $C_{16}$ to $C_{18}$ alkyl (tallow), each $R^2$ is independently $C_1$ to $C_4$ alkylene, more preferably $C_2$, each $R^3$ is independently hydrogen or $C_1$ to $C_6$ alkyl, preferably hydrogen, and, in some embodiments, x and y are average numbers such that x+y is in the range of from about 5 to about 25, more preferably from about 5 to about 20, more preferably from about 8 to about 20, more preferably from 8 to about 15, and still more preferably from about 9 to about 10. In other embodiments, x and y are average numbers such that x+y is greater than 5, such as in the range of from 6 to about 15, from 6 to about 12, or from 6 to about 10. Examples of suitable alkylamine alkoxylate surfactants having a high degree of alkoxylation include, without restriction, Berol 300 (cocoamine 5EO), Berol 381 (tallowamine 15EO), Berol 391 (tallowamine 5EO), Berol 397 (cocoamine 15 EO), Berol 398 (cocoamine 11 EO), Berol 498 (tallowamine 10 EO), Ethomeen C/15 (cocoamine 5EO), Ethomeen C/25 (cocoamine 15 EO), Ethomeen T/15 (tallowamine 5EO), Ethomeen T/20 (tallowamine 10EO), Ethomeen T/19 (tallowamine 9EO), Ethomeen T/25 (tallowamine 15 EO), Witcamine TAM-105 (tallowamine 10 EO), Witcamine TAM-80 (tallowamine 8 EO), Witcamine TAM-60 (tallowamine 6EO), all available from Akzo Nobel.

The etheramine alkoxylate surfactant is of structure (III):

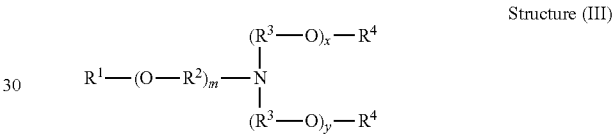

Structure (III)

wherein $R^1$ is a straight or branched chain $C_6$ to $C_{22}$ hydrocarbyl group (e.g., tallow, soya, coco or oleyl), more preferably a mixture of straight or branched chain $C_{12}$ to $C_{18}$ alkyl, more preferably a mixture of straight or branched chain $C_{12}$ to $C_{16}$ alkyl, more preferably a mixture of straight or branched chain $C_{12}$ to $C_{14}$ alkyl, $R^2$ is $C_1$ to $C_4$ alkylene, more preferably $C_3$ alkylene, m is an average number of from 1 to about 10, more preferably from about 1 to about 5, and still more preferably about 2, $R^3$ is $C_1$ to $C_4$ alkylene, more preferably $C_2$, x and y are average numbers such that x+y is in the range of from 2 to about 60, preferably from about 2 to about 20, from about 5 to about 15, from about 2 to about 10, from about 5 to about 10, more preferably about 5, and each $R^4$ is independently hydrogen or $C_1$ to $C_6$ alkyl, preferably hydrogen. When combined with the water-soluble herbicide potassium glyphosate, x and y are average numbers such that x+y is in the range of from about 5 to about 8. When combined with a water-soluble salt of glyphosate other than the potassium salt, x and y are average numbers such that x+y is in the range of from about 5 to about 8. Examples of suitable etheramine alkoxylate surfactants include, without restriction, Tomamine E-14-2 (bis-(2-hydroxyethyl)isodecyloxypropylamine), Tomamine E-14-5 (poly-(5) oxyethylene isodecyloxypropylamine), Tomamine E-17-2 (bis-(2-hydroxyethyl) isotridecyloxypropylamine), Tomamine E-17-5 (poly (5) oxyethylene isotridecyloxypropylamine), Tomamine E-19-2 (bis-(2-hydroxyethyl)linear alkyloxypropylamine) all available from Air Products, and Surfonic AGM-550 (where for Structure (III) $R^1$ is $C_{12-14}$, $R^2$ is isopropyl, $R^3$ is $C_2$, $R^4$ is hydrogen, m is 2, and the sum of x and y is 5) available from Huntsman.

The weight ratio of the etheramine alkoxylate surfactant to the alkylamine alkoxylate surfactant having a high degree of alkoxylation is from about 90:10 to about 10:90, preferably from about 80:20 to about 40:60, more preferably from about 80:20 to about 50:50. In some preferred embodiments, the ratio is not greater than about 70:30, for example from about 70:30 to about 50:50. The weight ratio of glyphosate a.e. to total surfactant of from about 1:1 to about 6:1, preferably from about 3:1 to about 5:1, more preferably from about 4:1 to about 4.5:1. The preferred ratios are generally based on a balance between optimum biological and cost performance.

In some embodiments, the compositions comprise a surfactant component comprising a mono-alkoxylated tertiary amine surfactants having the general structure (V):

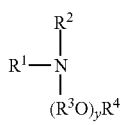

Structure (V)

wherein $R^1$ and $R^2$ are each independently hydrocarbyl or substituted hydrocarbyl having an average number of carbon atoms in the population of molecules within about 4 to about 22 carbon atoms, $R^3$ is a hydrocarbylene having 2, 3, or 4 carbon atoms, $R^4$ is hydrogen or $C_{1-6}$ alkyl, and y is an average value ranging from about 1 to about 25.

$R^1$ are $R^2$ are preferably an alkyl having an average value ranging from about 4 to about 22 carbon atoms, more preferably from about 8 to about 22 carbon atoms, and still more preferably from about 10 to about 20 carbons atoms, for example coco, tallow, oleyl, and stearyl. $R^3$ is preferably ethylene or propylene. $R^4$ is preferably hydrogen.

Mono-alkoxylated quaternary amine surfactants for use in the compositions of the present invention have the general structure (VI):

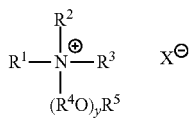

Structure (VI)

wherein $R^1$, $R^2$, and $R^3$ are each independently hydrocarbyl or substituted hydrocarbyl having an average number of carbon atoms in the population of molecules within about 4 to about 22 carbon atoms, $R^4$ is a hydrocarbylene having 2, 3, or 4 carbon atoms, $R^5$ is hydrogen or $C_{1-6}$ alkyl, and y is an average value ranging from about 1 to about 25. X is a charge balancing counter-anion, such as sulfate, chloride, bromide, nitrate, among others.

$R^1$, $R^2$, and $R^3$ are preferably alkyl having an average value ranging from about 4 to about 22 carbon atoms, more preferably from about 8 to about 22 carbon atoms, and still more preferably from about 10 to about 20 carbons atoms, for example coco, tallow, oleyl, and stearyl. $R^4$ is preferably ethylene or propylene. $R^5$ is preferably hydrogen.

In some embodiments, the water-insoluble agrochemical is dissolved in a surfactant component comprising a derivatized saccharide surfactant and an amine oxide surfactant. Among the derivatized saccharide surfactants, preferred classes include alkylpolysaccharides; alkylesters and alkoxylated alkylesters of saccharides; saccharide amines; silicone functionalized saccharide derivatives; and mixtures thereof. In some embodiments, wherein a mixture of derivatized saccharide surfactants is present, the surfactant mixture predominantly comprises one or more alkylpolysaccharides.

In some embodiments, alkylpolysaccharide surfactants suitable for use in compositions of the present invention predominantly comprise one or more chemically stable surfactants having structure (VII):

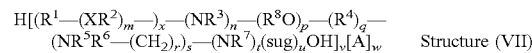

Structure (VII)

In reference to Structure (VII), $R^1$ a straight or branched chain substituted or unsubstituted hydrocarbylene selected from alkyl, alkenyl, alkylphenyl, alkenylphenyl. Each X is independently an ether, thioether, sulfoxide, ester, thioester or amide linkage, each $R^2$ is independently $C_{2-6}$ hydrocarbylene, m is an average number of 0 to about 8, and x is an average number of 0 to about 6. The total number of carbon atoms in $R^1$—$(XR^2)_m$ is about 8 to about 24. $R^8$ is independently $C_2$-$C_4$ alkylene and p is an average number of 0 to about 12. $R^3$ is hydrogen or $C_{1-4}$ hydrocarbyl and n is 0 or 1. $R^4$ is $C_{1-4}$ hydrocarbyl or hydrocarbylene and q is 0 or 1. $R^5$ and $R^6$ are independently hydrogen or $C_{1-4}$ hydrocarbyl, r is 0 to 4 and s is 0 or 1. $R^2$ is hydrogen or $C_{1-4}$ hydrocarbyl and t is 0 or 1. A is an anionic entity, and v is an integer from 1 to 3 and w is 0 or 1 such that electrical neutrality is maintained.

In further reference to Structure (VII), the sug moiety is a saccharide residue, and may be an open or cyclic (i.e., pyranose) structure. The saccharide may be a monosaccharide having 5 or 6 carbon atoms, a disaccharide, an oligosaccharide or a polysaccharide. Examples of suitable saccharide moieties, including their corresponding pyranose form, include ribose, xylose, arabinose, glucose, galactose, mannose, telose, glucose, allose, altrose, idose, lyxose, ribulose, sorbose (sorbitan), fructose, and mixtures thereof. Examples of suitable disaccharides include maltose, lactose and sucrose. Disaccharides, oligosaccharides and polysaccharides can be a combination of two or more identical saccharides, for example maltose (two glucoses) or two or more different saccharides, for example sucrose (a combination of glucose and fructose). The degree of polymerization, u, is an average number from 1 to about 10, from 1 to about 8, from 1 to about 5, from 1 to about 3, and from 1 to about 2.

In still further reference to Structure (VII), when $R^1$ is a hydrophobic group and m, n, p, q, s and t are 0, $R^1$ is generally attached at the sug 1-position, but can be attached at the 2-, 3-, or 4-positions rather than the 1-position (thereby giving, e.g. a glucosyl or galactosyl as opposed to a glucoside or galactoside). For disaccharides and oligosaccharides, the additional saccharide units are generally attached to the previous saccharide unit's 2-position, but attachment through the 3-, 4-, and 6-positions can occur.

Optionally, the derivatized saccharide surfactant is an alkyl polysaccharide surfactant having formula (VIII):

Structure (VIII)

wherein $R^{11}$ is a straight or branched chain substituted or unsubstituted hydrocarbyl selected from alkyl, alkenyl, alkylphenyl, alkenylphenyl having from about 4 to about 22 carbon atoms, preferably 4 to 18 carbon atoms, and wherein sug and u are as defined above. As known to those skilled in the art, as depicted in Structure (VIII), $R^{11}$ is linked to a sug oxygen. In various particular embodiments, the polysaccharide surfactant may be an alkyl polyglucoside of Structure (VIII) wherein: $R^{11}$ is a branched or straight chain alkyl group preferably having from 4 to 22 carbon atoms, more preferably from 8 to 18 carbon atoms, or a mixture of alkyl groups having an average value within the given range; sug is a glucose residue (e.g., a glucoside); and u is between 1 and about 5, and more preferably between 1 and about 3.

Examples of surfactants of Structure (VIII) are known in the art. Representative surfactants are presented in Table II below wherein for each surfactant sug is a glucose residue.

TABLE II

| Trade name | $R^{11}$ | u |
|---|---|---|
| APG 225 | $C_{8-12}$ alkyl | 1.7 |
| APG 325 | $C_{9-11}$ alkyl | 1.5 |
| APG 425 | $C_{8-16}$ alkyl | 1.6 |
| APG 625 | $C_{12-16}$ alkyl | 1.6 |
| GLUCOPON 600 | $C_{12-16}$ alkyl | 1.4 |
| PLANTAREN 600 | $C_{12-14}$ alkyl | 1.3 |
| PLANTAREN 1200 | $C_{12-16}$ alkyl | 1.4 |
| PLANTAREN 1300 | $C_{12-16}$ alkyl | 1.6 |
| PLANTAREN 2000 | $C_{8-16}$ alkyl | 1.4 |
| Agrimul PG 2076 | $C_{8-10}$ alkyl | 1.5 |
| Agrimul PG 2067 | $C_{8-10}$ alkyl | 1.7 |
| Agrimul PG 2072 | $C_{8-16}$ alkyl | 1.6 |
| Agrimul PG 2069 | $C_{9-11}$ alkyl | 1.6 |
| Agrimul PG 2062 | $C_{12-16}$ alkyl | 1.4 |
| Agrimul PG 2065 | $C_{12-16}$ alkyl | 1.6 |
| BEROL AG6202 | 2-ethyl-1-hexyl | |

One such surfactant of the general structure (VIII) has the following structure (VIIIA):

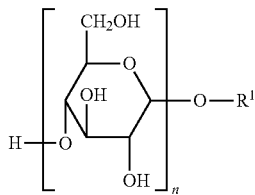

Structure (VIIIA)

wherein n is the degree of polymerization and is typically within the range from 1 to 3, for example from 1 to 2, and $R^1$ is a branched or straight chain alkyl group having from 4 to 18 carbon atoms or a mixture of alkyl groups having an average value within the given range.

In some embodiments, the derivatized saccharides are fatty acid esters of a saccharide, disaccharide, oligosaccharide or polysaccharide as depicted in Structure (IXA) or (IXB):

$(sug)_u\text{-}(OC(O)R^{21})_x$   Structure (IXA)

$(sug)_u(C(O)\text{—}OR^{21}))_x$   Structure (IXB)

wherein: sug is as defined above; $R^{21}$ is a straight or branched chain alkyl or alkenyl group having from about 4 to about 22 carbon atoms; u is 1 to about 10; and x is a multiple of u with the average number being from about 1 to about 5, for example, 1.5. Preferred are sucrose or sorbitan sug units, $R^{21}$ having from about 8 to about 18 carbons, u=1, and x=about 1 to about 5. Examples include sorbitan monolaurate (Emsorb 2515), sorbitan monooleate (Emsorb 2500), sorbitan triooleate (Emsorb 2503), sorbitan sesquioleate (Emsorb 2502).

In other embodiments, the derivatized saccharides are alkoxylated fatty acid esters of a saccharide, disaccharide, oligosaccharide or polysaccharide as depicted in Structure (X):

$(sug)_u[\text{—}(OR^{31})_xR^{32}]_y[\text{—}(OR^{31})_xOH)(\text{—}(OR^{31})_x R^{33})]_z$   Structure (X)

wherein: sug is as defined above; each $R^{31}$ is independently an alkyl having from 2 to about 4 carbon atoms; each $R^{32}$ is independently selected from —OH and —OC(O)$R^{34}$; $R^{33}$ is —OC(O)$R^{34}$; and each $R^{34}$ is independently selected from a straight or branched chain alkyl or alkenyl group having from about 4 to about 22 carbon atoms; u is an average number of from about 1 to about 10, for example 1.5 or 3; each x is independently from about 0 to about 20 and the total x is from 1 to about 60; when u is greater than 1, total x is a multiple of u; y is a multiple of u with the multiplication factor being an average number of from 0 to about 5, for example 1.5; and z is an average number such that z is approximately equal to u. Preferred are: sucrose, glucose or sorbitan sug units; u=about 1; x=about 1 to about 20 and total x from about 1 to about 60; $R^{31}$ having two carbon atoms; $R^{32}$ being —OH or —OC(O)$R^{34}$; and $R^{34}$ being an alkyl or alkenyl moiety having from about 8 to about 18 carbon atoms; y=about 1 to about 4; and z=u.

One preferred example is depicted below in Structure (XI):

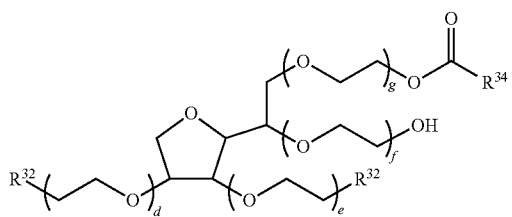

Structure (XI)

wherein sug is sorbitan, each $R^{32}$ is —OH, $R^{33}$ is an alkyl or alkenyl having from about 6 to about 20 carbons, and the sum of d, e, f and g is from about 1 to about 50. Examples conforming to formula (5) include polyoxyethylene (20) sorbitan monolaurate (AGNIQUE SML-20-U; TWEEN 20), polyoxyethylene (5) sorbitan monooleate (AGNIQUE SMO-5), polyoxyethylene (20) sorbitan monooleate (AGNIQUE SMO-20-U; TWEEN 80); and polyoxyethylene (30) sorbitan monooleate (AGNIQUE SMO-30). Other preferred examples conform to formula (5) wherein sug is sorbitan, each $R^{32}$ is —OC(O)$R^{34}$, $R^{33}$ and $R^{34}$ are each a straight or branched chain alkyl or alkenyl having from about 6 to about 20 carbons, and the sum of d, e, f and g is from about 1 to about 50. Examples include polyoxyethylene (16) sorbitan tristearate (AGNIQUE STS-16), polyoxyethylene (20) sorbitan tristearate (AGNIQUE STS-20), polyoxyethylene (20) sorbitan trioleate (TWEEN 85; AGNIQUE STO-2095).

In still other embodiments, the derivatized saccharide surfactant is of Structure (XII):

$R^{41}\text{—}(NR^{42})_n\text{—}(sug)_u$   Structure (XII)

wherein $R^{41}$ is a straight or branched chain substituted or unsubstituted hydrocarbyl selected from alkyl, alkenyl, alkylphenyl, alkenylphenyl having from about 4 to about 22 carbon atoms, $R^{42}$ is hydrogen or $C_{1-4}$ hydrocarbyl, sug is as defined above, n and u are as defined above. An example of a compound of Structure (XII) is a glucosamine where $R^{41}$ is $C_8H_{17}$ hydrocarbyl, n and u are about 1, $R^{42}$ is hydrogen, and sug is an open or cyclic glucose. An example is a cyclic glucosamine derivative of the Structure (XIIa):

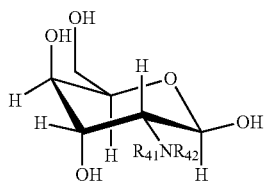

Structure (XIIa)

In other variations of the above embodiments, one or more of the hydroxyl groups present in the derivatized saccharide surfactants are substituted with groups that act to improve characteristics such as solubility and efficacy enhancing capabilities.

For example, the compositions of the invention may comprise silicone functionalized alkyl polyglucoside surfactants, as described in U.S. Pat. No. 6,762,289 B1 to O'Lenick et al. (the contents of which are incorporated herein by reference), wherein from 2 to 5 of the hydroxyl groups present on the sug group in an alkyl polysaccharide surfactant is reacted with an organosiloxane to generate a silicone-functionalized alkyl polysaccharide surfactant exhibiting enhanced water solubility. The silicone-functionalize surfactant is represented by chemical Structure (XIII):

$$R^{51}\text{-(sug)}_u(\text{O-organosiloxane})_z \quad \text{Structure (XIII)}$$

wherein $R^{51}$ represents a straight or branched chain alkyl or alkenyl having from about 8 to about 22 carbon atoms, sug and u are as defined above, and z is an average number of from about 2 to about 5. Each organosiloxane substituent can contain from 1 to about 1000 silicone atoms, said organosiloxane optionally being further substituted with straight or branched chain alkyl, alkenyl or alkoxy groups.

In some embodiments, the compositions of the present invention comprise a surfactant component comprising an amine oxide surfactant. In general, amine oxide surfactant comprises an oxyalkylene or a polyoxyalkylene group bonded to the amine oxide nitrogen by a nitrogen-carbon bond wherein the outer terminus of the oxyalkylene or polyoxyalkylene chain is capped with a hydrocarbyl group via an ether linkage.

In some embodiments, amine oxide surfactants of the present invention have a group corresponding to the formula $R^1$—$(XR^2)_m$—$(OR^3)_n$—Z— attached to the amine oxide group via a carbon-nitrogen bond, wherein $R^1$ is a hydrocarbyl group comprising from about 6 to about 22 carbon atoms, $R^2$ and $R^3$ are independently selected from alkylene groups comprising from 2 to 4 carbon atoms, Z is a carbon-nitrogen bond or an oxyhydrocarbylene group comprising from about 2 to about 6 carbon atoms, each X is independently an ether, thioether, sulfoxide, ester, thioester or amide linkage, m is an average number from 0 to about 9, n is an average number from 0 to about 5 and m+n≥1.

In some embodiments, the compositions comprise an alkyl amine oxide surfactant comprising a hydrophobic moiety and a hydrophilic moiety represented by formula (XIV):

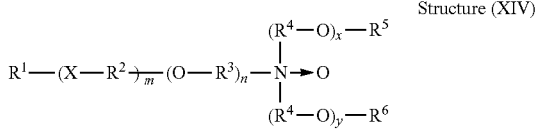

Structure (XIV)

wherein $R^1$ is $C_{1-22}$ a straight or branched chain hydrocarbyl; each X is independently an ether, thioether, sulfoxide, ester, thioester or amide linkage; each $R^2$ is independently $C_{2-6}$ alkylene; each $R^3$ and $R^4$ are independently $C_{2-4}$ alkylene; and $R^5$ and $R^6$ are independently hydrogen, $C_{1-4}$ alkyl or $C_{2-4}$ acyl; x and y are average numbers such that the sum of x and y is from 2 to about 60, more preferably about 2 to about 40, more preferably about 2 to about 20; m is 0 to about 9; and n is 0 to about 5, more preferably about 1 to about 5, still more preferably about 1 to about 3 and when n is not 0 or when m is not 0 and X is and ether, the amine oxide surfactant is termed an etheramine oxide; and m+n is preferably at least one. $R^1$ is preferably a $C_{6-22}$ hydrocarbyl, more preferably a $C_{8-18}$ alkyl, aryl or alkaryl. In some embodiments, m is 0. When m and n are 0, and $R^5$ and $R^6$ are H, $R^1$ is $C_{9-22}$. $R^3$ and $R^4$ are preferably ethyl, n-propyl or i-propyl. In some embodiments, $R^1$ is straight or branched chain $C_{8-18}$ alkyl, aryl or alkaryl, and m is 0. In some other embodiments, $R^1$ is straight or branched chain $C_{8-18}$ alkyl, $R^3$ is ethyl, n-propyl or i-propyl, n is from 1 to about 3, $R^4$ is ethylene, the sum of x and y is from 2 to about 20, and $R^5$ and $R^6$ are hydrogen. In some other embodiments, the surfactant includes commercial surfactants known in the art or referred to herein as "alkyletherdimethylamine oxides" (where n is 1-5, x and y are 0, and $R^5$ and $R^6$ are methyl) and certain "polyoxyalkylene alkyletheramine oxides" (where n is 1-5, x+y is 2 or greater, and $R^5$ and $R^6$ are hydrogen).

A useful class of alkyl amine oxide surfactants are disclosed in U.S. Pat. No. 5,750,468 (the contents of which are incorporated herein) to be suitable for preparation of aqueous solution concentrate compositions of various glyphosate salts, the potassium salt being included in the list of salts mentioned. It is disclosed therein that an advantage of the subject surfactants when used in an aqueous composition with glyphosate salts is that these surfactants permit the glyphosate concentration of the composition to be increased to very high levels. The surfactants of U.S. Pat. No. 5,750,468 predominantly comprise one or more surfactants having Structure (XV)

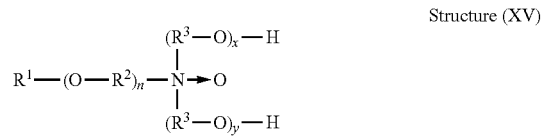

Structure (XV)

wherein $R^1$ is straight or branched chain $C_{6-22}$ alkyl, aryl or alkylaryl group; n is an average number from 0 to about 10, more preferably from about 1 to about 10, and when n is not 0 the amine oxide surfactant is termed an etheramine oxide surfactant; $R^2$ in each of the (O—$R^2$)$_n$ groups is independently $C_{1-4}$ alkylene; $R^3$ groups are independently $C_{1-4}$ alkylene; and x and y are average numbers such that x+y is in the range from 2 to about 60. When n is 0, $R^1$ is straight or branched chain $C_9$-22 alkyl. An example of an amine oxide of Structure (XV) is the surfactant from Tomah Products designated AO-14-2 wherein $R^1$ is isodecyl, $R^2$ is n-propyl, $R^3$ is ethyl, n is 1, and x+y is 2.

In reference to Structure (XV), aryl groups, if present in $R^1$, have 5-7, preferably 6, carbon atoms and may or may not be substituted. The alkyl portion in any alkylaryl group comprising $R^1$ has 1-16 carbon atoms. An example of such an alkylaryl group is alkylphenyl, for example nonylphenyl.

In further reference to Structure (XV), it is preferred that R1 is a straight or branched chain alkyl group having about 8 to about 18 carbon atoms. The $R^2$ substituent closest to the nitrogen atom (the proximal $R^2$ group) is preferred to be a normal propylene, isopropylene or ethylene group. Where the proximal $R^2$ group is n-propylene, n is preferably 1. Where the proximal $R^2$ group is i-propylene or ethylene, n is preferably in the range of from 1 to 5, more preferably from 2 to 3, and all $R^2$ groups are preferably the same. $R^3$ substituents in preferred examples are independently selected from i-propylene and ethylene, with ethylene more preferred. In some embodiments, x+y is preferred to be in the range of from 2 to 20, from 2 to 10, or even from 2 to 5.

In yet another alternative, the amine oxide surfactants predominantly comprise one or more surfactants having Structure (XVI):

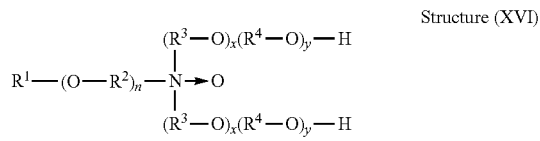

Structure (XVI)

wherein $R^1$ is straight or branched chain $C_{6-22}$ alkyl or an aryl or alkylaryl group; n is an average number from 0 to 10, preferably from 1 to about 10 and when n is not 0 the amine oxide surfactant is termed an etheramine oxide surfactant; $R^2$, $R^3$ and $R^4$ are independently $C_{1-4}$ alkylene; and x and y are average numbers such that x+y is in the range from 2 to about 60. When n is 0, R1 is straight or branched chain $C_{9-22}$ alkyl. An example of an amine oxide of formula (XVIII) is the surfactant from Akzo Nobel designated C6602 wherein R1 is $C_{12}$, n is 0, $R^3$ is ethyl, $R^4$ is n-propyl, x=9 and y=2.

In reference to Structure (XVI), aryl groups, if present in R1, have 5-7, preferably 6, carbon atoms and may or may not be substituted with moieties. The alkyl portion is any alkylaryl group comprising $R^1$ has 1-16 carbon atoms. An example of such an alkylaryl group is alkylphenyl, for example nonylphenyl.

In further reference to Structure (XVI), it is preferred that $R^1$ is a straight or branched chain alkyl group having about 8 to about 18 carbon atoms, and is derived from the corresponding alcohol. The $R^2$ substituent closest to the nitrogen atom (the proximal $R^2$ group) is preferred to be a normal propylene, isopropylene or ethylene group. Where the proximal $R^2$ group is n-propylene, n is preferably 1. Where the proximal $R^2$ group is i-propylene or ethylene, n is preferably in the range of from 1 to 5, more preferably from 2 to 3, and all $R^2$ groups are preferably the same. $R^3$ and $R^4$ substituents in preferred examples are independently selected from i-propylene and ethylene, with ethylene more preferred. In some embodiments, x+y is preferred to be in the range of from 2 to 20, from 2 to 10, or even from 2 to 5.

In another embodiment, a class of amine oxide surfactants are represented by Structure (XVII):

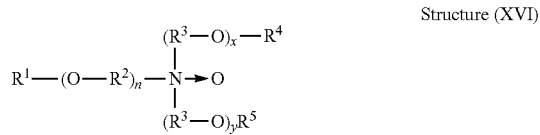

Structure (XVI)

wherein where $R^1$ is straight or branched chain $C_{6-22}$ alkyl, aryl or alkylaryl group; n is an average number from 0 to about 10 and when n is not 0 the amine oxide is termed an etheramine oxide; $R^2$ and $R^3$ are independently $C_{1-4}$ alkylene; $R^4$ is hydrogen or $C_{1-4}$ alkyl; $R^5$ is $C_{1-4}$ alkyl; and x and y are average numbers such that x+y is in the range from 2 to about 60.

In some embodiments, a class of etheramine oxide surfactants are represented by Structure (XVIII):

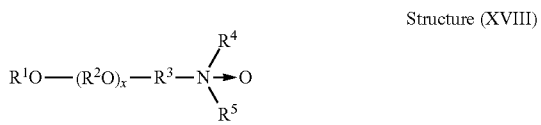

Structure (XVIII)

wherein $R^1$ is a hydrocarbyl or substituted hydrocarbyl having from 1 to about 30 carbon atoms; $R^2$ in each of the $(R^2O)_x$ groups is independently $C_2$-$C_4$ alkylene; $R^3$ is a hydrocarbylene or substituted hydrocarbylene having from 2 to about 6 carbon atoms; $R^4$ and $R^5$ are each independently hydrogen, hydrocarbyl or substituted hydrocarbyl having from 1 to about 30 carbon atoms, $—(R^6)_n—(R^2O)_yR^7$; $R^6$ is hydrocarbylene or substituted hydrocarbylene containing from 1 to about 6 carbon atoms, $R^7$ is hydrogen or a linear or branched alkyl group having 1 to about 4 carbon atoms, n is 0 or 1, and x and y are independently an average number from 1 to about 60. In this context, preferred $R^1$, $R^4$, $R^5$ and $R^6$ hydrocarbyl (hydrocarbylene) groups include linear or branched alkyl (alkylene), linear or branched alkenyl (alkenylene), linear or branched alkynyl (alkynylene), aryl (arylene), or aralkyl (aralkylene) groups. Preferably, $R^1$ is a linear or branched alkyl or linear or branched alkenyl group having from about 8 to about 25 carbon atoms, $R^2$ in each of the $(R^2O)_x$ groups is independently $C_2$-$C_4$ alkylene, $R^3$ is a linear or branched alkylene or alkenylene group having from 2 to about 6 carbon atoms, $R^4$ and $R^5$ are each independently hydrogen or a linear or branched alkyl group having from 1 to about 6 carbon atoms, and x is an average number from 1 to about 30. More preferably, $R^1$ is a linear or branched alkyl group having from about 12 to about 22 carbon atoms, $R^2$ in each of the $(R^2O)_x$ groups is independently ethylene or propylene, $R^3$ is a linear or branched alkylene or alkenylene group having from 2 to about 6 carbon atoms, $R^4$ and $R^5$ are each independently hydrogen, methyl, or tris(hydroxymethyl)methyl, and x is an average number from about 2 to about 30. Even more preferably, $R^1$ is a linear or branched alkyl group having from about 12 to about 18 carbon atoms, $R^2$ in each of the $(R^2O)_x$ groups is independently ethylene or propylene, $R^3$ is an ethylene, propylene or 2-hydroxypropylene group, $R^4$ and $R^5$ are each independently hydrogen or methyl, and x is an average number from about 4 to about 20. Most preferably, $R^1$ is a linear or branched alkyl group having from about 12 to about 18 carbon atoms, $R^2$ in each of the $(R^2O)_x$ groups is independently ethylene or propylene, $R^3$ is an ethylene, propylene, or 2-hydroxypropylene group, $R^4$ and $R^5$ are methyl, and x is an average number from about 4 to about 20.

The water-insoluble agrochemical component may be dissolved in a surfactant component comprising one or more amidoalkylamine surfactants. The amidoalkylamine surfactants have the general Structure (XIX):

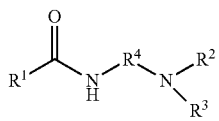

Structure (XIX)

wherein $R^1$ is a hydrocarbyl or substituted hydrocarbyl having from 1 to about 22 carbon atoms, $R^2$ and $R^3$ are each independently hydrocarbyl or substituted hydrocarbyl having from 1 to about 6 carbon atoms and $R^4$ is hydrocarbylene or substituted hydrocarbylene having from 1 to about 6 carbon atoms.

$R^1$ is preferably an alkyl or substituted alkyl having an average value of carbon atoms between about 4 to about 20 carbon atoms, preferably an average value between about 4 and about 18 carbon atoms, more preferably an average value from about 4 to about 12 carbon atoms, more preferably an average value from about 5 to about 12 carbon atoms, even more preferably an average value from about 6 to about 12 carbon atoms, and still more preferably an average value from about 6 to about 10 carbon atoms. The $R^1$ alkyl group may be derived from a variety of sources that provide alkyl groups having from about 4 to about 18 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). In some embodiments, the amidoalkylamine surfactant component may comprise a blend of amidoalkylamines having alkyl chains of various lengths from about 5 carbon atoms to about 12 carbon atoms. For example, depending upon the source of the $R^1$ alkyl group, an amidoalkylamine surfactant component may comprise a blend of surfactants having $R^1$ groups that are 5 carbon atoms in length, 6 carbon atoms in length, 7 carbon atoms in length, 8 carbon atoms in length, 9 carbon atoms in length, 10 carbon atoms in length, 11 carbon atoms in length, and 12 carbon atoms in length, longer carbon chains, and combinations thereof. In other embodiments, the amidoalkylamine surfactant component may comprise a blend of surfactants having $R^1$ groups that are 5 carbon atoms in length, 6 carbon atoms in length, 7 carbon atoms in length, and 8 carbon atoms in length. In some alternative embodiments, the amidoalkylamine surfactant component may comprise a blend of surfactants having $R^1$ groups that are 6 carbon atoms in length, 7 carbon atoms in length, 8 carbon atoms in length, 9 carbon atoms in length, and 10 carbon atoms in length. In other embodiments, the amidoalkylamine surfactant component may comprise a blend of surfactants having $R^1$ groups that are 8 carbon atoms in length, 9 carbon atoms in length, 10 carbon atoms in length, 11 carbon atoms in length, and 12 carbon atoms in length.

$R^2$ and $R^3$ are independently preferably an alkyl or substituted alkyl having from 1 to about 4 carbon atoms. $R^2$ and $R^3$ are most preferably independently an alkyl having from 1 to about 4 carbon atoms, and most preferably methyl. $R^4$ is preferably an alkylene or substituted alkylene having from 1 to about 4 carbon atoms. $R^4$ is most preferably an alkylene having from 1 to about 4 carbon atoms, and most preferably n-propylene.

In one preferred amidoalkylamine surfactant, $R^1$ is $C_{6-12}$, i.e., an alkyl group having 6 carbon atoms, 7 carbon atoms, 8 carbon atoms, 9 carbon atoms, 10 carbon atoms, 11 carbon atoms, 12 carbon atoms, or a blend of any of these, i.e., from about 6 carbon atoms to about 12 carbon atoms; $R^2$ and $R^3$ are each methyl; and $R^4$ is n-propylene (i.e., $C_{6-10}$ amidopropyl dimethylamine). Examples of some commercial amidoalkylamine surfactants include Adsee C80W, Armeen APA 810 and Armeen APA 9 wherein "APA' refers to amidopropyl alkylamine.

In some embodiments, the compositions of the present invention comprise a surfactant component comprising an alkoxylated alcohol surfactant.

Alkoxylated alcohol surfactants of the present invention may have the general Structure (XX):

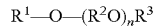  Structure (XX)

wherein $R^1$ is a hydrocarbyl or substituted hydrocarbyl having from about 4 to about 22 carbon atoms; $R^2$ is a hydrocarbylene having 2, 3, or 4 carbon atoms (e.g., ethylene, propylene or isopropylene); $R^3$ is hydrogen or $C_{1-6}$ alkyl; and n is an average value ranging from about 2 to about 50.

$R^1$ is preferably an alkyl group having from about 4 to about 22 carbon atoms, more preferably from about 8 to about 18 carbon atoms, and still more preferably from about 12 to about 18 carbons atoms. $R^1$ may be branched or linear. Preferably, $R^1$ is linear. The $R^1$ alkyl group may be derived from a variety of sources that provide alkyl groups having from about 4 to about 22 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). Sources of the $R^1$ group include, for example, coco or tallow, or $R^1$ may be derived from synthetic hydrocarbyls, such as decyl, dodedecyl, tridecyl, tetradecyl, hexadecyl, or octadecyl groups. The $R^1$ alkyl chain in a population of alkoxylated alcohol surfactants typically comprises alkyl chains having varying length, for example, from 12 to 16 carbons in length, or from 16 to 18 carbons in length, on average. Most preferably, the $R^1$ alkyl chain comprises predominantly 12 to 16 carbon atoms. $R^2$ is preferably ethylene. $R^3$ is preferably hydrogen. The value of n is preferably an average between about 2 and about 30, more preferably between about 2 and about 20, even more preferably between about 2 and about 10.

Specific alkoxylated alcohol surfactants for use in the compositions of the present invention include, for example, Ethylans, such as Ethylan 1005, Ethylan 1008, and Ethylan 6830 available from Akzo Nobel; Berols, such as Berol 048, Berol 050, Berol 175, Berol 185, Berol 260, Berol 266, and Berol 84, among others, also available from Akzo Nobel; Brij 30, 35, 76, 78, 92, 97 or 98 available from ICI Surfactants; Tergitol 15-S-3, 15-S-5, 15-S-7, 15-S-9, 15-S-12, 15-S-15 or 15-S-20 available from Union Carbide; or Surfonic L24-7, L12-8, L-5, L-9, LF-17 or LF-42 available from Huntsman.

Anionic surfactants useful as components of the stabilizing system of compositions of the include, without restriction, C8-20 alkyl carboxylates including fatty acids, C8-20 alcohol sulfates, phosphate esters of alkoxylated tertiary amines, phosphate esters of alkoxylated etheramines, phosphate esters of alkoxylated alcohols such as C8-20 alcohol phosphate mono- and diesters, C8-20 alcohol and (C8-20 alkyl)phenol polyoxyethylene ether carboxylates, sulfates and sulfonates, C8-20 alcohol and (C8-20 alkyl)phenol polyoxyethylene phosphate mono- and diesters, C8-20 alkylbenzene sulfonates, naphthalene sulfonates and formaldehyde condensates thereof, lignosulfonates, C8-20 alkyl sulfosuccinates and sulfosuccinamates, C8-20 alkyl polyoxyethylene sulfosuccinates and sulfosuccinamates, and C8-20 acyl glutamates, sarcosinates, isethionates and taurates.

In some embodiments, the compositions of the present invention comprise a surfactant component comprising a surfactant selected from among phosphate esters of alkoxylated tertiary amine surfactants or phosphate esters of alkoxylated etheramine surfactants.

Phosphate esters of alkoxylated tertiary amine surfactants for use in the compositions of the present invention have the general structures (XXIa) and (XXIb):

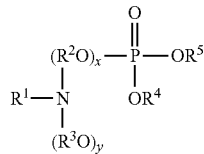

Structure (XXIa)

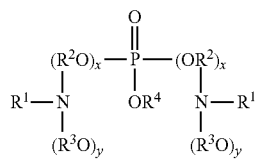

Structure (XXIb)

wherein each $R^1$ is independently a hydrocarbyl or substituted hydrocarbyl having from about 4 to about 22 carbon atoms, $R^2$ and $R^3$ are each independently hydrocarbylene having 2, 3, or 4 carbon atoms (e.g., ethylene, propylene or isopropylene), the sum of each x and y group is an average value ranging from about 2 to about 60, and $R^4$ and $R^5$ are each independently hydrogen or a linear or branched chain hydrocarbyl or substituted hydrocarbyl having from 1 to about 6 carbon atoms.

Each $R^1$ is preferably independently an alkyl having from about 4 to about 22 carbon atoms, more preferably from about 8 to about 18 carbon atoms, and still more preferably from about 12 to about 18 carbons atoms, for example coco or tallow. $R^1$ is most preferably tallow. Each $R^2$ and $R^3$ is preferably ethylene. The sum of each x and y group is preferably independently an average value ranging from about 2 to about 22, more preferably between about 10 and about 20, for example, about 15. More preferably $R^4$ and $R^5$ are each independently hydrogen or a linear or branched chain alkyl having from 1 to about 6 carbon atoms. $R^4$ and $R^5$ are preferably hydrogen.

Specific phosphate esters of alkoxylated tertiary amine surfactants for use in the compositions of the present invention are described in U.S. 2002/0160918, by Lewis et al. (Huntsman Petrochemical Corporation), such as phosphate esters of tallow amine ethoxylates, including phosphate esters of SURFONIC® T5, phosphate esters of SURFONIC® T15, phosphate esters of SURFONIC® T20, and mixtures thereof, all available from Huntsman International LLC.

Phosphate esters of alkoxylated etheramine surfactants for use in the compositions of the present invention have the general structures (XXIIa) and (XXIIb):

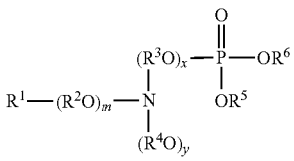

Structure (XXIIa)

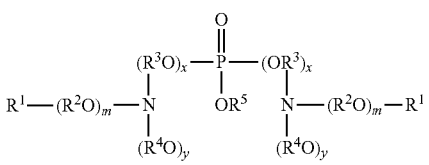

Structure (XXIIb)

wherein each $R^1$ is independently a hydrocarbyl or substituted hydrocarbyl having from about 4 to about 22 carbon atoms; each $R^2$, $R^3$ and $R^4$ is independently a hydrocarbylene having 2, 3, or 4 carbon atoms (e.g., ethylene, propylene or isopropylene); each m is independently an average number from about 1 to about 10; the sum of each x and y group is independently an average value ranging from about 2 to about 60; and each $R^5$ and $R^6$ are independently hydrogen or a linear or branched chain alkyl having from 1 to about 6 carbon atoms.

Each $R^1$ is preferably independently an alkyl having from about 4 to about 22 carbon atoms, more preferably from about 8 to about 18 carbon atoms, from about 10 to about 16 carbon atoms, from about 12 to about 18 carbons atoms, or from about 12 to about 14 carbon atoms. Sources of the $R^1$ group include, for example, coco or tallow, or $R^1$ may be derived from synthetic hydrocarbyls, such as decyl, dodedecyl, tridecyl, tetradecyl, hexadecyl, or octadecyl groups. Each $R^2$ may independently be propylene, isopropylene, or ethylene, and each m is preferably independently from about 1 to 5, such as 2 to 3. Each $R^3$ and $R^4$ may independently be ethylene, propylene, isopropylene, and are preferably ethylene. The sum of each x and y group is preferably independently an average value ranging from about 2 to about 22, such as from about 2 to 10, or about 2 to 5. In some embodiments, the sum of each x and y group is preferably independently between about 10 and about 20, for example, about 15. More preferably $R^5$ and $R^6$ are each independently hydrogen or a linear or branched chain alkyl having from 1 to about 6 carbon atoms. $R^5$ and $R^6$ are preferably hydrogen.

Phosphate esters of alkoxylated alcohol co-surfactants for use in the compositions of the present invention have the general structures (XXIIIa) and (XXIIIb):

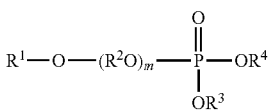

Structure (XXIIIa)

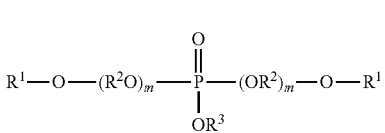

Structure (XXIIIb)

wherein each $R^1$ is independently a hydrocarbyl or substituted hydrocarbyl having from about 4 to about 22 carbon atoms; each $R^2$ is independently a hydrocarbylene having 2, 3, or 4 carbon atoms (e.g., ethylene, propylene or isopropylene); each m is independently an average number from about 1 to about 60; and $R^3$ and $R^4$ are each independently hydrogen or a linear or branched chain alkyl having from 1 to about 6 carbon atoms.

Each $R^1$ is preferably independently an alkyl having from about 4 to about 22 carbon atoms, more preferably from about 8 to about 20 carbon atoms, or an alkylphenyl having from about 4 to about 22 carbon atoms, more preferably from about 8 to about 20 carbon atoms. Sources of the $R^1$ group include, for example, coco or tallow, or $R^1$ may be derived from synthetic hydrocarbyls, such as decyl, dodedecyl, tridecyl, tetradecyl, hexadecyl, or octadecyl groups. Each $R^2$ may independently be propylene, isopropylene, or ethylene, and is preferably ethylene. Each m is preferably independently from about 9 to about 15. More preferably $R^3$ and $R^4$ are each independently hydrogen or a linear or branched chain alkyl having from 1 to about 6 carbon atoms. $R^4$ and $R^5$ are preferably hydrogen.

Specific phosphate esters of alkoxylated alcohol surfactants for use in the compositions of the present invention include, for example, EMPHOS CS-121, EMPHOS PS-400, and WITCONATE D-51-29, available from Akzo Nobel.

In some embodiments, the compositions of the present invention comprise a surfactant component comprising a siloxane surfactant. The siloxane surfactant conforms to formula (XXIV):

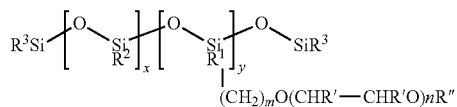

Structure (XXIV)

wherein x is an integer or average of integers of 0 to about 100, y is an integer or average of integers of 1 to about 30, each m is independently an integer of 1 to about 20, each n is independently an integer of 1 to about 30, each $R^1$, $R^2$, and $R^3$ group is independently a hydrogen or $C_{1-6}$ hydrocarbyl group, each R' group is independently a hydrogen or $C_{1-4}$ alkyl group, and each R" group is independently a hydrogen $C_{1-20}$ hydrocarbyl or an acyl group. In preferred siloxane surfactants, x is an integer or average of integers of 0 to about 10, more preferably 0 or 1 and most preferably 0. In preferred siloxane surfactants, y is an integer or average of integers of 1 to about 10, most preferably 1. It is preferred that m be an integer of 2 to 6, most preferably 3. It is preferred that n be about 5 to about 20, with all R' groups being hydrogen. It is preferred that $R^1$, $R^2$, and $R^3$ groups be independently selected from hydrogen and $C_{1-4}$ alkyl groups, with hydrogen and methyl groups being particularly preferred. It is preferred that R" is a hydrogen or $C_{1-4}$ alkyl group, with hydrogen and methyl groups again being particularly preferred.

Siloxane surfactants of formula (XXIV) are generally described in product literature of OSi Specialties, Inc. (e.g., SILWET Surfactants, OSi Specialties, Inc., Danbury, Conn., 1994), and in U.S. Pat. No. 3,505,377. Several polyoxyethylene trisiloxanes are available from OSi Specialties as SILWET surface-active copolymers. Examples suitable as micropore infiltrants for the practice of the present invention include SILWET L-77, SILWET 408 and SILWET 800. Another suitable micropore infiltrant is SYLGARD 309 of Dow Corning.

In some embodiments, the compositions of the present invention comprise a surfactant component comprising alkoxylated alkylphenols or alkoxylated dialkylphenols having the structure (XXV):

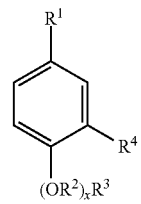

Structure (XXV)

wherein $R^1$ and $R^4$ are independently hydrogen, or a linear or branched alkyl group having from 1 to about 30 carbon atoms and at least one of $R^1$ and $R^4$ is an alkyl group, $R^2$ in each of the $(R^2O)_x$ groups is independently $C_2$-$C_4$ alkylene, $R^3$ is hydrogen, or a linear or branched alkyl group having from 1 to about 4 carbon atoms, and x is an average number from 1 to about 60. Preferably, $R^1$ and $R^4$ are independently linear or branched alkyl groups having from 8 to about 30 carbon atoms, $R^2$ in each of the $(R^2O)_x$ groups is independently $C_2$-$C_4$ alkylene, $R^3$ is hydrogen, methyl, or ethyl, and x is an average number from about 5 to about 50. More preferably, $R^1$ and $R^4$ are independently linear or branched alkyl groups having from about 8 to about 22 carbon atoms, $R^2$ in each of the $(R^2O)_x$ groups is independently ethylene or propylene, $R^3$ is hydrogen or methyl, and x is an average number from about 8 to about 40. Even more preferably, $R^1$ and $R^4$ are independently linear or branched alkyl groups having from about 8 to about 16 carbon atoms, $R^2$ in each of the $(R^2O)_x$ groups is independently ethylene or propylene, $R^3$ is hydrogen or methyl, and x is an average number from about 10 to about 30. Preferred commercially available alkoxylated dialkylphenols include ethoxylated dinonyl phenols such as SURFONIC DNP 100, SURFONIC DNP 140, and SURFONIC DNP 240 (from Huntsman).

Microemulsion Compositions

The microemulsion concentrate compositions of the present invention comprise one or more substantially water-immiscible organic solvents, and are characterized as having high water-soluble pesticide and water-insoluble agrochemical loading and reduced solvent content as compared to microemulsion compositions known in the art.

The weight ratio of the organic solvent to the water-insoluble agrochemical (active equivalent basis) is preferably less than 3:1, 2.5:1, 2:1, 1.5:1, 1:1, 1:1.5 or even less than 1:2, and ranges thereof, for instance, from 1:2 to 3:1.

Solvent selection is generally governed by parameters including the ability of the solvent to dissolve the active ingredient, low phytotoxicity to plants, non-reactivity with the active ingredient or emulsifiers, high flash point, good thermal stability, low human toxicity and skin irritation, compatibility with the packaging materials and application equipment, and availability and cost. Selection of a suitable solvent, or combination of surfactant and solvent, can be made using testing methodology as hereinbefore described for surfactants.

Because the water-insoluble agrochemical is at least partially dissolved in the surfactant component, the amount of required solvent is reduced as compared to compositions known in the art. Therefore, in some embodiments, the amount of solvent to be used is less than that required to completely dissolve the water-insoluble agrochemical. Further, the microemulsion concentrates of the present invention are generally stable in the absence of stabilizers.

Suitable water-immiscible organic solvents are listed in many Handbooks such as "Industrial Solvent Handbook" Second Edition, by Ibert Mellan Noyes Data Company. Suitable solvents are also described in U.S. Pub. No. 2004/0132621, the entire contents of which are hereby incorporated by reference. Suitable organic solvents include acyclic (aliphatic) hydrocarbons or cyclic hydrocarbons. Examples include toluene, xylenes, mesitylene, ethylbenzene, or hydrocarbons with fused aromatic ring systems such as naphthalenes, for example 1-methylnaphthalene, 2-methylnaphthalene or dimethylnaphthalene, or other fused aromatic hydrocarbons such as indane or tetralin. Other suitable hydrocarbons include cycloaliphatics, for example, saturated or unsaturated, cycloaliphatic hydrocarbons which are optionally mono- or polysubstituted by alkyl (for example mono-, di- or trisubstituted by (C1-C10)alkyl) such as cycloalkanes, cycloalkenes or cycloalkynes, for example cyclohexane or methylcyclopentane. Yet other hydrocarbons include aliphatics, for example linear or branched, saturated or unsaturated aliphatic hydrocarbons, preferably C5-C16-aliphatic hydrocarbons, for example alkanes, alkenes or alkynes, such as pentane, hexane, octane, 2-methylbutane or 2,2,4-trimethylpentane. Examples of suitable solvents include ARMIX DM810, ARMIX 185B, JEFFSOL AG1730, AROMATIC 200. Water-immiscible organic solvents can optionally be included in the SC and dry compositions of the present invention.

Solution Concentrates

In some embodiments of the present invention, aqueous solution concentrate compositions (SL) comprising a water-soluble agrochemical and a water-insoluble agrochemical dissolved in the surfactant are provided. Essentially all of the water-insoluble agrochemical is present as a solute in the surfactant component thereby forming clear SL compositions. SL compositions of the present invention are characterized by the absence of an effective amount of an organic solvent, such as a substantially water-immiscible organic solvent.

SL compositions of the present invention are formed by combining with agitation an aqueous solution of the water-soluble pesticide and a solution of the water-insoluble agrochemical in the surfactant component.

SL compositions of the present invention preferably have a water-soluble pesticide concentration of at least 400, 450, 500 or 550 grams active equivalent per liter. A weight ratio of surfactant to water-insoluble agrochemical on an active equivalent basis of 20:1, 15:1, 10:1, 5:1, 4:1, 3:1, 2:1, 1.5:1 or even 1:1, and ranges therefore, such as 2:1 to 10:1 or 2:1 to 5:1 is preferred. A total surfactant loading of from about 2 to about 20 wt % is preferred. A weight ratio of water-soluble pesticide (a.e. basis) to total surfactant of from about 1:1 to about 20:1 is preferred, more preferably from about 2:1 to about 10:1, still more preferably from about 3:1 to about 6:1.

SL compositions of the present invention are storage stable and preferably have a cloud point of not less than about 50° C., more preferably not less than about 60° C. and do not exhibit phase separation on exposure to temperatures up to about 50° C. for 14-28 days. SL compositions preferably have a crystallization point of less than 0° C., more preferably less than −10° C., for up to about 7 days without crystal growth, even in the presence of seed crystals.

In one SL embodiment of the present invention, the water-soluble agrochemical is a salt of glyphosate and the water-insoluble agrochemical is tebuconazole (See, for example, formulation 9 in Example 3).

Suspension Concentrates

Suspension concentrate (SC) compositions of the present invention comprise a first portion of a water-insoluble agrochemical dissolved in the surfactant and a second portion of the water-insoluble agrochemical present as a solid particulate. Experimental evidence to date shows that stable SC compositions can be formed in the absence of a suspension aid such as a solid particulate.

SC compositions of the present invention are formed by combining with agitation an aqueous solution of the water-soluble pesticide and a solution of the water-insoluble agrochemical in surfactant. After combination, a portion of the water-insoluble agrochemical precipitates from solution as a fine particulate solid. At least 10%, 20%, 30%, 40%, 50%, 60%, 70%, 80% or even 90% by weight of the water-insoluble agrochemical remains in solution in the surfactant. It is believed that the particulate surface area and particle size are such that the particulate forms a stable suspension or a composition that can readily be re-suspended.

Although not require for the practice of the present invention, a stabilizing amount of a suspension aid can optionally be incorporated into the SC compositions of the present invention. The suspension aid preferably comprises a silica, more preferably a particulate hydrophilic fumed or precipitated silica. A silica useful as a suspension aid herein preferably has a BET surface area of about 100 to about 300 m2/g, more preferably about 120 to about 250 m2/g and most preferably about 150 to about 250 m2/g, and a bulk density of about 10 to about 70 g/l, more preferably about 20 to about 50 g/l.

Specific examples of preferred silicas include AEROSIL 200, an amorphous hydrophilic fumed silica of Degussa Corporation, and HI-SIL T-152, an untreated amorphous precipitated silica of PPG Industries. AEROSIL 200 has a surface area of 175-225 m2/g and a bulk density of about 30 g/l. HI-SIL T-152 has a surface area of about 150 m2/g and a bulk density of about 48 g/l. Preferably, silica is used in an amount of about 0.05% to about 5%, more preferably about 0.2% to about 3%, and most preferably about 0.5% to about 2%, by eight of the suspension concentrate composition.

Optional Components

The compositions of the present invention can further comprise optional components including ammonium salts such as ammonium sulfate, sodium sulfite, glycols such as diethylene glycol or propylene glycol, and antifoam.

Processes for Preparing Compositions of the Present Invention

In the compositions of the present invention, the water-insoluble agrochemical is preferably dissolved in the surfactant component to form a premix prior to formulation with the remainder of the components of the composition. For solid water-insoluble agrochemicals, the average particle size is preferably less than about 50, 20 or, more preferably, less than about 10 micrometers. If the average particle size is larger than the preferred range, such as about 100 micrometers, which is common for commercially available water-insoluble agrochemicals, the water-insoluble agrochemicals are preferably milled to the preferred particle size. Milling of the water-insoluble agrochemical powder may occur by mixing the powder with water and a dispersant, such as Pluraflo L1060 to prepared a millable mixture. Conventional milling equipment, such as an Eiger mill or other mills, may be employed to mill the particles to the preferred average particle size. After milling (if necessary), the water-insoluble agrochemical may be dissolved in the surfactant using any suitable mixing means known in the art, e.g., agitation or sonication.

The surfactant/water-insoluble agrochemical premix is generally prepared by combining the surfactant component with the agrochemical with agitation and at a temperature close to, or above, the melting point of the water-insoluble agrochemical. Accordingly, a temperature range for dissolution of from about 50° C. to about 110° C. is preferred. The premix is typically cooled to from about 20° C. to about 50° C. after dissolution and before combination with the water-soluble pesticide.

In some embodiments of the invention, the surfactant/water-insoluble agrochemical premix may optionally comprise a water-immiscible organic solvent. Preferred organic solvent ratios to water-insoluble agrochemical and surfactant are described hereinbefore.

The water-soluble pesticide premix is prepared by dissolving the water-soluble pesticide in water using dissolution methods known to those skilled in the art. Preferably the water-soluble pesticide concentration is at least 400, 450, 500 or 550 grams active equivalent per liter.

The ME and SC compositions are prepared by combining the surfactant/water-insoluble agrochemical premix and the water-soluble pesticide premix in a suitable vessel with agitation. The order of addition is not narrowly critical, but generally the surfactant premix is added to the water-soluble pesticide premix because the water-soluble premix contains the carrier phase.

In an alternate embodiment for preparing ME compositions, a water-insoluble agrochemical is dissolved in an organic solvent to form a solvent/water-insoluble agrochemical premix. The solvent/water-insoluble agrochemical premix is thereafter combined with a water-soluble pesticide premix and a surfactant component in a suitable vessel with agitation. Optionally, the surfactant component can comprise a surfactant/water-insoluble agrochemical premix.

Compositions of the present invention that are formulated into ME concentrates preferably have a cloud point of not less than about 50° C., more preferably not less than about 60° C. High temperature storage stability is often indicated by a cloud point of about 50° C. or more. Cloud point of a composition is normally determined by heating the composition until the solution becomes cloudy, and then allowing the composition to cool, with agitation, while its temperature is continuously monitored. A temperature reading taken when the solution clears is a measure of cloud point. A cloud point of 50° C. or more is normally considered acceptable for most commercial purposes. The ME compositions preferably do not exhibit phase separation on exposure to temperatures up to about 50° C. for 14-28 days. The ME compositions preferably have a crystallization point of less than 0° C., more preferably less than −10° C., for up to about 7 days without crystal growth, even in the presence of seed crystals, such as glyphosate salt seed crystals. Compositions possessing the cloud point, crystallization and phase separation features described above are termed "storage stable."

The ME and SC compositions of the present invention are preferably formulated to have a viscosity such that the composition may be pumped with standard bulk pumping equipment at 0° C. at rates of at least 7.5 gallons per minute, preferably more than 10 gallons per minute, even more preferably greater than 12.5 gallons per minute. Preferably, the viscosity of the compositions is no more than 1000 cp at 20° C.

The surfactant/water-insoluble agrochemical premix may be incorporated into a solid glyphosate material prepared according to methods known in the art, such as those described in U.S. Pat. No. 6,734,142, incorporated herein by reference as if set forth in its entirety. The method described therein is directed to the preparation of dry, granulated ammonium glyphosate compositions. According to the method of the present invention, as depicted in FIG. 1, the premix may be introduced into the processes described therein at one or a combination of various points during the preparation of the dry glyphosate compositions of the present invention, such as with the glyphosate acid feed stock, as a component of the glyphosate-ammonia salt forming reaction mixture and/or in the mixing step prior to extrusion. Although the process described in U.S. Pat. No. 6,734,142 and depicted in FIG. 1 is directed to ammonium glyphosate, other pesticide salts fall within the scope of the present invention. For instance, sodium hydroxide could be substituted for ammonia such that the dry compositions of the sodium salt of glyphosate would be prepared. Further, salts of other pesticide anions or cations could formed by reaction with a suitable cation or anion, such as that supplied by a base or acid. Therefore, although reference is made to ammonium glyphosate hereinbelow, one skilled will recognize that dry compositions of the present invention are not limited to ammonium glyphosate, and other water-soluble pesticides are within the scope of the present invention.

The process of preparing dry, granulated ammonium glyphosate is performed by feeding particulate glyphosate acid, ammonia, water and a surfactant to enhance the lubricity of the composition, to a reactor. According to the process of the present invention, the surfactant/water-insoluble agrochemical premix (hereafter the solution being referred to as "water-insoluble agrochemical premix") may be added to the particulate glyphosate acid, the water stream and/or may be added directly to the reactor. The components of the reaction mixture are then mixed in the reactor to form a reaction mass wherein the ammonia reacts with the glyphosate acid to form a downstream processable ammonium glyphosate product. The reactor may be any apparatus capable of mixing solid and liquid materials to produce a paste or comparable composition such as, for example, food mixers, planetary mixers, ribbon blenders, or kneaders.

A suitable reactor comprises a rotatable shaft having one or more screw elements coaxial with the shaft and bearing a plurality of radially disposed pins and/or paddles. Upon rotation of the shaft, the screw elements of such an assembly cause bulk movement of the reaction components in a direction parallel to the shaft, while simultaneously the pins and/or paddles constantly mix the ammonia, glyphosate acid, water-insoluble agrochemical premix, and, optionally, water and organic solvent, and create a large interface. More than one of such shafts can be present, disposed parallel to one another and rotatable in the same direction or in opposite directions. Optionally, ports may be present near the output end of the reactor for exhaust of water vapor, excess ammonia, and if added, volatile organic solvent.

In one embodiment, the mixing apparatus is a continuous processor comprising an elongated chamber having one or more, preferably one or two, rotatably disposed shafts as described above, each on an axis parallel to the elongated dimension of the chamber. Operation of the apparatus by rotation of the shafts effects: (i) feeding of the glyphosate acid and the water-insoluble agrochemical premix into the chamber through the aperture at the input end; (ii) mixing of the ingredients to form a reaction mass; (iii) transport of the reaction mass and the resulting composition towards the output end of the chamber; and, (iv) discharge of the pesticidal composition comprising the water-soluble pesticide. Additional materials, e.g., water, water-insoluble agrochemical-surfactant premix, and ammonia, may be injected through ports located between the input and output ends. In one embodiment, the water and water-insoluble agrochemical-surfactant premix are pre-mixed with the glyphosate acid prior to feeding the glyphosate acid into the reaction chamber. In another embodiment, the water and water-insoluble agrochemical-surfactant premix are pre-mixed prior to feeding into the reaction chamber. In another embodiment, the water, water-insoluble agrochemical premix and an organic solvent are pre-mixed with the glyphosate acid prior to feeding the glyphosate acid into the reaction chamber. Optionally, one or more ports for venting water vapor, excess ammonia, and volatile organic solvent can be present; however, it is generally preferred that such venting occur only at the output end itself, through the discharge aperture for the pesticidal composition.

In glyphosate embodiments, particulate glyphosate acid may be added to the reactor either in dry powder or as a wet cake. Preferably, the particulate glyphosate acid is added in the form of a wet cake having a moisture content of less than about 18%, more preferably from about 5% to about 15%, more preferably from about 8% to about 15%, and more preferably from about 11% to about 13% by weight. If the glyphosate acid is supplied in the form of wet cake, it may be necessary to feed the glyphosate acid using a feeder, as described hereinafter, in order to maintain a constant feed rate. Glyphosate acid wet cake is a somewhat cohesive material that typically does not flow freely without the application of external force.

Ammonia is preferably fed to the reactor at a rate sufficient to provide approximately a stoichiometric amount required to react with the glyphosate acid being fed to the reactor thereby forming monoammonium glyphosate. Accordingly, the molar ratio of ammonia to glyphosate acid added to the reactor is about 1 mole of ammonia per mole of glyphosate acid. An ammonia addition rate of less than about 1 mole of ammonia per mole of glyphosate acid may result in a portion of the glyphosate acid remaining unreacted. An ammonia addition rate of greater than about 1 mole of ammonia per mole of glyphosate acid may result in a portion of the glyphosate acid reacting to form diammonium glyphosate. The diammonium salt is more hygroscopic than the monoammonium salt and therefore less desirable. Preferably, the molar ratio of ammonia to glyphosate acid added to the reactor is from about 0.8 to about 1.25, more preferably from about 0.9 to about 1.1 and still more preferably from about 0.95 to about 1.05 moles of ammonia added per mole of glyphosate acid added.

The ammonia may be fed to the reactor through one or more input ports as aqueous ammonia ($NH_4OH$), liquid anhydrous ammonia, gaseous anhydrous ammonia or combinations thereof. Aqueous ammonia contributes additional water to the reactor thereby increasing the total amount of water fed to the reactor. Anhydrous ammonia, whether added in liquid or gaseous form, does not affect the total water balance. However, if fed in the liquid form, part or all of the liquid anhydrous ammonia may be converted to gaseous anhydrous ammonia upon entering the reaction vessel. The liquid anhydrous ammonia absorbs the heat of vaporization required to convert the liquid ammonia to gaseous ammonia from the reaction mass thereby reducing the amount of heat that would otherwise need to be dissipated by other means, such as evaporation of water from the reaction mass or an external cooling system such as a cold water jacket. Accordingly, the ammonia is preferably fed to the reactor as anhydrous ammonia in the liquid form.

Whether the anhydrous ammonia is added in liquid form or gaseous form, at least some amount of gaseous anhydrous ammonia may subsequently exist in the reactor. Preferably, therefore, the reactor is designed to create and maintain a large interfacial area between the reaction mass and the internal atmosphere of the reactor vessel (i.e., the reactor mixes the reaction components such that a significant volume of gas is entrained in the reaction mass). This interfacial area, herein referred to as the gas-paste interface, may affect the efficiency with which the glyphosate acid reacts with ammonia gas present in the internal atmosphere.

In general, the amount of water fed to the reactor is preferably sufficient to contribute usefully to dissipation of heat by evaporative cooling. That is, the evaporation of water from the reaction mass dissipates some of the heat generated in the reaction. While the reaction may be carried out at temperatures as low as ambient temperatures, the temperature of the reaction mass typically increases rapidly due to the exothermic nature of the reaction. The temperature at which the reaction is carried out is typically from about 70° C. to about 105° C. and is more preferably about 100° C. Typically, the reaction mass is cooled to prevent the reaction from overheating; the evaporation of water from the reaction mass reduces the amount of heat that would otherwise need to be removed by other means. Advantageously, the evaporation of water additionally reduces the amount of water that may need to be removed in a subsequent step if a lower water content material is desired.

Although some reduction in moisture concentration is desirable; it is also desirable to maintain a sufficient concentration to sustain the homogeneity of the reaction mass to ensure the completion of the reaction. That is, the evaporation of some of the water in the reaction mass also reduces the moisture content, thus affecting the flow characteristics of the reaction mass. Accordingly, the water is preferably fed to the reactor at a rate sufficient to provide not only the evaporative cooling effect as described above, but also to ensure the reaction mass may be readily homogenized with the degree of energy available in the mixing system used in the reactor, so that the acid-base reaction proceeds smoothly and completely producing a downstream processable paste. In some types of high-energy mixing or kneading equipment having an effective conductive cooling system in the form, for example, of a water jacket, a relatively stiff paste having relatively low moisture content is acceptable, whereas in lower-energy equipment or equipment having a less effective conductive cooling system it can be desirable to form a wetter, more fluid paste.

Typically the evaporation of water results in a decrease of about 1 to about 15 and more typically from about 1 to about 10 percentage points in the moisture content of the reaction mass during reaction step such that the pesticidal composition discharged from the reactor may have a moisture content of from about 0.1% to about 20%. Preferably, the pesticidal composition has a moisture content of from about 2% to about 20%, more preferably from about 2% to about 15%, still more preferably from about 2% to about 10%, still more preferably from about 2% to about 5% and most preferably from about 3% to about 5% by weight.

If the moisture content of the pesticidal composition is greater than about 15% by weight, the pesticidal composition can be placed in a dryer and additional heat can added to the reaction to increase water evaporation; additionally or alternatively, further reduction in moisture content of the composition can be effected by application of heat and/or vacuum to the composition after completion of the reaction step. Any moisture reduction or partial drying method known in the art can be used.

The pesticidal compositions produced as described above in detail above are extruded to form moist granules. In some embodiments the water-insoluble agrochemical premix can be optionally added to the pesticidal compositions prior to extrusion. The extrudate so produced can be packaged as moist granules. In some other embodiments, depending on the amount of water-insoluble agrochemical premix added and the moisture content of the ammonium glyphosate paste, the moist granules may solidify upon cooling to form a mixture that "crumbles" to the touch. In some other embodiments, the extrudate can optionally be dried, for example by drum drying, to form dry flakes or dry granules.

In some other embodiments of the present invention, aqueous, SC or ME compositions can be dried to form dry granules or powder. Any drying means known to those skilled in the art is suitable for drying.

Methods of Using

Compositions of the present invention can be prepared for use on plants by dissolving the dry compositions in, or diluting the ME or SC compositions with, an appropriate amount of water to form an application mixture, also referred to in the art as a tank mixture. Application mixtures typically contain from about 0.1 to about 50 g total active per liter on an active equivalent basis.

A plant treatment composition is preferably dilute enough to be readily sprayed using standard agricultural spray equipment. Suitable application rates for the present invention vary depending upon such factors as the type and concentration of active ingredient and the plant species involved. Useful rates for applying an aqueous composition to a field of foliage can range from about 25 to about 1,000 liters per hectare (l/ha), preferably about 50 to about 300 l/ha, by spray application.

The selection of application rates required to achieve the plant health and control of unwanted plant benefits of the compositions of the present invention is within the skill of the ordinary agricultural technician. One skilled in the art will recognize that the plant species, individual plant conditions, the particular pests or pathogens affecting the plant, weather and growing conditions, and the pesticides contained in the compositions can affect the results achieved in using a composition of the present invention. Where the water-soluble pesticide is a glyphosate salt, much information is available in published literature about appropriate application rates. Over three decades of glyphosate use and published studies relating to such use have provided abundant information from which a weed control practitioner can select glyphosate application rates that are herbicidally effective on particular species at particular growth stages in particular environmental conditions. Generally, preferred application rates for glyphosate are from about 100 to about 2500 g a.e./ha, more preferably from about 250 to about 1500 g a.e./ha.

The compositions of the present invention can be applied to the plants to be treated through any of the appropriate methods that are well known to those having skill in the art. In some embodiments, application (tank) mixes or ready to use ("RTU") compositions are applied to the target plants. In still other embodiments, dry compositions can be applied either as granules or dust. In some embodiments, the compositions can be applied to plant foliage. In some other embodiments, the compositions can be applied preemergence. In yet other embodiments, the compositions can be applied to plant propagation material (e.g., seeds). Application of plant treatment compositions to foliage of plants is preferably accomplished by spraying, using any conventional means for spraying liquids, such as spray nozzles or spinning-disk atomizers. Compositions of the present invention can be used in precision farming techniques, in which apparatus is employed to vary the amount of exogenous chemical substance applied to different parts of a field, depending on variables such as the particular plant species present, plant growth stage, soil moisture status, etc. In one embodiment of such techniques, a global positioning system operated with the spraying apparatus can be used to apply the desired amount of the composition to different parts of a field.

In some preferred embodiments of the present invention, the target plants have a transgenic event that confers tolerance to the particular pesticide or pesticide combination contained in the compositions of the present invention. For example, the plants may have tolerance to herbicides including glyphosate, auxins (e.g., 2,4-D, dicamba, etc.), glufosinate, ACCase inhibitors (e.g., quizalofop or sethoxydim, etc.), and/or acetolactate synthase (ALS) or acetohydroxy acid synthase (AHAS) inhibitor herbicides (e.g., imazamox, etc.) and the composition contains the corresponding herbicide. For instance, the water-soluble pesticide of the composition may consist essentially of glyphosate and the plant may have a glyphosate tolerant trait. In some other embodiments, the water-soluble pesticide of the composition may consist essentially of dicamba, glufosinate or quizalofop and the plant is dicamba tolerant, glufosinate tolerant or quizalofop tolerant, respectively.

Examples of transgenic plants having herbicide tolerance within the scope of the present invention include, but are not limited to, the following. ROUNDUP READY® soybean (40-3-2 and MON89788), cotton (MON1445, MON1698, MON88913, GHB614), corn (GA21, nk603, MON832), sugar beet (GTSB77 and H7-1), canola (GT73/RT73, GT200, ZSR500/502), wheat (MON71800) and bentgrass (ASR368). Glyphosate tolerant alfalfa. Glufosinate tolerant soybean (A2704-12, A2704-21, A5547-35, A5547-127, GU262, W62 and W98), corn (B16, T14, and T25), cotton (LLCotton25, LLCotton×MON15985), sugar beet (T120-7), rice (LLRICE06, LLRICE62 and LLRICE601) and chickory (RM3-3, RM3-4 and RM3-6). Imidazolinone tolerant soybean (BPS-CV127-9), corn (EXP1910IT, 3751IR and IT), canola (NS738, NS1471 and NS1473), rice (CL121, CL141, CFX51, IMINTA-1, IMINTA-4, PWC16), wheat (AP205CL, AP602CL, SWP965001, Teal 11A, BW255-2, BW238-3, BW7 and lentil (RH44). Oxynil tolerant cotton (BXN) and canola (OXY-235). MS1, RF1, PHY14, PHY35 and PHY36 canola. Cyclohexanone tolerant corn (DK404SR). Phosphinothricin tolerant canola (HCN10, HCN28, HCN92, PGS1, PGS2, HCR-1). Sulfonylurea tolerant cotton (D19-51A), flax (FP967) and oilseed rape ZSR500.

In other embodiments, the plants can additionally include other herbicide, insect, and disease tolerance traits, as well as combinations of those traits. Examples include the following. Insect tolerant crops, for example, cotton events, such as lepidopteran tolerant cotton (MON15985, MON531, MON757, MON1076, 281-24-236, 3006-210-23, COT102, COT67B, DAS-21023×DAS-24236, Event-1), or corn events, (176, BT11, CBH-351, DAS-06275-8, DBT418, MON80100, MON810, MON863, TC1507, MIR152V, 3210M, and 3243M, MIR162, MON89034 and MIR604). Disease tolerant transgenic crops, for example, virus tolerant papaya 55-1/63-1, and virus tolerant squash CZW-3 and ZW20. Male sterility transgenic crops, for example, PHY14, PHY35 PHY36, MS1/RF2, MS1/RF1, AND MS8XRF3 canola and corn events 676, 678, 680, MS3 and MS6.

In other embodiments, the compositions contain co-herbicide combinations and the target plants comprise stacked traits conferring tolerance to those combinations. Examples include the following. Lepidopteran and oxynil tolerant cotton (31807 and 31808). Lepidopteran and glyphosate tolerant cotton (DAS-21023-5×DAS-24236-5×MON-01445-2; DAS-21023-5×DAS-24236-5×MON-01445-2; MON-15985-7×MON-01445-2; MON-00531-6×MON-01445-2; MON15985×MON88913). European corn borer and glyphosate tolerant corn (MON 802 and MON809). European corn borer and phosphinothricin tolerant corn (176, BT11, CBH-351, DBT418, and TC1507). Glufosinate tolerant and male sterility (MS3 and MS6). Glufosinate tolerant and fertility restored (676, 678, 680). Glufosinate tolerant and male-sterility, female restoration (MS1/RF1, MS1/RF2, MS8XRF3). Coleopteran and lepidopteran tolerant and glufosinate tolerant corn (BT11×MIR162×MIR604, BT11×MIR604, TC1507×DAS-59122-7). Coleopteran, lepidopteran, glyphosate and glufosinate tolerant corn (MON-89034-3×TC1507×MON88017×DAS-59122-7; DAS59112-7×TC1507×NK603). Corn rootworm and phosphinothricin tolerant corn (DAS-59122-7). Corn rootworm and glyphosate tolerant corn (MON88017). Corn rootworm and European corn borer tolerant corn (MON863× MON810). Coleopteran, lepidopteran and glyphosate tolerant corn (MON810×MON88017; MON863×MON810× NK603; MON89034×MON88017). Lepidopteran and glyphosate tolerant corn (GA21×MON810; MON89034× NK603; NK603×MON810). Lepidopteran and glufosinate tolerant corn (T25×MON810). Lepidopteran, glufosinate and glyphosate tolerant corn (BT11×GA21; BT11× MIR604×GA21; TC1507×NK603). Lepidopteran and phosphinothricin tolerant corn (BT11×MIR162). Phosphinothricin and glyphosate tolerant corn (NK603×T25).

In some stacked trait embodiments, the water-soluble pesticide comprises glyphosate and glufosinate or glufosinate-P and the target plants have glyphosate-tolerant and glufosinate-tolerant traits.

In some other stacked trait embodiments, the water-soluble pesticide comprises glyphosate and at least one auxin herbicide, and the target plants have glyphosate-tolerant and auxin-tolerant traits. For example, the water-soluble pesticide can comprise glyphosate and dicamba and the target plants have glyphosate-tolerant and dicamba-tolerant traits.

In some other stacked trait embodiments, the water-soluble pesticide comprises glyphosate and at least one ALS or AHAS inhibitor herbicide, and the target plants have glyphosate-tolerant and ALS inhibitor-tolerant traits. Examples include glyphosate and ALS tolerant corn (Event 98140) and DP356043.

In some other stacked trait embodiments, the water-soluble pesticide comprises glyphosate and at least one ACCase inhibitor herbicide, and the target plants have glyphosate-tolerant and ACCase inhibitor-tolerant traits.

In some other stacked trait embodiments, the water-soluble pesticide comprises glyphosate, at least one auxin herbicide, and glufosinate or glufosinate-P, and the target plants have glyphosate, auxin and glufosinate-tolerant traits.

In some other stacked trait embodiments, the water-soluble pesticide comprises glyphosate, at least one auxin herbicide and at least one ALS inhibitor herbicide, and the target plants have glyphosate, auxin and ALS inhibitor-tolerant traits.

In some other stacked trait embodiments, the water-soluble pesticide comprises glyphosate, at least one ALS inhibitor herbicide and glufosinate or glufosinate-P, and the target plants have glyphosate, ALS inhibitor and glufosinate-tolerant traits.

In yet some other stacked trait embodiments, the water-soluble pesticide comprises glyphosate, at least one auxin herbicide, at least one ALS inhibitor herbicide and glufosinate or glufosinate-P, and the target plants have glyphosate, auxin, ALS inhibitor and glufosinate-tolerant traits.

In embodiments of the present invention wherein the target plant has an auxin-tolerant trait, when the auxin herbicide is 2,4-D, the target plant is tolerant to 2,4-D; when the auxin herbicide is aminopyralid, the target plant is tolerant to aminopyralid; when the auxin herbicide is clopyralid, the target plant is tolerant to clopyralid; when the auxin herbicide is dicamba, the target plant is tolerant to dicamba; when the auxin herbicide is fluroxypyr, the target plant is tolerant to fluroxypyr; when the auxin herbicide is mecoprop or mecoprop-P, the target plant is tolerant to mecoprop; when the auxin herbicide is picloram, the target plant is tolerant to picloram; and/or when the auxin herbicide is triclopyr, the target plant is tolerant to triclopyr. In some preferred embodiments, the auxin herbicide is 2,4-D or dicamba.

In embodiments of the present invention wherein the target plant has an ALS or AHAS tolerant trait, when the ALS or AHAS inhibitor herbicide is imazamethabenz-m, the target plant is tolerant to imazamethabenz-m; when the ALS or AHAS inhibitor herbicide is imazamox, the target plant is tolerant to imazamox; when the ALS or AHAS inhibitor herbicide is imazapic, the target plant is tolerant to imazapic; when the ALS or AHAS inhibitor herbicide is imazapyr, the target plant is tolerant to imazapyr; when the ALS or AHAS inhibitor herbicide is imazaquin, the target plant is tolerant to imazaquin; and/or when the ALS or AHAS inhibitor herbicide is imazethapyr, the target plant is tolerant to imazethapyr.

In embodiments of the present invention wherein the target plant has an ACCase inhibitor tolerant trait, when the ACCase inhibitor herbicide is clethodim, the target plant is tolerant to clethodim; when the ACCase inhibitor herbicide is clodinafop, the target plant is tolerant to clodinafop; when the ACCase inhibitor herbicide is diclofop, the target plant is tolerant to diclofop; when the ACCase inhibitor herbicide is fenoxaprop-P, the target plant is tolerant to fenoxaprop-P; when the ACCase inhibitor herbicide is fluazifop-P, the target plant is tolerant to fluazifop-P; when the ACCase inhibitor herbicide is quizalofop-P, the target plant is tolerant to quizalofop-P; and/or when the ACCase inhibitor herbicide is sethoxydim, the target plant is tolerant to sethoxydim.

In some other embodiments of the present invention, the compositions provide improved plant health for plants that do not have a transgenic event that confers tolerance to a particular pesticide or combination of pesticides. For example, the agronomic crop plants soybean and cotton are not susceptible to the water-soluble acetolactate synthase ("ALS") inhibitor or acetohydroxy acid synthase (AHAS) inhibitor herbicides including, but not limited to, imazamethabenz-m, imazamox, imazapic, imazapyr, imazaquin and imazethapyr, and salts thereof. For those agronomic crop plants, the water-soluble pesticide comprises an ALS or AHAS inhibitor herbicide. In a further example, dicamba or 2,4-D can be applied to corn or wheat. In another examples, an ACCase inhibitor such as clethodim, clodinafop, diclofop, fenoxaprop-P, fluazifop-P, quizalofop-P or sethoxydim can be applied to soybeans.

Having described the invention in detail, it will be apparent that modifications and variations are possible without departing from the scope of the invention defined in the appended claims.

EXAMPLES

The following non-limiting examples are provided to further illustrate the present invention.

Example 1

The dissolution/melting temperature of tebuconazole and quizalofop-p-ethyl in various surfactants was measured by differential scanning calorimetry (DSC). Dissolution/melting temperatures of the pesticide-surfactant combinations are shown in the DSC curves of FIGS. 2-21, as compared to the melting point of the reference tebuconazole and quizalofop-p-ethyl solid compound, as a deviation in heat flow from the linear response.

The pesticide-surfactant combinations described in Table 1a were evaluated wherein "Pest. conc." refers to the weight percent pesticide on an active equivalent basis.

TABLE 1a

| FIG. | Pesticide | Pest. conc. | Surfactant |
|---|---|---|---|
| 2 | Tebuconazole | 40% and 65% | Ethoxylated Tallowamine 5 EO (Ethomeen T/15) |
| 3 | Tebuconazole | 40% and 65% | Ethoxylated Tallowamine 15 EO (Ethomeen T/25) |
| 4 | Tebuconazole | 65% | Ethoxylated Tallowamine 5 EO |
|   | Tebuconazole | 65% | Ethoxylated Tallowamine 10 EO (Ethomeen T/20) |
|   | Tebuconazole | 65% | Ethoxylated Tallowamine 15 EO |
| 5 | Tebuconazole | 40% and 65% | Ethoxylated amine/ethoxylated alcohol blend |
| 6 | Tebuconazole | 65% | $C_{12-14}$ ethoxylated, propoxylated alcohol (Surfonic LF-17) |
|   | Tebuconazole | 65% | $C_{12-14}$ ethoxylated, propoxylated alcohol (Surfonic LF-42) |
| 7 | Tebuconazole | 65% | $C_{12-14}$ ethoxylated alcohol 5 EO (Surfonic L24-5) |
|   | Tebuconazole | 65% | $C_{12-14}$ ethoxylated alcohol 9 EO (Surfonic L24-9) |
| 8 | Tebuconazole | 40% and 65% | $C_{6-9}$ amidopropyl dimethylamine (Armeen APA 9) |
| 9 | Tebuconazole | 65% | $C_{18}$ ethoxylated alcohol 2EO (Brij 92) |
|   | Tebuconazole | 40% | $C_{12}$ ethoxylated alcohol 2EO (Brij 30) |
| 10 | Tebuconazole | 40% and 65% | Huntsman AGM 550 etheramine |
| 11 | Tebuconazole | 40% and 65% | $C_{10}$ phosphate ester 5.6 EO (Alfol 10) |
| 12 | Tebuconazole | 65% | Armeen APA 9 |
|   | Tebuconazole | 65% | Brij 30 |
|   | Tebuconazole | 65% | Surfonic LF42 |
|   | Tebuconazole | 65% | Ethomeen T/15 |
|   | Tebuconazole | 65% | Huntsman AGM 550 |
|   | Tebuconazole | 65% | $C_{12-14}$ alcohol 5 EO (Surfonic L24-5) |

TABLE 1a-continued

| FIG. | Pesticide | Pest. conc. | Surfactant |
|---|---|---|---|
| 13 | Tebuconazole | 40% and 65% | Ethoxylated isotridecyl-oxypropylamine N-oxide (80% water) |
| 14 | Tebuconazole | 40% and 65% | Ethoxylated cocoamine 2EO (Ethomeen C/12) |
| 15 | Tebuconazole | 40% and 65% | Ethoxylated quaternary cocoamine 2EO (Ethoquad C/12) |
| 16 | Quizalofop-p-ethyl | 40% and 65% | Armeen APA 9 |
| 17 | Quizalofop-p-ethyl | 40% and 65% | Huntsman AGM 550 |
| 18 | Quizalofop-p-ethyl | 40% and 65% | Ethomeen C/12 |
| 19 | Quizalofop-p-ethyl | 40% and 65% | Ethomeen T/15 |
| 20 | Quizalofop-p-ethyl | 65% | Surfonic L24-5 |
|   | Quizalofop-p-ethyl | 65% | $C_{12-14}$ alcohol 9 EO (Surfonic L24-9) |
| 21 | Quizalofop-p-ethyl | 65% | Surfonic L24-9 |
|   | Quizalofop-p-ethyl | 65% | Huntsman AGM 550 |
|   | Quizalofop-p-ethyl | 65% | Armeen APA 9 |
|   | Quizalofop-p-ethyl | 65% | Ethomeen T/15 |

The cationic, nonionic and anionic surfactants tested each reduced the tebuconazole dissolution/melting temperature as compared to tebuconazole in the absence of a surfactant. Tebuconazole concentration was positively correlated with dissolution/melting temperature. There was no significant difference in dissolution/melting behavior within surfactant type, i.e., cationic, nonionic or anionic. For instance, the cationic surfactant EO number or alkyl chain length did not appreciably affect the dissolution/melting characteristics. The tebuconazole dissolution/melting behavior varied between surfactant genus. The amidopropylamine surfactant provided the lowest tebuconazole dissolution/melting point.

The cationic, nonionic and anionic surfactants tested each reduced the quizalofop-p-ethyl dissolution/melting temperature as compared to quizalofop-p-ethyl in the absence of a surfactant. Quizalofop-p-ethyl concentration was positively correlated with dissolution/melting temperature. There was no significant difference in dissolution/melting behavior within or between surfactant genera; cationic, nonionic and anionic, and each showed similar quizalofop-p-ethyl dissolution/melting properties.

Example 2

Tebuconazole and quizalofop-p-ethyl were separately admixed with various surfactants to a concentration of 20% w/v and then heated in a water bath with agitation while monitoring the temperature. A dissolution temperature was measured as the temperature at which the mixture cleared. The solutions were then cooled to room temperature (20-25° C.) and observed to determine if the tebuconazole solution remained clear thereby indicating that the tebuconazole remained in solution. The results are reported in Tables 2a and 2b.

TABLE 2a

Tebuconazole dissolution

| Surfactant | Dissolution temp. (° C.) | Observation | Observation at room temp. |
|---|---|---|---|
| Ethomeen T/15 | 45 | Not Dissolved | — |
|  | 50 | Dissolved | Dissolved |
| Armeen APA 9 | 40 | Dissolved | Dissolved |
| AGM-550 | 45 | Dissolved | Dissolved |
| Surfonic L24-9 | 45 | Not Dissolved | — |
|  | 50 | Dissolved | Dissolved |
| cocoamine 2EO (Ethomeen C/12) | 45 | Dissolved | Dissolved |
| coco quaternary amine 2 EO (Ethoquad C/12) | 45 | Dissolved | Dissolved |
| alkylamine oxide | 45 | Dissolved | Dissolved |

TABLE 2b

Quizalofop-p-ethyl dissolution

| Surfactant | Dissolution temp. (° C.) | Observation | Observation at room temp. |
|---|---|---|---|
| Ethomeen T/15 | 45 | Not Dissolved | — |
|  | 50 | Dissolved | Dissolved |
| Armeen APA 9 | 45 | Not Dissolved | — |
|  | 50 | Dissolved | Dissolved |
| AGM-550 | 45 | Dissolved | Dissolved |
| Ethomeen C/12 | 50 | Not Dissolved | — |
|  | 55 | Dissolved | Dissolved |
|  | 65 | Dissolved | Dissolved |
| Ethoquad C/12 | 55 | Not Dissolved | — |
|  | 65 | Dissolved | Dissolved |
| alkylamine oxide | 60 | Dissolved | Dissolved |

Tebuconazole has a melting point of 108° C. and quizalofop-p-ethyl has a melting point of 80° C., each measured by DSC. The data show that both pesticides can be dissolved in surfactants at a much lower temperature than their melting point. The measured melting points were consistent with the DSC dissolution temperatures reported in Example 1.

Example 3

Three sets of microemulsion formulations were prepared as disclosed in Tables 3a (formulations 1-8), 3b (formulations 1-4) and 3c (formulations 1-4) below. Table 3a formulation 9 was prepared in the absence of an organic solvent and is therefore classified as a solution concentrate (SL). The Table 3a formulations contained potassium glyphosate and tebuconazole, the Table 3b formulations contained potassium glyphosate and quizalofop-p-ethyl and the Table 3c formulations contained potassium glyphosate and 2,4-dibromomesitylene (having a melting point of 62° C. and a molecular weight of 278). For formulations 1-8 of Table 3a and formulations 1-4 of Tables 3b and 3c, the water insoluble pesticides (tebuconazole, quizalofop-p-ethyl or 2,4-dibromomesitylene) were first dissolved in an organic solvent. A glyphosate premix was prepared by dissolving potassium glyphosate in water to a glyphosate concentration of about 47 w/w percent a.e. The surfactant and glyphosate premix were combined with the remainder of the components with agitation to generate a clear solution at room temperature. Table 3a formulation 9 was prepared by forming a surfactant-tebuconazole premix by heating with agitation until a clear solution was obtained which was thereafter combined with the glyphosate premix to form a clear solution. For each formulation, a clear solution was obtained in less than about 30 minutes. Tables 3a-c disclose the composition of the microemulsion and solution concentrate formulations where all values are reported in weight percent, except glyphosate that is reported in both grams a.e./L and wt % a.e.

TABLE 3a

Tebuconazole microemulsions

| Component | Form. 1 | Form. 2 | Form. 3 | Form. 4 | Form. 5 |
|---|---|---|---|---|---|
| K glyphosate |  |  |  |  |  |
| wt % a.e. | 38.1 | 38.1 | 36.6 | 36.6 | 34.8 |
| g a.e./L | 500 | 500 | 480 | 480 | 450 |
| Tebuconazole | 1.9 | 1.9 | 2.3 | 2.3 | 2.7 |
| Armix DM810 solvent | 3.6 | 3.5 | 4.3 | 4.3 | 5 |
| Armeen APA 9 surfactant | 4.8 | 6 | 5.4 | 6 | 4.8 |
| Ethomeen T/15 surfactant | 3.2 | 4 | 3.6 | 4 | 3.2 |
| Diethylene glycol | 3 | — | 3.6 | 2 | 7.7 |
| Water | 36.5 | 37.6 | 35.6 | 36.2 | 31.4 |

| Component | Form. 6 | Form. 7 | Form. 8 | Form. 9 |
|---|---|---|---|---|
| K glyphosate |  |  |  |  |
| wt % a.e. | 34.8 | 34.8 | 34.8 | 32 |
| g a.e./L | 450 | 450 | 450 | 420 |
| Tebuconazole | 2.7 | 2.2 | 2.7 | 2 |
| Armix DM810 solvent | 5 | 4.1 | 5 | — |
| Jeffsol AG1730 solvent | — | — | — | — |
| Armeen APA 9 surfactant | 6.5 | 4.8 | 6 | 4 |
| Ethomeen T/15 surfactant | 4.4 | — | — | — |
| Ethomeen T/18H surfactant | — | 3.2 | — | — |
| Ethomeen T/20S surfactant | — | — | 3 | — |
| Ethomeen C/12 surfactant | — | — | — | 2.5 |
| Surfonic T-15 surfactant | — | — | — | 1.5 |
| Diethylene glycol | 2 | 5.1 | — | — |
| Propylene glycol | — | — | 6 | 10.5 |
| Water | 34.2 | 35.4 | 32.1 | 35.3 |

TABLE 3b

Quizalofop-p-ethyl microemulsions

| Component | Form. 1 | Form. 2 | Form. 3 | Form. 4 |
|---|---|---|---|---|
| K glyphosate |  |  |  |  |
| wt % a.e. | 37.1 | 34.8 | 34.1 | 32 |
| g a.e./L | 485 | 450 | 450 | 420 |
| Quizalofop-p-ethyl | 1.5 | 2.25 | 3.55 | 5.2 |
| Aromatic 200 solvent | 5.2 | 6.4 | 8.8 | 11.8 |
| Armeen APA 9 surfactant | 4.4 | 4.8 | 4 | 3.8 |
| Ethomeen C/12 surfactant | 4 | 4.3 | 3.7 | 3.5 |
| Armix 185B surfactant | 3.7 | 4.8 | 5.2 | 4.9 |
| Diethylene glycol | 2.9 | 3.5 | 2.6 | 2.5 |
| Water | 32.6 | 31 | 30 | 28.8 |

TABLE 3c 2,4-Dibromomesitylene microemulsions

| Component | Form. 1 | Form. 2 | Form. 3 | Form. 4 |
|---|---|---|---|---|
| K glyphosate | | | | |
| wt % a.e. | 37.6 | 36.5 | 32.9 | 31.2 |
| g a.e./L | 490 | 480 | 420 | 400 |
| 2,4-Dibromomesitylene | 2.4 | 3.5 | 6.5 | 8.5 |
| Aromatic 200 solvent | 2.4 | 3.6 | 6.6 | 8.6 |
| Armeen APA 9 surfactant | 4.8 | 4.6 | 4.2 | 3.9 |
| Ethomeen C/12 surfactant | 4.6 | 4.5 | 4 | 3.8 |
| Armix 185B surfactant | 3.1 | 3.6 | 3.8 | 4.4 |
| Diethylene glycol | 2 | 1.9 | 1.7 | 1.7 |
| Water | 34.4 | 33.2 | 32.6 | 30.6 |

The physical stability of each microemulsion composition and the solution concentrate formulation were evaluated for physical stability at 55° C. and at −10° C. No phase separation or crystallization was observed for any of the compositions for at least 2 weeks.

Chemical stability for each composition was evaluated by HPLC after 4 weeks at 55° C. No significant chemical change was measured for any of the compositions.

Example 4

A suspension concentrate formulation was prepared in the absence of an organic solvent as disclosed in Table 4 below. A surfactant premix was prepared by combining tebuconazole and surfactant in a glass jar. The premix was heated on a hot plate with agitation until it cleared, and then agitated for about 30 minutes to complete dissolution. A glyphosate premix was prepared by dissolving potassium glyphosate in water to a glyphosate concentration of about 47 w/w % a.e. The surfactant and glyphosate premixes were combined with the remainder of the components with agitation to generate the suspension at room temperature. Table 4 discloses the composition of the suspension concentrate formulations where all values are reported in weight percent, except glyphosate that is reported in both grams a.e./L and wt % a.e.

TABLE 4

Tebuconazole suspension concentrates

| Component | Form. 1 | Form. 2 | Form. 3 | Form. 4 |
|---|---|---|---|---|
| K glyphosate | | | | |
| wt % a.e. | 36 | 36 | 36 | 36 |
| g a.e./L | 480 | 480 | 480 | 480 |
| Tebuconazole | 6 | 4 | 2 | 2 |
| Huntsman AGM-550 surfactant | 7.3 | 7.3 | 7.3 | 7.3 |
| Aerosil 200 silica | 1 | 1.5 | 2 | 1.5 |
| Optigel-OGWX | 0.5 | — | — | 0.5 |
| Pluraflo L1060 dispersant | 0.2 | 0.16 | 0.1 | 0.1 |
| Water | 40.5 | 42.6 | 44.2 | 44.2 |

Example 5

Seven sets of dry formulations were prepared in the absence of an organic solvent as disclosed in Tables 5a-g below. The Table 5a formulations contained mono-ammonium glyphosate and quizalofop-p-ethyl and the Table 5b-g formulations contained mono-ammonium glyphosate and tebuconazole. A surfactant premix was prepared by combining the tebuconazole and surfactant in a glass jar. The jar was placed in a water bath at 80° C. to melt the tebuconazole and form the premix. A dough was prepared by combining with thorough mixing the surfactant premix, water, and mono-ammonium glyphosate technical granules. Other ingredients such as ammonium sulfate, sodium sulfite, and antifoam agent may also be included. The dough was extruded through a screen having openings of about 0.8 to 1 millimeters in diameter to yield granules that were then dried in a fluid bed dryer at 65° C. Tables 5a-e disclose the composition of the solid concentrate formulations where all values are reported in weight percent, except glyphosate that is reported in wt % a.e. Surfactant A refers to a 45:55 mixture of Surfonic T-15 surfactant and Huntsman L6820 surfactant.

TABLE 5a

Quizalofop-p-ethyl solid concentrates

| Component | Form 1 | Form 2 | Form 3 | Form 4 | Form 5 | Form 6 |
|---|---|---|---|---|---|---|
| Mono-ammonium glyphosate wt % a.e. | 65 | 65 | 65 | 60 | 60 | 60 |
| Quizalofop-p-ethyl | 2 | 3 | 5 | 2 | 3 | 5 |
| Surfactant A | 19 | 19 | 19 | 24 | 24 | 24 |
| Ammonium sulfate | 3.3 | 2.3 | — | 4.1 | 3.1 | 0.8 |
| Sodium sulfite | 0.4 | 0.4 | 0.4 | 0.4 | 0.4 | 0.4 |
| Agnique DFM antifoam | 0.1 | 0.1 | 0.1 | 0.1 | 0.1 | 0.1 |

TABLE 5b

Tebuconazole solid concentrates

| Component | Form. 1 | Form. 2 | Form. 3 | Form. 4 | Form. 5 |
|---|---|---|---|---|---|
| Mono-ammonium glyphosate | | | | | |
| wt % a.e. | 65 | 65 | 65 | 64 | 64 |
| Tebuconazole | 0.7 | 1.5 | 3.1 | 3.4 | 4 |
| Surfactant A | 19 | 19 | 19 | 20.7 | 21.2 |
| Ammonium sulfate | 4.7 | 3.9 | 2.3 | 1.3 | 0.3 |
| Sodium sulfite | 0.4 | 0.4 | 0.4 | 0.4 | 0.4 |
| Agnique DFM antifoam | 0.1 | 0.1 | 0.1 | 0.1 | 0.1 |

TABLE 5c

Tebuconazole solid concentrates

| Component | Form. 1 | Form. 2 | Form. 3 | Form. 4 |
|---|---|---|---|---|
| Mono-ammonium glyphosate | | | | |
| wt % a.e. | 65 | 64 | 64 | 65 |
| Tebuconazole | 3 | 3.4 | 4 | 4.7 |
| Surfactant A | 18.9 | 19 | 19 | 17.7 |
| Ammonium sulfate | 2.3 | 1 | 0.3 | — |
| AgSol EX-8 | 0.3 | 1.9 | 2 | 2.1 |
| Sodium sulfite | 0.5 | 0.4 | 0.4 | 0.5 |
| Agnique DFM antifoam | 0.1 | 0.1 | 0.1 | 0.1 |

TABLE 5d

Tebuconazole solid concentrates

| Component | Form. 1 | Form. 2 | Form. 3 | Form. 4 |
|---|---|---|---|---|
| Mono-ammonium glyphosate | | | | |
| wt % a.e. | 64 | 64 | 64 | 64 |
| Tebuconazole | 4 | 4 | 4 | 4 |
| Surfonic T-15 surfactant | 8 | 10 | 12.7 | 15.3 |
| Surfonic L46-7 surfactant | 12 | 10 | 8.4 | 5.8 |
| Ammonium sulfate | 1.3 | 1.3 | 0.3 | 0.3 |
| Sodium sulfite | 0.4 | 0.5 | 0.4 | 0.4 |
| Agnique DFM antifoam | 0.1 | 0.1 | 0.1 | 0.1 |

TABLE 5e

Tebuconazole solid concentrates

| Component | Form. 1 | Form. 2 | Form. 3 |
|---|---|---|---|
| Mono-ammonium glyphosate | | | |
| wt % a.e. | 64 | 64 | 64 |
| Tebuconazole | 4 | 4 | 4 |
| TAE 15EO surfactant | 5.8 | 10.6 | 15.2 |
| L68-20 EO surfactant | 15.3 | 10.5 | 5.8 |
| Ammonium sulfate | 0.3 | 0.3 | 0.3 |
| Sodium sulfite | 0.4 | 0.4 | 0.4 |
| Agnique DFM antifoam | 0.1 | 0.1 | 0.1 |

TABLE 5f

Tebuconazole solid concentrates

| Component | Form. 1 | Form. 2 | Form. 3 | Form. 4 | Form. 5 |
|---|---|---|---|---|---|
| Mono-ammonium glyphosate | | | | | |
| wt % a.e. | 71.5 | 71.5 | 71.5 | 70.5 | 70.5 |
| Tebuconazole | 0.7 | 1.5 | 3.1 | 3.4 | 4 |
| Surfactant A | 19 | 19 | 19 | 20.7 | 21.2 |
| Ammonium sulfate | 4.7 | 3.9 | 2.3 | 1.3 | 0.3 |
| Sodium sulfite | 0.4 | 0.4 | 0.4 | 0.4 | 0.4 |
| Agnique DFM antifoam | 0.1 | 0.1 | 0.1 | 0.1 | 0.1 |

TABLE 5g

Tebuconazole solid concentrates

| Component | Form. 1 | Form. 2 | Form. 3 | Form. 4 |
|---|---|---|---|---|
| Mono-ammonium glyphosate | | | | |
| wt % a.e. | 71.5 | 70.5 | 70.5 | 71.5 |
| Tebuconazole | 3 | 3.4 | 4 | 4.7 |
| Surfactant A | 18.9 | 19 | 19 | 17.7 |
| AgSol EX-8 | 0.3 | 1.9 | 2 | 2.1 |
| Ammonium sulfate | 1.3 | 1.3 | 0.3 | 0.3 |
| Sodium sulfite | 0.5 | 0.4 | 0.4 | 0.5 |
| Agnique DFM antifoam | 0.1 | 0.1 | 0.1 | 0.1 |

The dry compositions appeared as light yellow, opaque granules. Chemical stability of the dry compositions was evaluated by HPLC after 4 weeks at 60° C. No significant chemical change was measured.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying figures shall be interpreted as illustrative and not in a limiting sense.

What is claimed is:

1. A microemulsion concentrate composition comprising (i) an aqueous carrier phase comprising at least one water-soluble pesticide in solution in the carrier phase, wherein the water-soluble pesticide is in the form of a salt, (ii) a surfactant phase comprising (a) a surfactant component comprising at least one surfactant and (b) at least one water-insoluble agrochemical, and (iii) an organic solvent,
wherein the at least one water-insoluble agrochemical is selected from the group consisting of azoxystrobin, beflubutamide, benalaxyl, benalaxyl-M, bromuconazole, clodinafop-propargyl, coumaphos, dinitriamine, dodemorph acetate, fentrazamide, flamprop-M-isopropyl, flamprop-M-methyl, flurochloridone, flutolanil, indanofan, ipconazole, kresoxim-methyl, metconazole, picoxystrobin, pyraclostrobin, tebuconazole, thenylchlor, thiazopyr, quizalofop-p-ethyl, and combinations thereof,
at least 50% by weight of the water-insoluble agrochemical is present as a solute in the surfactant component,
the water-soluble pesticide concentration is at least 400 grams active equivalent per liter of the concentrate composition, and
the weight ratio of the organic solvent to the water-insoluble agrochemical on an active equivalent basis is less than 3:1.

2. The composition of claim 1 wherein the water-soluble pesticide concentration is at least 450 grams active equivalent per liter.

3. The composition of claim 1 wherein the water-insoluble agrochemical concentration is from about 0.1 to about 20 percent by weight active equivalent per unit weight of the microemulsion composition.

4. The composition of claim 1 wherein the weight ratio of the organic solvent to the water-insoluble agrochemical on an active equivalent basis is less than 2.5:1.

5. The composition of claim 1 wherein the weight ratio of the water-soluble pesticide on an active equivalent basis to water-insoluble agrochemical on an active equivalent basis is from about 1:1 to about 100:1.

6. The composition of claim 1 wherein at least 75% by weight of the water-insoluble agrochemical is present as a solute in the surfactant component.

7. The composition of claim 1 wherein the weight ratio of the water-soluble pesticide on an active equivalent basis to the surfactant component is from about 1:1 to about 20:1.

8. The composition of claim 1 wherein the weight ratio of the surfactant component to the water-insoluble agrochemical on an active equivalent basis is from about 2:1 to about 10:1.

9. The composition of claim 1 wherein the water-soluble pesticide comprises at least one water-soluble herbicide.

10. The composition of claim 9 wherein the water-soluble herbicide is selected from the group consisting of ALS or AHAS inhibitors, EPSP inhibitors, glutamine synthetase inhibitors, synthetic auxins, Photosystem I inhibitors, ACCase inhibitors in the form of a salt and combinations thereof.

11. The composition of claim 10 wherein the water-soluble herbicide is selected from the group consisting of glyphosate, dicamba, 2,4-D, MCPA, glufosinate in the form of a salt and combinations thereof.

12. The composition of claim 11 wherein the water-soluble herbicide is glyphosate in the form of a salt.

13. The composition of claim 1 wherein the water-insoluble agrochemical has a molecular weight of from about 100 to about 600 grams per mole and a melting point of from about 45° C. to about 110° C.

14. The composition of claim 1 wherein the water-insoluble agrochemical is tebuconazole or pyraclostrobin.

15. The composition of claim 1 wherein the surfactant component comprises at least one surfactant selected from the group consisting of cationic surfactants, nonionic surfactants, anionic surfactants and amphoteric surfactants.

16. The composition of claim 15 wherein the surfactant is selected from the group consisting of amidoalkylamines, alkoxylated tertiary amines, alkoxylated quaternary amines, alkoxylated tertiary etheramines, alkoxylated quaternary etheramines, alkyl amine oxides, alkylpolyglucosides, alkoxylated alcohols, phosphate esters and siloxanes, and combinations thereof.

17. The composition of claim 1 wherein the cloud point is at least 50° C.

18. The composition of claim 17 having the absence of crystals after storage for 4 weeks at a temperature of −10° C.

19. The composition of claim 1 wherein the water-soluble pesticide comprises a glyphosate salt and the water-insoluble agrochemical comprises tebuconazole or pyraclostrobin.

20. A method of increasing the vigor and/or yield of an agronomic plant and of controlling weeds growing in a crop of the agronomic plants, the method comprising:
forming an application mixture from the compositions of claim 1,
wherein the application mixture comprises (i) a water-soluble herbicide selected from the group consisting of organophosphorus herbicides, ALS inhibitor herbicides, synthetic auxin herbicides, ACCase inhibitor herbicides in the form of a salt and combinations thereof and (ii) a water-insoluble agrochemical selected from the group consisting of azoxystrobin, beflubutamide, benalaxyl, benalaxyl-M, bromuconazole, clodinafop-propargyl, coumaphos, dinitriamine, dodemorph acetate, fentrazamide, flamprop-M-isopropyl, flamprop-M-methyl, flurochloridone, flutolanil, indanofan, ipconazole, kresoxim-methyl, metconazole, picoxystrobin, pyraclostrobin, tebuconazole, thenylchlor, thiazopyr, quizalofop-p-ethyl, and combinations thereof, and
applying the application mixture to the agronomic plant or an agronomic plant propagation material from which the agronomic plant can be obtained in an amount effective to increase the vigor and/or yield of the agronomic plant, wherein the agronomic plant has an herbicidal tolerant trait conferring tolerance to the organophosphorus herbicide, ALS inhibitor herbicide, synthetic auxin herbicide, ACCase inhibitor herbicide, or combination thereof.

* * * * *